(12) United States Patent
Root

(10) Patent No.: US 9,566,957 B2
(45) Date of Patent: Feb. 14, 2017

(54) DISK BRAKE HUB ASSEMBLY

(75) Inventor: Jeffrey T. Root, Howell, MI (US)

(73) Assignee: GUNITE CORPORATION, Rockford, IL (US)

( * ) Notice: Subject to any disclaimer, the term of this patent is extended or adjusted under 35 U.S.C. 154(b) by 70 days.

(21) Appl. No.: 13/436,422

(22) Filed: Mar. 30, 2012

(65) Prior Publication Data

US 2012/0247882 A1    Oct. 4, 2012

Related U.S. Application Data

(63) Continuation-in-part of application No. 13/077,883, filed on Mar. 31, 2011.

(51) Int. Cl.
| | |
|---|---|
| *F16D 65/12* | (2006.01) |
| *B60T 5/00* | (2006.01) |
| *B60B 27/00* | (2006.01) |
| *F16D 65/02* | (2006.01) |

(52) U.S. Cl.
CPC ............. *B60T 5/00* (2013.01); *B60B 27/0052* (2013.01); *F16D 65/12* (2013.01); *F16D 2065/1328* (2013.01); *F16D 2065/1368* (2013.01); *F16D 2065/1384* (2013.01); *F16D 2065/1392* (2013.01); *F16D 2065/1396* (2013.01); *F16D 2200/0039* (2013.01)

(58) Field of Classification Search
CPC ................ F16D 2065/1392; F16D 2065/1316; F16D 65/123; F16D 2065/1328; F16D 2065/1368; B60T 8/329
USPC .............................. 188/18 A, 218 R, 218 XL
See application file for complete search history.

(56) References Cited

U.S. PATENT DOCUMENTS

| | | | |
|---|---|---|---|
| 1,473,140 A | | 11/1923 | Church |
| 2,753,959 A | * | 7/1956 | Johnson ................. 188/218 XL |
| 3,530,960 A | * | 9/1970 | Gronemann et al. ... 188/218 XL |
| 3,624,749 A | | 11/1971 | Girard et al. |
| 3,772,548 A | * | 11/1973 | Wroblewski ............ B60T 8/329 310/168 |
| 3,994,370 A | | 11/1976 | Gebhardt et al. |
| 4,026,393 A | | 5/1977 | Gebhardt et al. |
| 4,042,071 A | | 8/1977 | Pöllinger |
| 4,108,286 A | | 8/1978 | Gagarin |
| 4,110,647 A | | 8/1978 | Eslinger et al. |
| 4,152,099 A | | 5/1979 | Bingler |
| 4,281,745 A | | 8/1981 | Wirth |
| 4,792,020 A | | 12/1988 | Okumura et al. |
| 4,811,992 A | | 3/1989 | Steiner |

(Continued)

FOREIGN PATENT DOCUMENTS

| | | |
|---|---|---|
| DE | 10128072 | 12/2002 |
| DE | 10351592 B3 | 4/2005 |

(Continued)

OTHER PUBLICATIONS

International Search Report and Written Opinion for Application No. PCT/US2012/031647 dated Aug. 16, 2012 (16 pages).

*Primary Examiner* — Bradley King
*Assistant Examiner* — Stephen Bowes
(74) *Attorney, Agent, or Firm* — Michael Best & Friedrich LLP

(57) ABSTRACT

A brake hub assembly for coupling to a wheel rim includes a hub body and a brake disk coupled to the hub body. The hub body and brake disk are shaped to allow maximum airflow through the brake disk during operation of the vehicle.

16 Claims, 61 Drawing Sheets

(56) References Cited

U.S. PATENT DOCUMENTS

| | | |
|---|---|---|
| 4,840,348 A | 6/1989 | Takigawa et al. |
| 4,880,281 A | 11/1989 | Merkelbach |
| 4,913,266 A | 4/1990 | Russell et al. |
| 5,007,508 A * | 4/1991 | Lacombe .................. 188/251 A |
| 5,190,124 A | 3/1993 | Haneda |
| 5,261,511 A | 11/1993 | Libsch et al. |
| 5,273,140 A | 12/1993 | Berwanger |
| 5,344,219 A | 9/1994 | Adrian et al. |
| 5,352,305 A | 10/1994 | Hester |
| 5,435,420 A * | 7/1995 | White ....................... 188/264 G |
| 5,439,077 A | 8/1995 | Wirth |
| 5,507,367 A | 4/1996 | Dagh et al. |
| 5,540,303 A | 7/1996 | Bodin et al. |
| 5,568,846 A * | 10/1996 | Dagh et al. ............ 188/218 XL |
| 5,664,648 A | 9/1997 | Hester |
| 5,739,684 A | 4/1998 | Burns |
| 5,851,056 A | 12/1998 | Hyde |
| 5,988,324 A | 11/1999 | Bertetti et al. |
| 5,988,613 A | 11/1999 | Dagh et al. |
| 6,098,764 A | 8/2000 | Wirth et al. |
| 6,116,386 A | 9/2000 | Martin |
| 6,139,215 A | 10/2000 | Kühne et al. |
| 6,145,632 A | 11/2000 | Rutter |
| 6,161,661 A | 12/2000 | Pahle et al. |
| 6,224,266 B1 | 5/2001 | Ohtsuki et al. |
| 6,247,547 B1 | 6/2001 | Lemke et al. |
| 6,257,678 B1 | 7/2001 | Brookey et al. |
| 6,305,510 B1 | 10/2001 | Bunker |
| 6,330,937 B1 | 12/2001 | Dagh et al. |
| 6,364,426 B1 | 4/2002 | Horne et al. |
| 6,374,956 B1 | 4/2002 | Naeumann et al. |
| 6,379,050 B1 | 4/2002 | Bertetti et al. |
| 6,457,567 B1 | 10/2002 | Bunker |
| 6,464,045 B2 | 10/2002 | Weber et al. |
| 6,467,588 B1 | 10/2002 | Baumgartner et al. |
| 6,543,858 B1 | 4/2003 | Melton |
| 6,564,912 B1 | 5/2003 | Koschinat |
| 6,564,913 B2 | 5/2003 | Baumgartner et al. |
| 6,604,613 B2 | 8/2003 | Burgoon et al. |
| 6,604,794 B1 | 8/2003 | Messina |
| 6,612,657 B1 | 9/2003 | Fakhoury et al. |
| 6,626,273 B1 | 9/2003 | Baumgartner et al. |
| 6,702,398 B2 | 3/2004 | Laps |
| 6,722,479 B2 | 4/2004 | Baumgartner et al. |
| 6,742,233 B2 | 6/2004 | Wirth |
| 6,829,825 B1 | 12/2004 | Bowman et al. |
| 6,866,345 B2 | 3/2005 | Fakhoury et al. |
| 6,880,682 B2 | 4/2005 | Gotti et al. |
| 6,910,556 B1 | 6/2005 | Baumgartner et al. |
| RE38,874 E | 11/2005 | Bieker et al. |
| 6,962,242 B2 | 11/2005 | Conti |
| 6,988,598 B2 | 1/2006 | Williams |
| 7,028,816 B2 | 4/2006 | Baumgartner et al. |
| 7,098,764 B2 | 8/2006 | Schaumburg et al. |
| 7,104,368 B2 | 9/2006 | Cornolti et al. |
| 7,111,911 B2 | 9/2006 | Baumgartner et al. |
| 7,159,316 B2 | 1/2007 | Sadanowicz et al. |
| 7,159,698 B2 | 1/2007 | Banks et al. |
| 7,163,091 B2 | 1/2007 | Shamine et al. |
| 7,228,946 B2 | 6/2007 | Baumgartner et al. |
| 7,255,205 B2 | 8/2007 | Plantan et al. |
| 7,261,192 B2 | 8/2007 | Khambekar et al. |
| 7,281,769 B2 | 10/2007 | Pete et al. |
| 7,374,024 B2 | 5/2008 | Iraschko |
| 7,393,064 B2 | 7/2008 | Hall et al. |
| 7,410,036 B2 | 8/2008 | Wimmer et al. |
| 7,413,261 B2 | 8/2008 | De Freitas |
| 7,506,940 B2 | 3/2009 | White |
| 7,610,998 B2 | 11/2009 | Baumgartner et al. |
| 7,780,243 B2 | 8/2010 | Lippis |
| 7,866,447 B2 | 1/2011 | Baumgartner et al. |
| 7,871,134 B2 | 1/2011 | Hofmann et al. |
| 7,918,322 B2 | 4/2011 | Pahle |
| 7,963,375 B2 | 6/2011 | Pahle |
| 8,037,980 B2 | 10/2011 | Pahle |
| 8,733,517 B2 | 5/2014 | Tironi et al. |
| 2002/0157908 A1* | 10/2002 | Burgoon et al. ........ 188/218 XL |
| 2004/0182660 A1 | 9/2004 | Cavagna et al. |
| 2004/0195059 A1* | 10/2004 | Williams ................ F16D 65/12 188/218 XL |
| 2005/0206148 A1 | 9/2005 | Nechvatal et al. |
| 2007/0062766 A1 | 3/2007 | Leinung et al. |
| 2007/0175715 A1* | 8/2007 | Pahle ....................... B60T 8/329 188/218 XL |
| 2007/0193837 A1 | 8/2007 | Lamb |
| 2007/0215418 A1 | 9/2007 | Wirth et al. |
| 2007/0246269 A1 | 10/2007 | Pahle et al. |
| 2007/0286961 A1 | 12/2007 | Pahle et al. |
| 2008/0060890 A1 | 3/2008 | Clark et al. |
| 2008/0128229 A1 | 6/2008 | Pahle |
| 2008/0135359 A1 | 6/2008 | Basirico et al. |
| 2008/0149435 A1* | 6/2008 | Burgoon ............... F16D 65/123 188/73.31 |
| 2008/0271965 A1* | 11/2008 | Reulein et al. ........ 188/218 XL |
| 2008/0296965 A1 | 12/2008 | Hofmann et al. |
| 2009/0020376 A1 | 1/2009 | Masoni et al. |
| 2009/0038895 A1* | 2/2009 | Snyder et al. ................ 188/166 |
| 2009/0218183 A1 | 9/2009 | Burgoon et al. |
| 2010/0084911 A1 | 4/2010 | Ilg |
| 2010/0101902 A1* | 4/2010 | Kano et al. ............ 188/218 XL |
| 2010/0282547 A1 | 11/2010 | Fischer et al. |
| 2010/0283276 A1 | 11/2010 | Wirth et al. |
| 2010/0307875 A1 | 12/2010 | Ilg et al. |

FOREIGN PATENT DOCUMENTS

| | | | |
|---|---|---|---|
| DE | 10257719 B4 | 4/2007 | |
| DE | 10262070 B4 | 8/2007 | |
| EP | 0127932 A1 | 12/1984 | |
| EP | 0418532 | 3/1991 | |
| EP | 0872659 A1 | 10/1998 | |
| JP | 62209234 A * | 9/1987 | ............ F16D 65/12 |
| WO | 0233280 | 4/2002 | |
| WO | 2011015962 A1 | 2/2011 | |

* cited by examiner

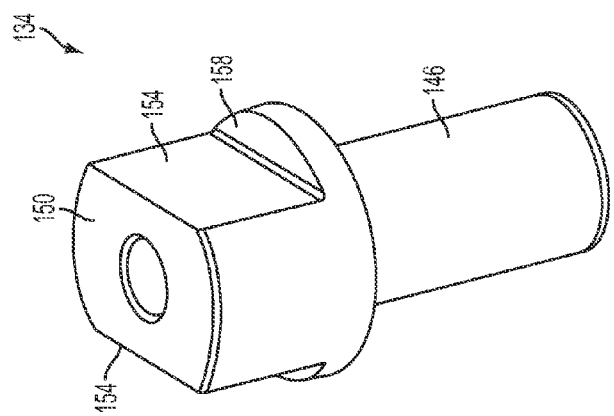
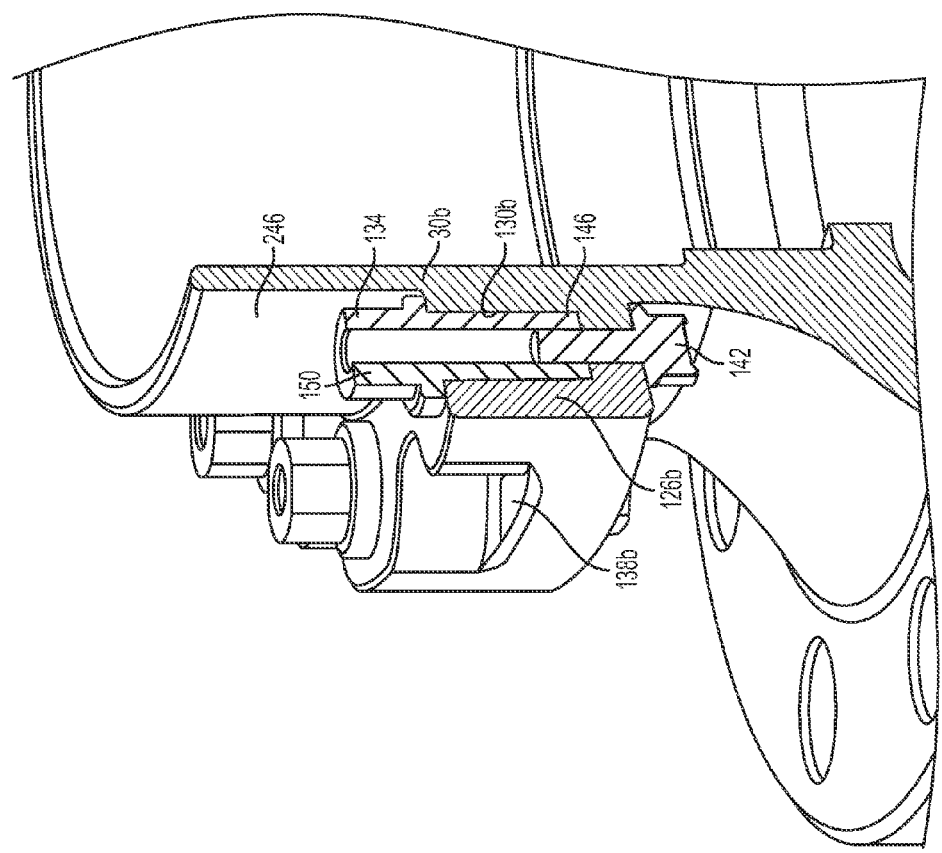

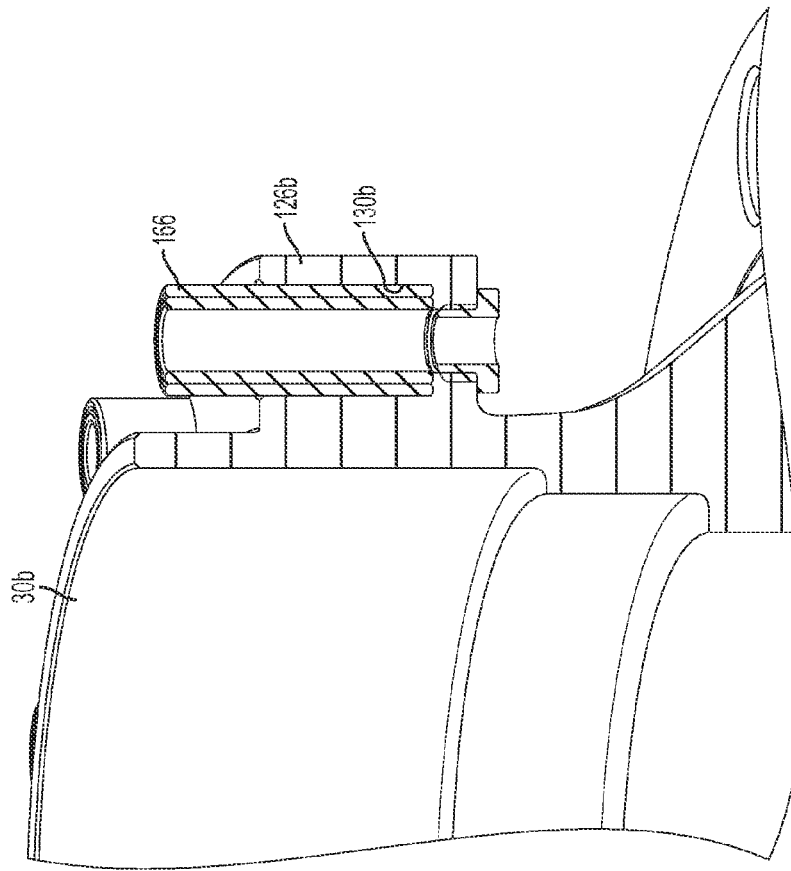
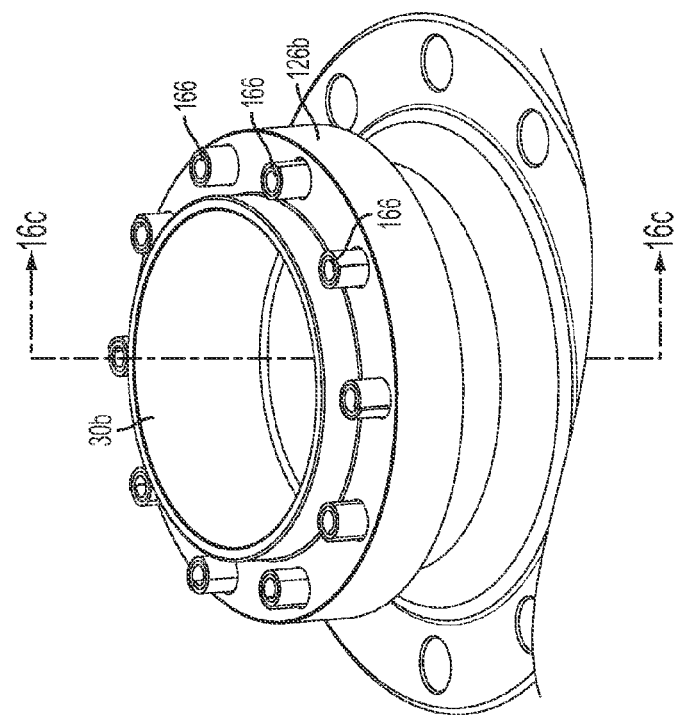

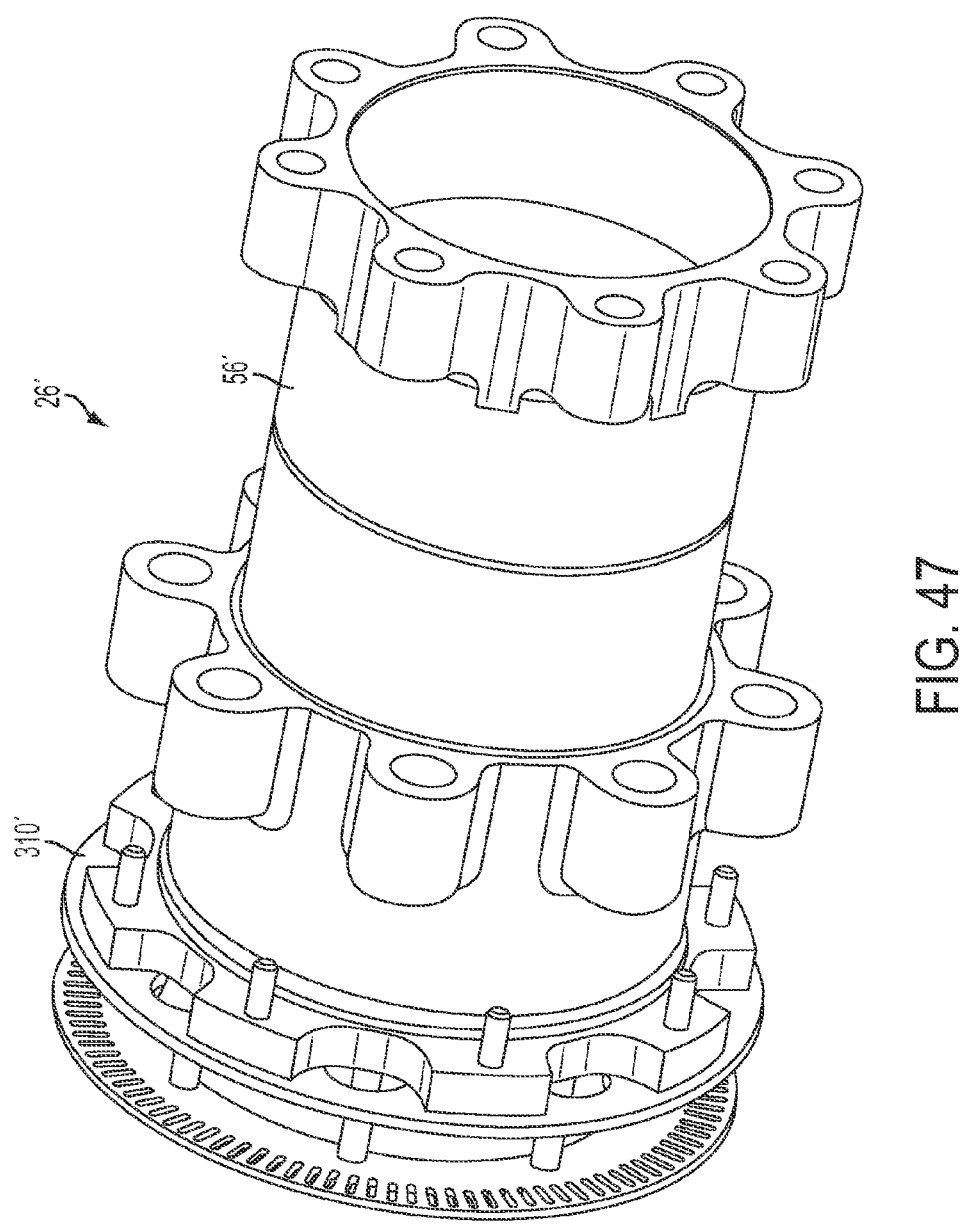

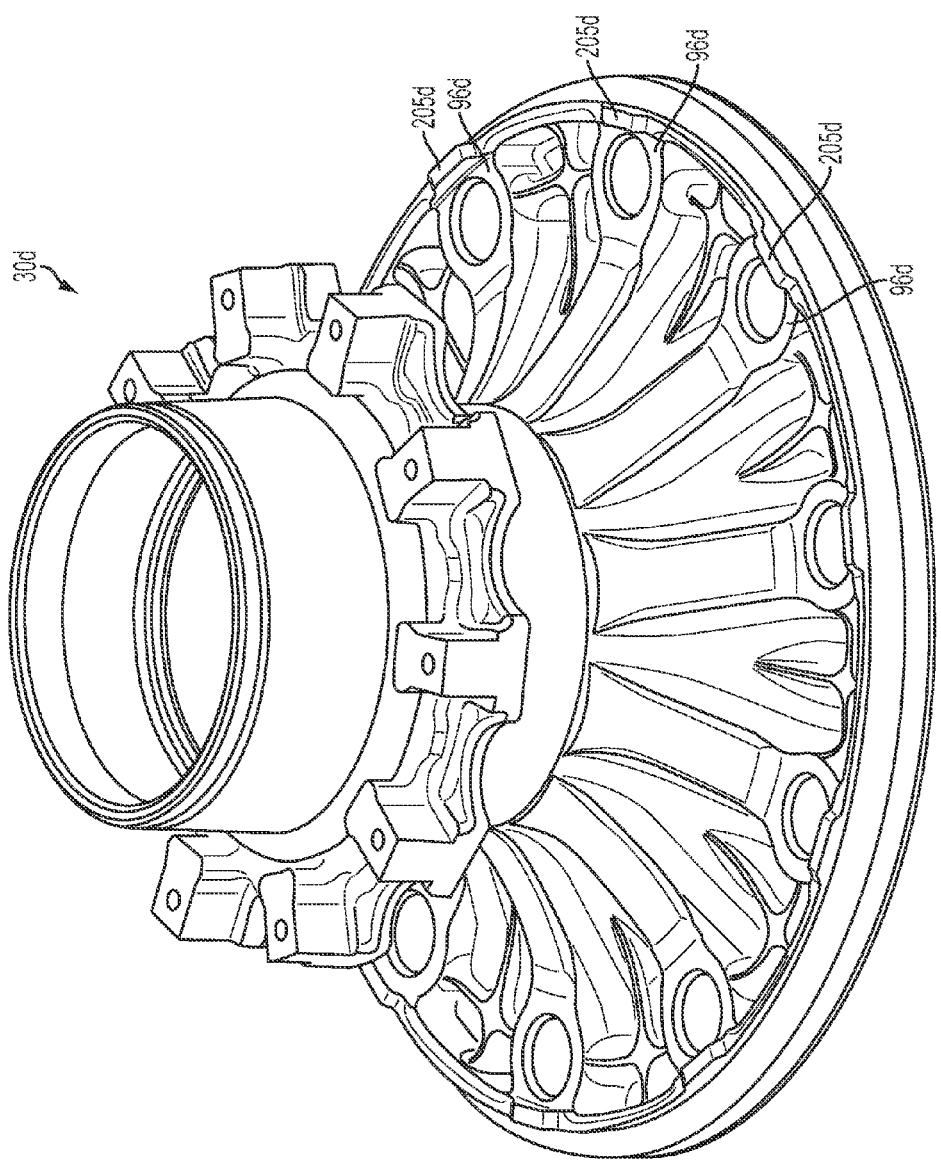

DISK BRAKE HUB ASSEMBLY

CROSS-REFERENCE TO RELATED APPLICATIONS

This application is a continuation-in-part of U.S. Utility patent application Ser. No. 13/077,883, filed on Mar. 31, 2011, the entire contents of which are hereby incorporated by reference.

FIELD OF THE INVENTION

Exemplary embodiments of the present invention are generally related to disk brake hub assemblies. More particularly, in some exemplary embodiments, the present invention provides a disk brake hub assembly with improved thermodynamic isolation.

BACKGROUND

Commercial trucking companies are under enormous pressures to stay financially healthy and need to find new ways to increase the efficiency of their fleet. One way to increase fleet efficiency is to reduce the weight of the wheel hubs in the trucks by creating them from lightweight materials such as aluminum. The high cost of lightweight aluminum hubs relative to conventional cast iron hubs can be offset in a relatively short time by fuel savings and increased cargo capacity. The lightweight and ease of processing makes aluminum an attractive material in weight sensitive systems, but aluminum also has a few drawbacks, namely its ability to easily conduct heat, and the fact that it loses strength rapidly at temperatures over 350 degrees. Not all vehicles are suitable for aluminum wheel hubs, however, so it would also be useful to design a wheel hub composed of iron or other metals that avoids the thermal and strength problems of current disk brake hub assemblies.

Over 95 percent of the semi-tucks and trailers on the road in the United States use drum brake systems. Market and regulatory forces are driving an increase in demand for disk brake systems despite their past reputation as being heavier and more expensive than drum systems. Furthermore, disk brake systems encounter thermal problems. The disks or rotors are the heat sink for a vehicle's kinetic energy that is converted to thermal energy during the braking process. Truck rotors routinely reach temperatures of over 900 degrees and that can cause thermal distortion of the rotors and brake failure. The thermal induced distortion effects need to be considered when designing the rotor mount system.

Simply bolting a flat disk or rotor to a rigid hub exacerbates the rotor's thermal distortion. The mounting bolts constrain the inside diameter of the rotor while the outside diameter is free to grow as the rotor heats up. Having the bolts attached to only one friction face, as in some designs, magnifies the constrained rotor's tendency to distort into a cone shape as it heats up. Excessively coned rotors cause excess wear on the brake pads in addition to accelerating the formation and growth of fatigue cracks in the rotors.

SUMMARY

In some embodiments, the invention provides a brake hub assembly including a brake hub defining a central axis and a brake disk coupled to the brake hub. The brake disk has a first plate, a second plate spaced axially from the first plate, the first plate inboard from the second plate and the second plate having a braking surface, a thickness, and a slot extending radially, and a plurality of ribs extending between the first and second plates to define a plurality of cooling channels therebetween. The brake hub assembly also includes a torque member extending between the hub and disk, the torque member extending axially inboard from the braking surface a distance not more than the thickness of the second plate plus about 50% of the spacing between the first and second plates.

In other embodiments, the invention provides a brake hub assembly including a brake hub defining a central axis and a brake disk coupled to the brake hub. The brake disk has a first braking surface, a second braking surface spaced axially from the first brake surface, the first braking surface inboard from the second braking surface, and a plurality of ribs extending between the first and second braking surfaces to define a plurality of channels extending radially therebetween, each channel having an opening defining an area. The brake hub assembly also includes a torque member transmitting torque between the brake hub and the brake disk, the torque member having an inboard end defining a plane that is parallel to at least one of the first and second braking surfaces, and wherein at least about 50% of the area of the opening is inboard of the plane.

In other embodiments, the invention provides a brake hub assembly couplable to the axle of a vehicle, the brake hub assembly including a brake hub defining a central axis and a brake disk coupled to the brake hub. The brake disk has a first plate with a first braking surface and a first inner diameter, and a second plate spaced axially from the first plate, the second plate having a second braking surface, a second inner diameter and defining an inner circumference. Where the brake disk and brake hub are co-axially aligned along the central axis with no more than about 20% of the inner circumference of the second plate in contact with the brake hub.

In another embodiment, the invention provides a brake hub assembly couplable to the axle of a vehicle, the brake hub assembly including a brake hub defining a central axis and having an axial qualifying surface and a brake disk coupled to the brake hub. The brake disk has a first braking surface and a second braking surface spaced axially from the first brake surface. The brake hub assembly also includes a plurality of torque members, each for transmitting torque between the brake disk and the brake hub, and an axial preload spring having a plurality of base portions each coupled to a corresponding torque member, and where the axial preload spring is configured to bias the brake disk towards the axial qualifying surface.

In another embodiment, the invention provides a brake hub assembly including a brake hub defining a central axis and a brake disk coupled to the brake hub. The brake disk has a first braking surface, a second braking surface spaced axially from the first brake surface, the first braking surface inboard from the second braking surface, and a plurality of ribs extending between the first and second braking surfaces to define a plurality of channels extending radially therebetween, each channel having an opening with an inboard edge. The brake hub assembly also includes a torque member transmitting torque between the brake hub and the brake disk, the torque member having an inboard end, and where the inboard end does not extend axially beyond the inboard edge of the opening.

BRIEF DESCRIPTION OF THE DRAWINGS

Other objects, features, advantages and details appear, by way of example only, in the following detailed description of embodiments, the detailed description referring to the drawings in which:

FIG. 11 is a section view taken along line 11-11 of FIG. 10.

FIG. 12 is a perspective view of a torque pin of the brake hub assembly of FIG. 6.

FIG. 16b illustrates a cylindrical coil spring installed on a brake hub.

FIG. 16c is a section view taken along line 16c-16c of FIG. 16b.

FIGS. 46a, 46b and 47 illustrate a perspective view of the brake hub assembly of FIG. 37 with the stopping plate and axial preload spring in different positions.

FIG. 48 illustrates a perspective view of the brake hub assembly of FIG. 26 with added anti-rotation tabs.

DESCRIPTION OF THE EMBODIMENTS

Exemplary embodiments of the present invention provide systems and methods for providing a disk brake hub assembly with improved thermodynamic isolation. In some exemplary embodiments, the systems and methods include torque members, spacers, and various other improvements to minimize the amount of heat transferred from the brake disk to the brake hub. Furthermore, some embodiments of the hub assembly utilize lightweight materials, such as aluminum, to minimize rotating mass and increase efficiency.

Figure 1:
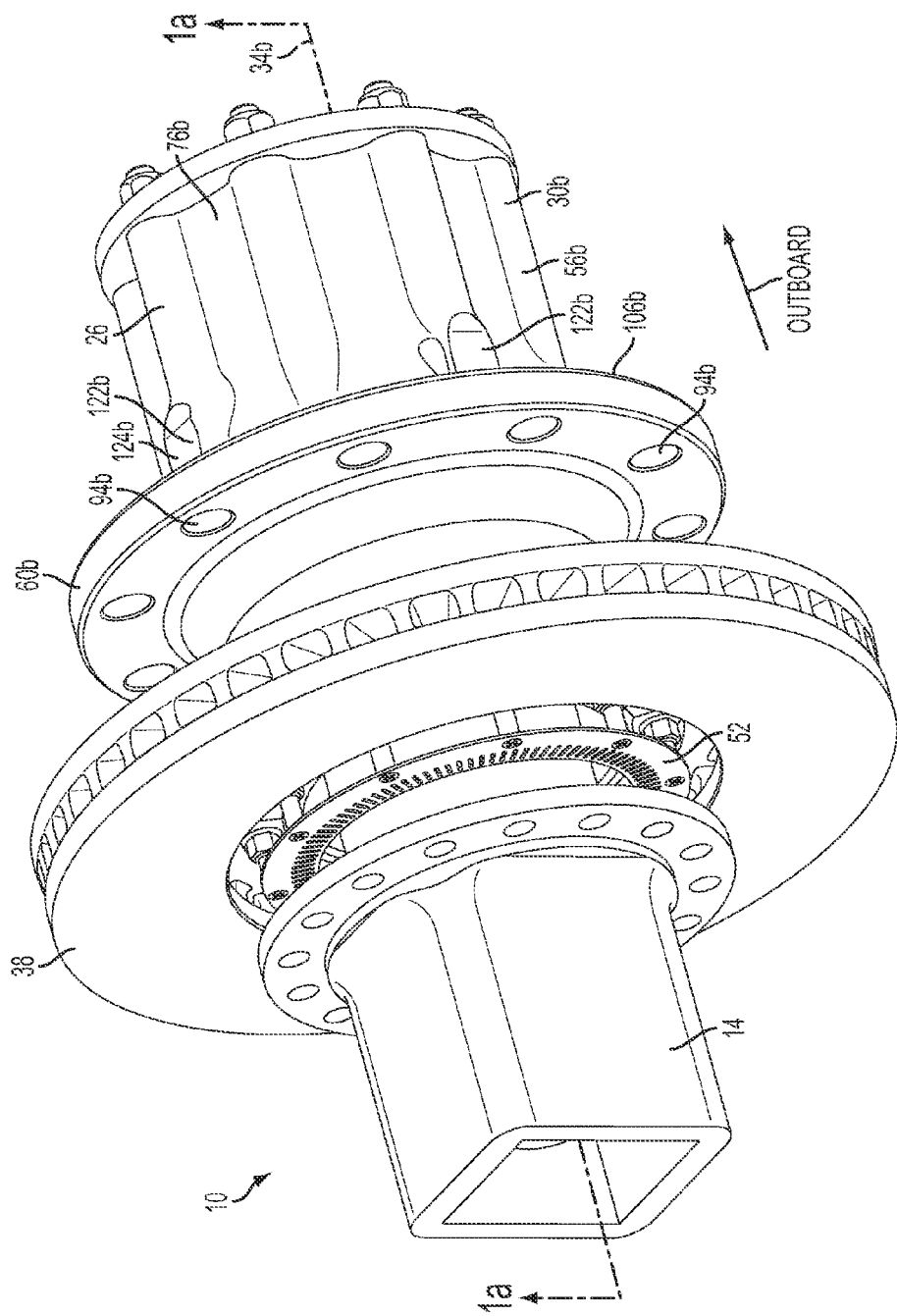
FIG. 1 illustrates a brake hub assembly installed on the suspension of a motor vehicle.
Figure 1A:
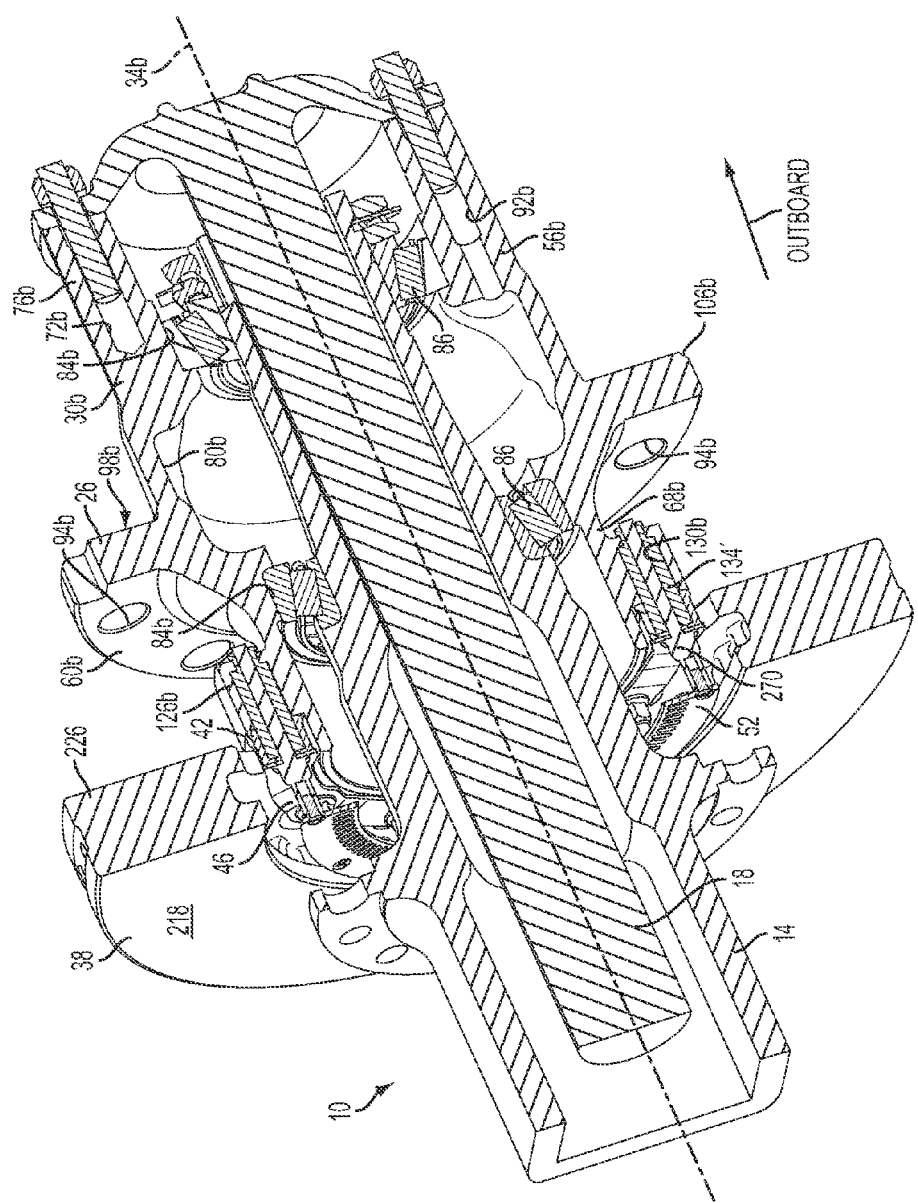
FIG. 1a is a section view taken along lines 1a-1a of FIG. 1.
Figure 2:
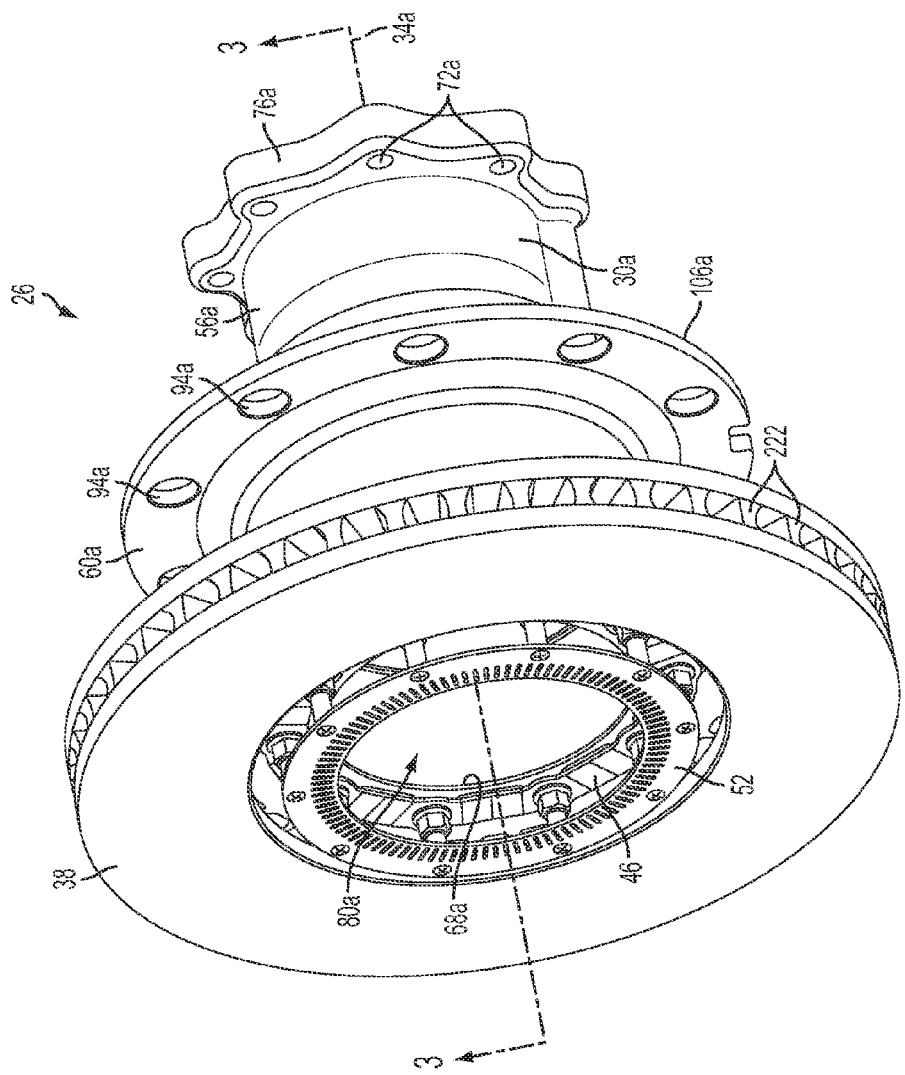
FIG. 2 is a perspective view of a first hub embodiment of a brake hub assembly.

FIGS. 1 and 1a illustrate a motor vehicle 10, such as a car, truck, van, or the like having an axle tube assembly 14 that includes a drive axle 18, a brake caliper (not shown), and a disk brake hub assembly 26 rotateably mounted on the drive axle 18 and in mechanical communication with the caliper. During operation of the vehicle 10, one or more wheels (not shown) are typically mounted on and supported by the hub assembly 26 for rotation about an axis.

FIGS. 1-31, 50a and 50b illustrate various embodiments of the disk brake hub assembly 26 with improved thermodynamic isolation. In general, each assembly 26 includes a hub 30a, 30b, 30c, 30d, 30e defining a central axis, a brake disk 38 coupled to the hub via a plurality of torque members 42, an axial preload spring 46, and a tone ring 52. During operation of the vehicle, the wheel and hub assembly 26 rotate as a single unit about the central axis.

During operation, the user is able to control or otherwise limit the rotation of the hub assembly 26 and wheel with respect to the axle tube assembly 14 by actuating the brake caliper. More specifically, when the user actuates the caliper (e.g., by pressing the brake pedal), the caliper engages the brake disk 38 of the hub assembly 26, creating friction that acts against the rotation of the hub. The friction also creates large amounts of heat, which in turn causes the brake disk 38 to rise in temperature, sometimes in excess of 900 degrees. Since the hub typically contains thermally sensitive elements, such as bearings, seals, and the like, it is important that the brake disk 38 be thermally isolated from the hub to limit the amount of heat that is transferred between them. This is especially important in brake hub assemblies where the hub is formed from aluminum alloys or other highly thermally conductive materials, since the heat will more easily be conducted to the sensitive elements of the assembly 26 and cause damage. In addition to potentially damaging the sensitive elements of the hub, excessive heat from the brake disk 38 can also compromise the integrity of the hub itself, since aluminum begins to substantially weaken when heated above 350 degrees Fahrenheit. More specifically, aluminum begins to become noticeably weaker at 300 degrees Fahrenheit and progressively more dramatic as temperature exceeds 350 degrees Fahrenheit.

Furthermore, the varying thermal loads experienced by the brake disk 38 in each braking cycle cause the disk 38 to thermally expand and contract. Since the hub is separately constructed from the disk 38, the disk 38 experiences a much wider range of temperatures compared to the hub. Given the differences in temperature variation and thermodynamic properties, the brake disk 38 will actually expand and shrink relative to the hub. The present assembly enables the brake disk 38 to "float" with respect to the hub, both axially and radially, limiting the stresses produced during the braking cycle while still allowing the braking torque to be transferred between the two elements. To assure the orientation of the disk 38 is maintained during use, the hub 30a, 30b, 30c, 30d, 30e includes an axial qualifying surface to position the disk 38 with respect to the hub and the central axis. When the hub is assembled, the disk 38 is in contact with the axial qualifying surface, which in turn assures the disk 38 is substantially perpendicular the central axis.

A first hub embodiment 30a of the hub assembly 26 is shown in FIGS. 2-5. The hub 30a is formed (e.g., cast) of austempered ductile iron for strength and durability. In the illustrated embodiment, the hub 30a includes a substantially cylindrical body 56a, a wheel flange 60a extending generally radially from the body 56a at about the axial center of the hub 30a, and a plurality of torque members 42, which in this embodiment are torque lugs 64a, proximate the inboard end 68a of hub 30a. The hub also includes a set of threaded apertures 72a proximate the outboard end 76a of the hub 30a to which the drive axle 18 may be attached.

Figure 3:
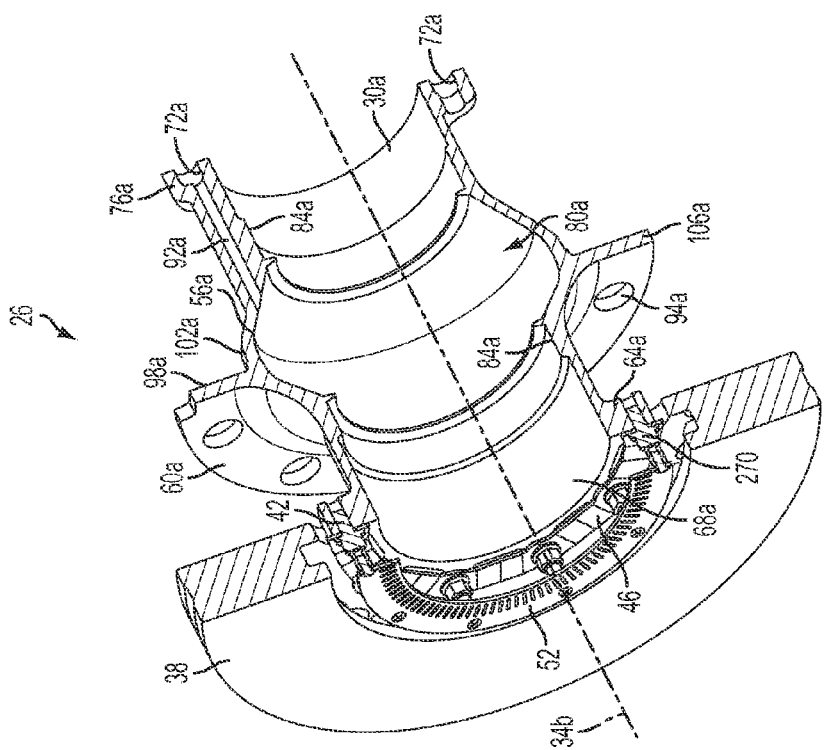
FIG. 3 is a section view taken along lines 3-3 of FIG. 2.

As best shown in FIG. 3, the body 56a of the hub 30a defines an interior recess 80a, extending co-axially with the central axis 34a through the body 56a. The recess 80a includes one or more (e.g., two) bearing seats 84a, each sized to receive a respective bearing 86 (see FIG. 1a) of the bearing assembly, and may include one or more seal seats each sized to receive a respective seal, or one or more locking channels each sized to receive a locking ring. In the illustrated embodiment, the body 56a also includes a lube channel 92a, extending between one of the threaded apertures 72a and the recess 80a to monitor and maintain the fluid levels within the hub 30a.

Figure 49:
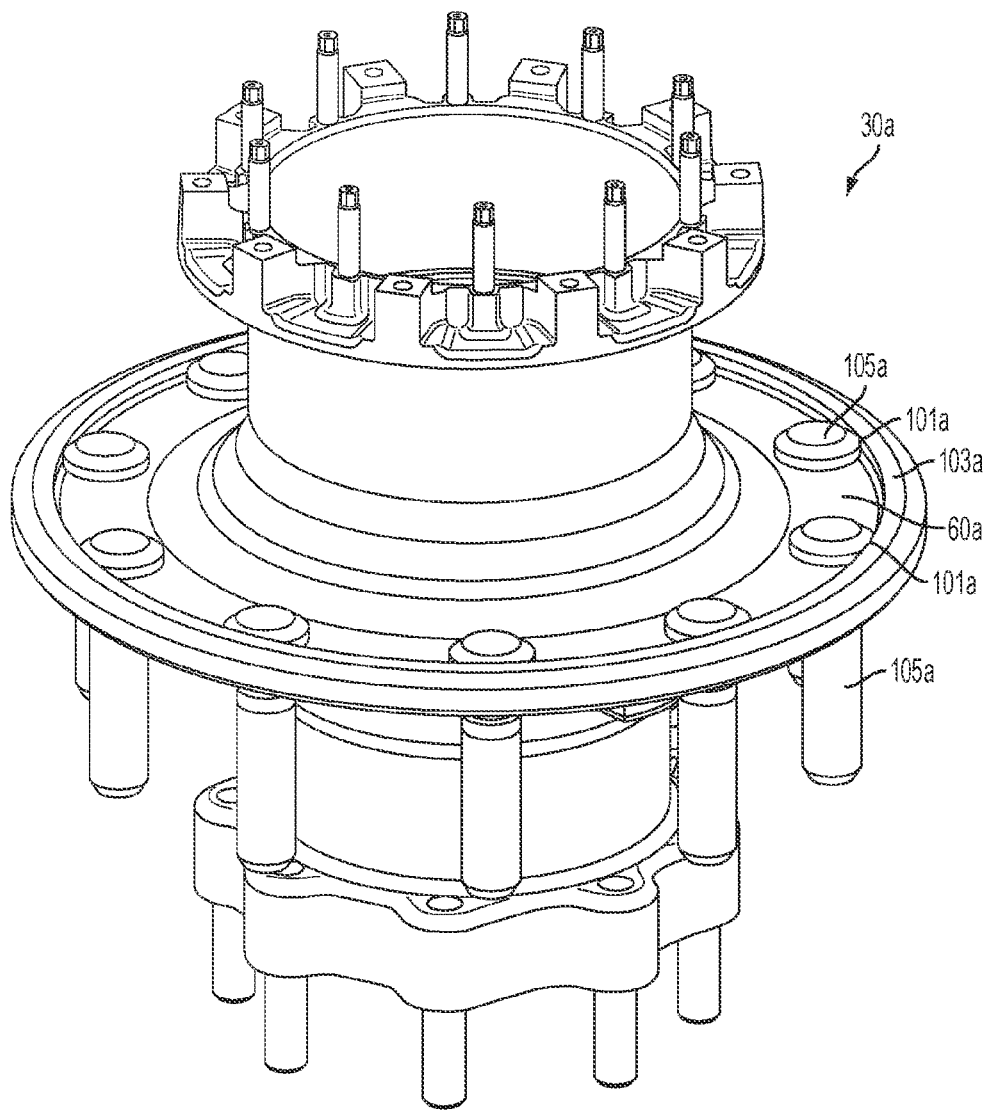
FIG. 49 illustrates a perspective view of the brake hub assembly of FIG. 3 with added torque ridge.
Figure 49A:
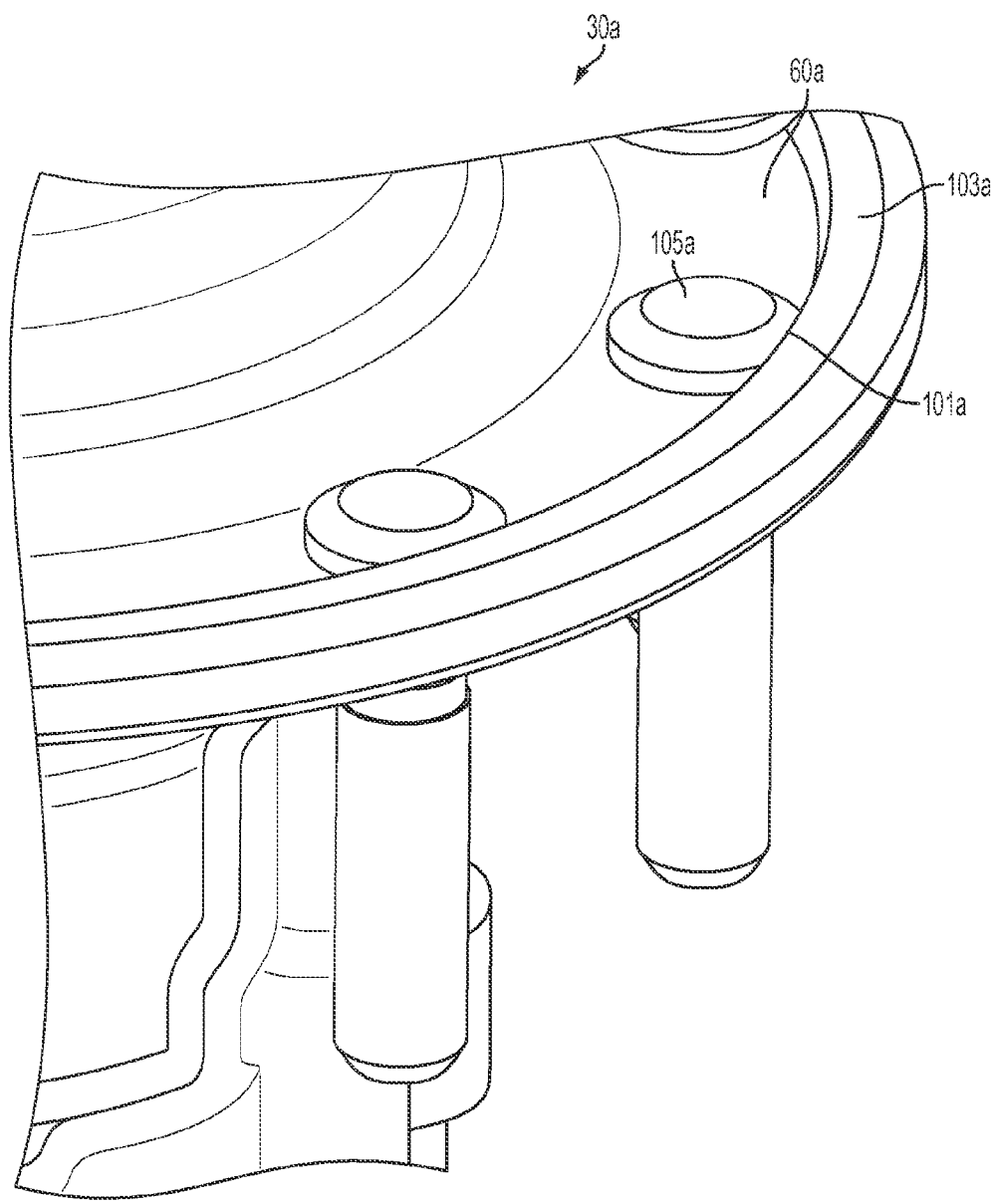
FIG. 49a is a detailed perspective view of the brake hub assembly shown in FIG. 49.

The wheel flange 60a defines a plurality wheel stud apertures 94a, each configured to receive a wheel stud (not shown) for securing the wheel to the hub 30a. The number and position of the apertures 94a generally correspond to the bolt pattern of the respective wheel. Furthermore, the mounting surface 98a of the wheel flange 60a is generally machined or finished to assure that the surface 98a is accurately aligned with the axis 34a of the hub 30a, so that the wheel is properly positioned during use. The hub 30a also includes a wheel pilot surface 102a, extending axially from the radially inward edge of the flange 60a to assure the wheel is co-axial with the central axis 34a. The hub 30a may also include an anti-rotation ridge 103a extending along the periphery of the wheel flange 60a and configured to contact the flattened surface 101a of each wheel lug 105a to restrict rotation of wheel lugs 105a with respect to the flange 60a (see FIGS. 49 and 49a).

Figure 5:
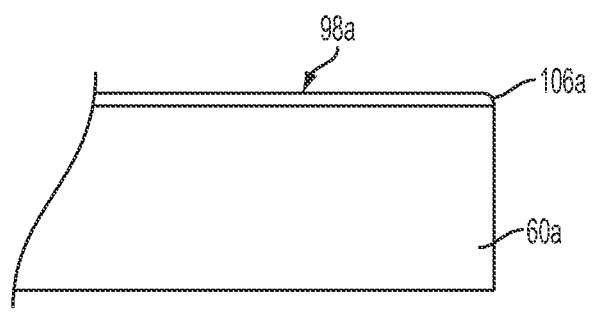
FIG. 5. is a detailed view of the wheel mount flange of the brake hub assembly of FIG. 2.

Illustrated in FIG. 5, the outboard edge 106a of the wheel flange 60a may be radiused, or curved to substantially conform to the axial deflection of the wheel's rim or disk face under a side load. Ideally, the curve of the outboard edge 106a substantially matches the natural deflection of the rim to reduce residual stress within the rim and minimize the tendency of the rim to crack after exposure to repeated side loads. In the present invention, the shape of the outboard edge 106a causes the point of contact between the hub and the wheel rim to move, albeit slightly, to help distribute the stress load over a larger area. More specifically, as the side load on the rim increases, the point of contact between the rim and the outboard edge 106a moves radially outwardly.

In the illustrated embodiment, the outboard edge 106a includes a smooth transition from the substantially planar wheel mounting surface 98a to a cubic (third order) curve that substantially conforms to the deflection of the wheel's disk face when under side load. The cubic curve then smoothly transitions into a different, sharper curve. Stated differently, the rim is designed for a certain, maximum side load capacity. When the rim is exposed to a side load twice the maximum (e.g., such as when hitting a pot hole), the rim deflects placing the point of contact between the rim and the outboard edge 106a at a first point (not shown) substantially corresponding with the transition between the first, shallower cubic curve and the second, sharper curve. In the illustrated embodiment, the second curve may include any combination of elliptical, parabolic, linear, circular or other curve types. Alternatively, the first curve may also include any combination of elliptical, parabolic, linear, circular, or other curve types.

In the illustrated embodiment, a smooth transition is defined as one where a graph of the slope of the curve over the transition is continuous throughout. Stated differently, the slope curve at the intersection of the mounting surface 98a and the outboard edge 106a does not have a discontinuity.

Figure 4:
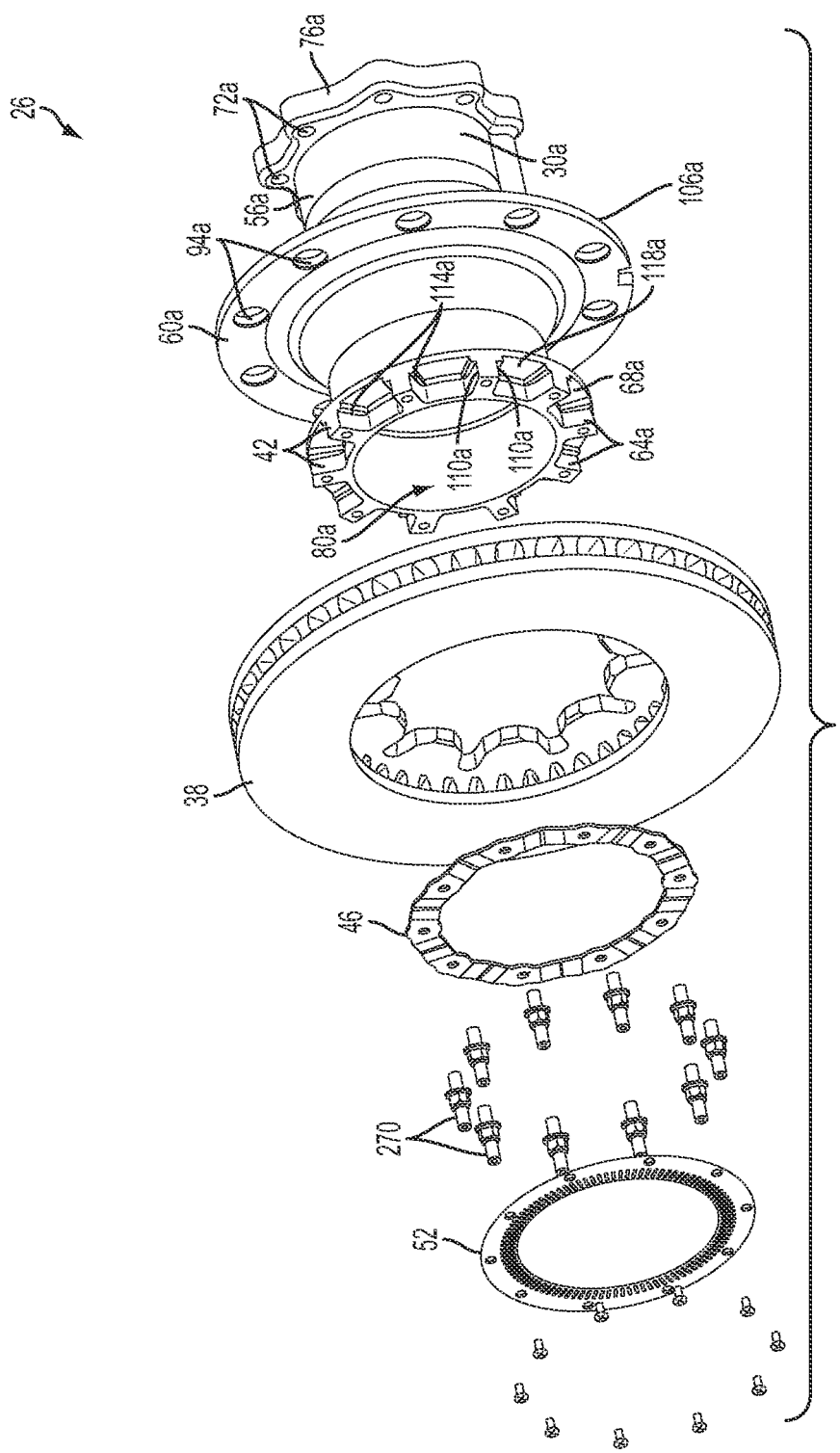
FIG. 4 is an assembly view of the brake hub assembly of FIG. 2.
Figure 4A:
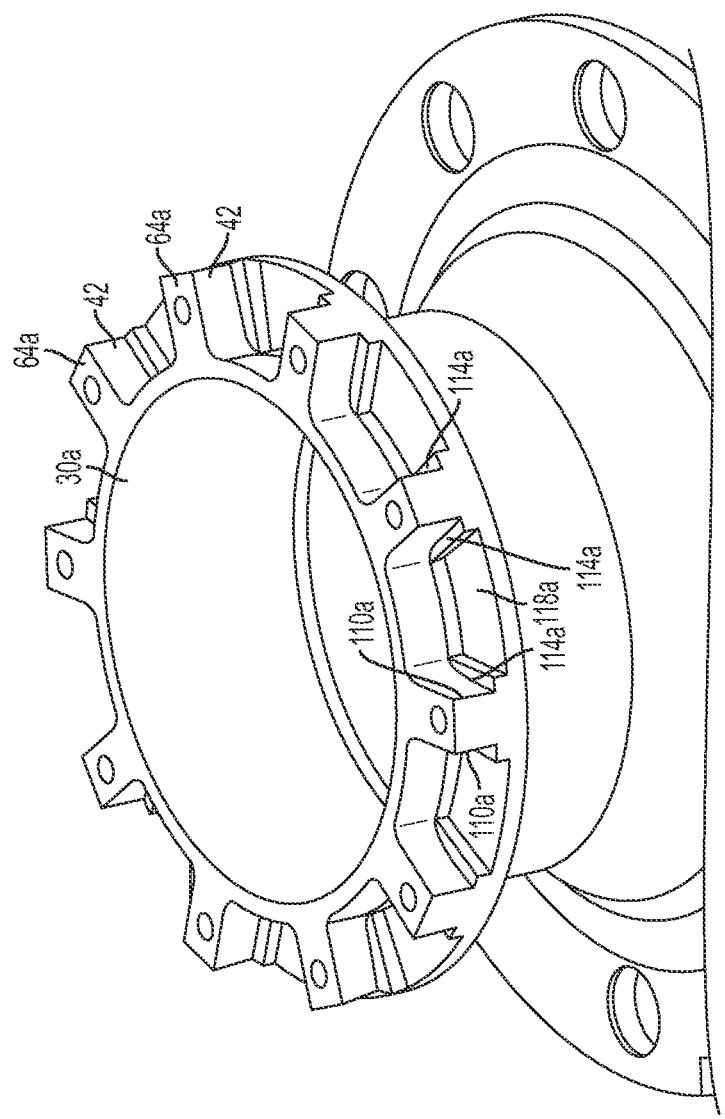
FIG. 4a is a detailed view of the torque members of the brake hub assembly of FIG. 2.

The first hub embodiment 30a also includes a plurality (e.g., ten) of torque lugs 64a, each formed integrally with the body 56a and extending radially outwardly proximate the inboard end 68a. Each torque lug 64a of the first hub embodiment 30a is substantially rectangular in shape, having a pair of flat, substantially parallel side walls 110a and sized to fit within and move along a corresponding radial slot 254 formed by the brake disk 38 (described below). Each torque lug 64a also includes a support ledge 114a extending along the side walls 110a on which the second braking surface 226 of the brake disk 38 rests when installed (see FIG. 4a). In the illustrated embodiment, the ledges 114a create the axial qualifying surface for the hub 30a.

The ledges 114a are also sized to space the brake disk 38 a distance from the webbing 118a extending between each pair of torque lugs 64a while also creating a gap therebetween. Ultimately, the ledges 114a minimize the amount of contact area between the brake disk 38 and the hub 30a as well as produce a gap for air to circulate.

FIGS. 6-9 illustrate a second hub embodiment 30b of the hub assembly 26 formed (e.g., cast) from an aluminum alloy to produce a low rotational mass. In the second hub embodiment 30b, the hub employs much of the same structure and has many of the same properties as the previously-described hub 30a shown in FIGS. 2-5. Analogous elements to those of the first embodiment have been given the same number and a reference letter "b". The following description of the hub 30b focuses primarily upon structure and features different than the previously-described embodiment.

Figure 6:
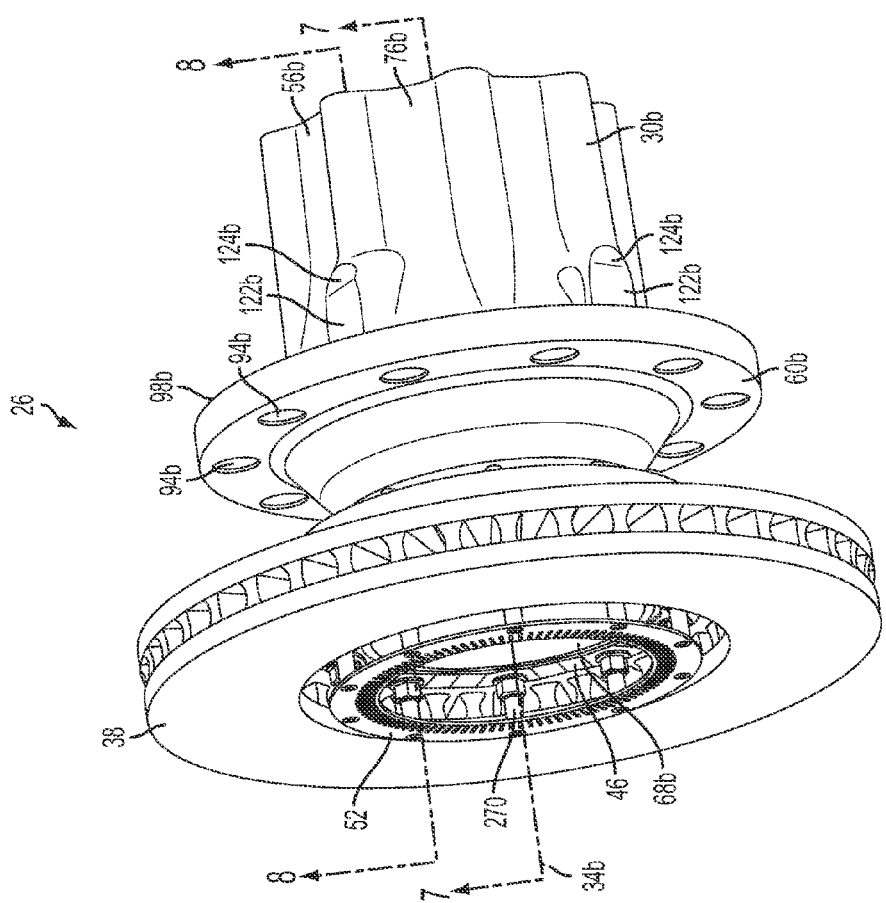
FIG. 6 is a perspective view of a second hub embodiment of the brake hub assembly.
Figure 7:
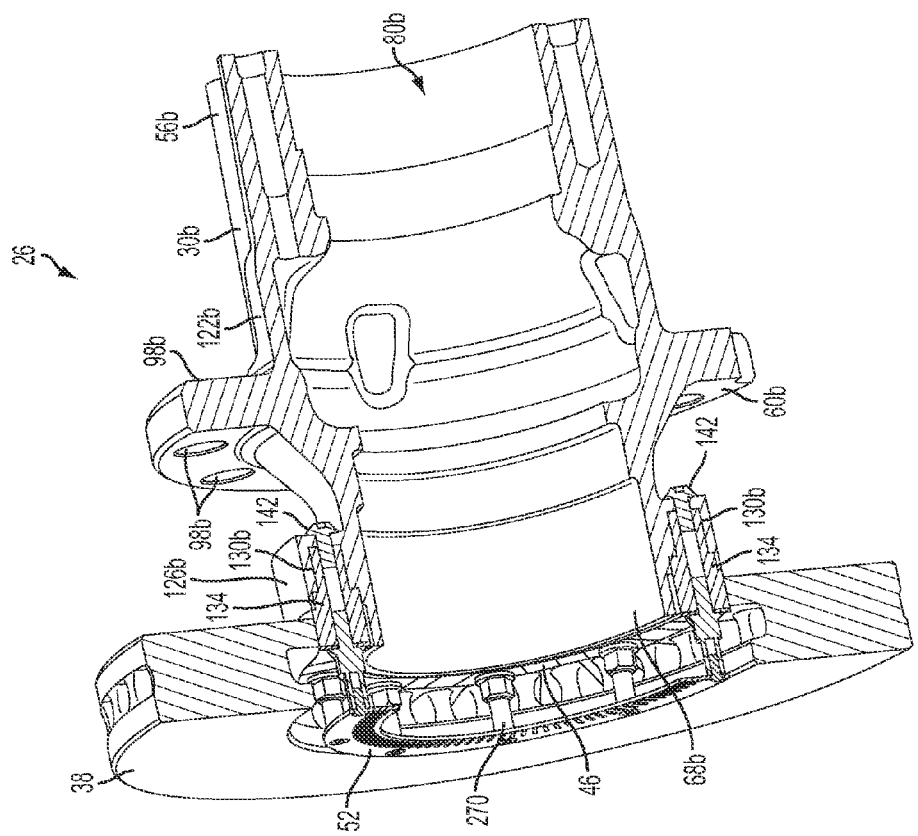
FIG. 7 is a section view taken along lines 7-7 of FIG. 6.
Figure 8:
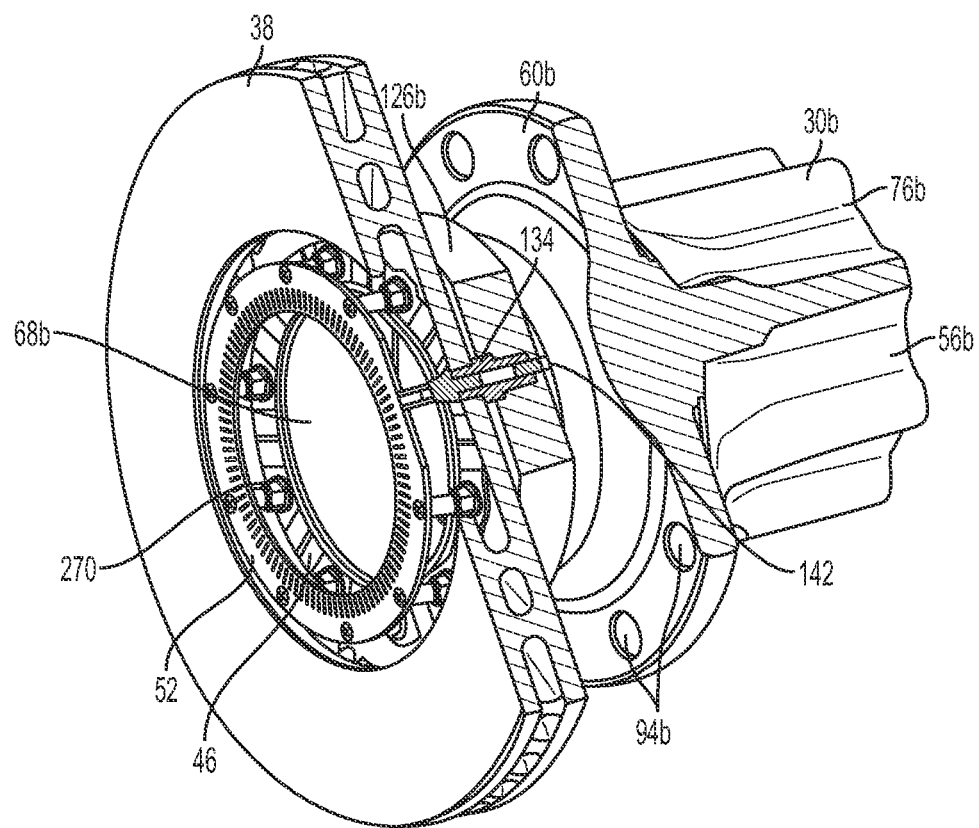
FIG. 8 is a section view taken along lines 8-8 of FIG. 6.
Figure 9:
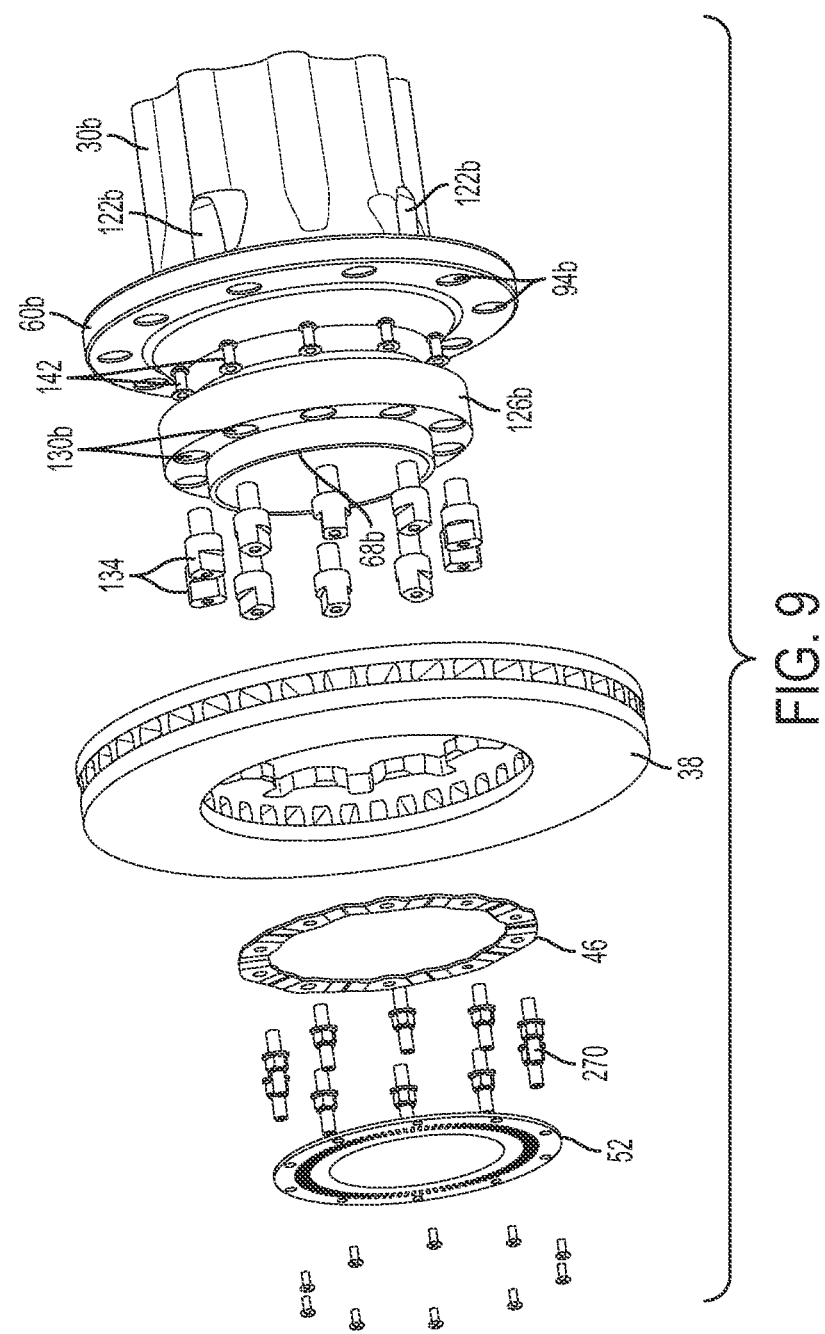
FIG. 9 is an assembly view of the brake hub assembly of FIG. 6.
Figure 10:
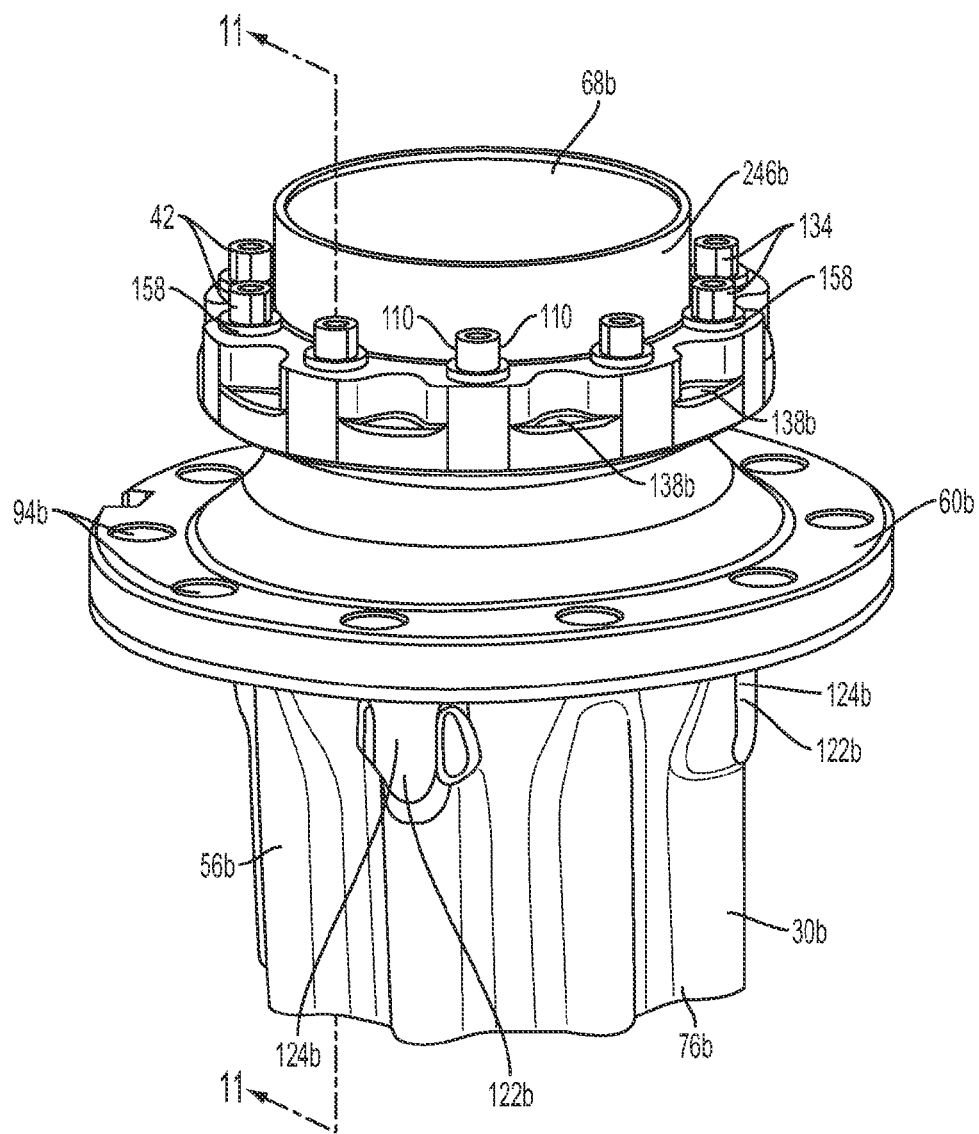
FIG. 10 is a perspective view of the brake hub assembly of FIG. 6 with the brake disk removed and notches added.
Figure 13:
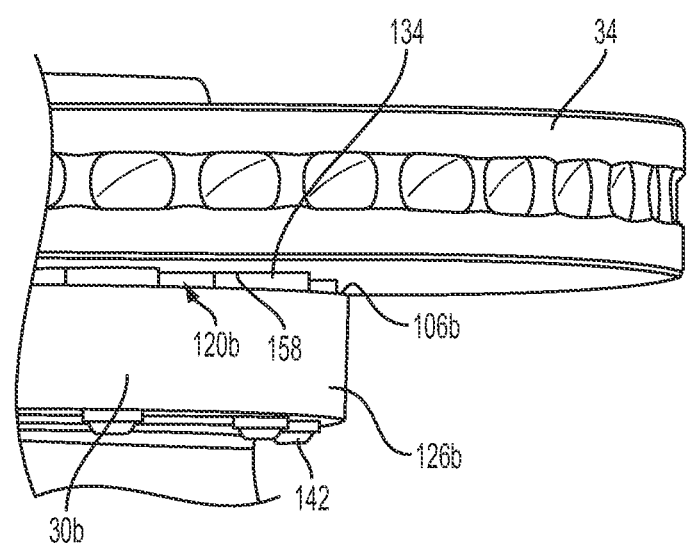
FIG. 13 is a detailed view of a brake disk installed on the brake hub assembly of FIG. 6.

Best illustrated in FIG. 6, the hub 30b includes a plurality of wheel pilots 122b, positioned on the outer surface of the hub body 56b. The wheel pilots 122b are generally positioned axially adjacent and outboard from the mounting surface 98b of the wheel flange 60b and are spaced equally along the circumference of the hub 30b. During use, the wheel pilots 122b center the wheel with the axis of rotation 34b. In the illustrated embodiment, each wheel pilot 122b includes a machined pad 124b extending from the hub body 56b. However, the wheel pilots 122b may be formed separately and subsequently installed on the hub 30b.

The second hub embodiment 30b also includes a mounting flange 126b extending radially outwardly from the body 56b proximate the inboard end 68b of the hub body 56b. The mounting flange 126b defines a plurality of apertures 130b, each of which are sized to receive a corresponding torque pin 134 (described below). In the illustrated embodiment, the mounting flange 126b is substantially cylindrical in shape (see FIG. 9), however, the mounting flange 126b may include one or more recesses or notches 138b (see FIG. 10) to allow additional spacing from the brake disk 38 and promote airflow. The spacing pads (not shown) may be integrally formed on the mounting flange 126b to minimize the contact area between the hub 30b and the disk 38.

The second embodiment of the hub 30b also includes a plurality of torque members 42 comprised of torque pins 134, each press fit into an aperture 130b of the mounting flange 126b and secured by a fastener 142 (see FIG. 11). In the illustrated embodiment, each torque pin 134 is formed from cylindrical metal (e.g., steel, stainless steel, and the like) and includes a shank 146 sized to be received within an aperture 130b of the mounting flange 126b, and a head 150 engageable with the brake disk 38 (see FIG. 12). In the illustrated embodiment, the torque pins 134 are composed of a material having a thermal conductivity that is lower (e.g., between about 2% and about 25%) than that material of the hub.

The head 150 of the torque pin 134 generally includes a pair of substantially parallel side walls or flats 154. The side walls 154 are cut into the head 150 so the circumferential contact area between the pin 134 and the brake disk 38 is large enough to produce contact stresses below the yield point of the brake disk and pin materials. If the circumferential contact area is too small, deformation of the brake disk and pin may occur.

Figure 14:
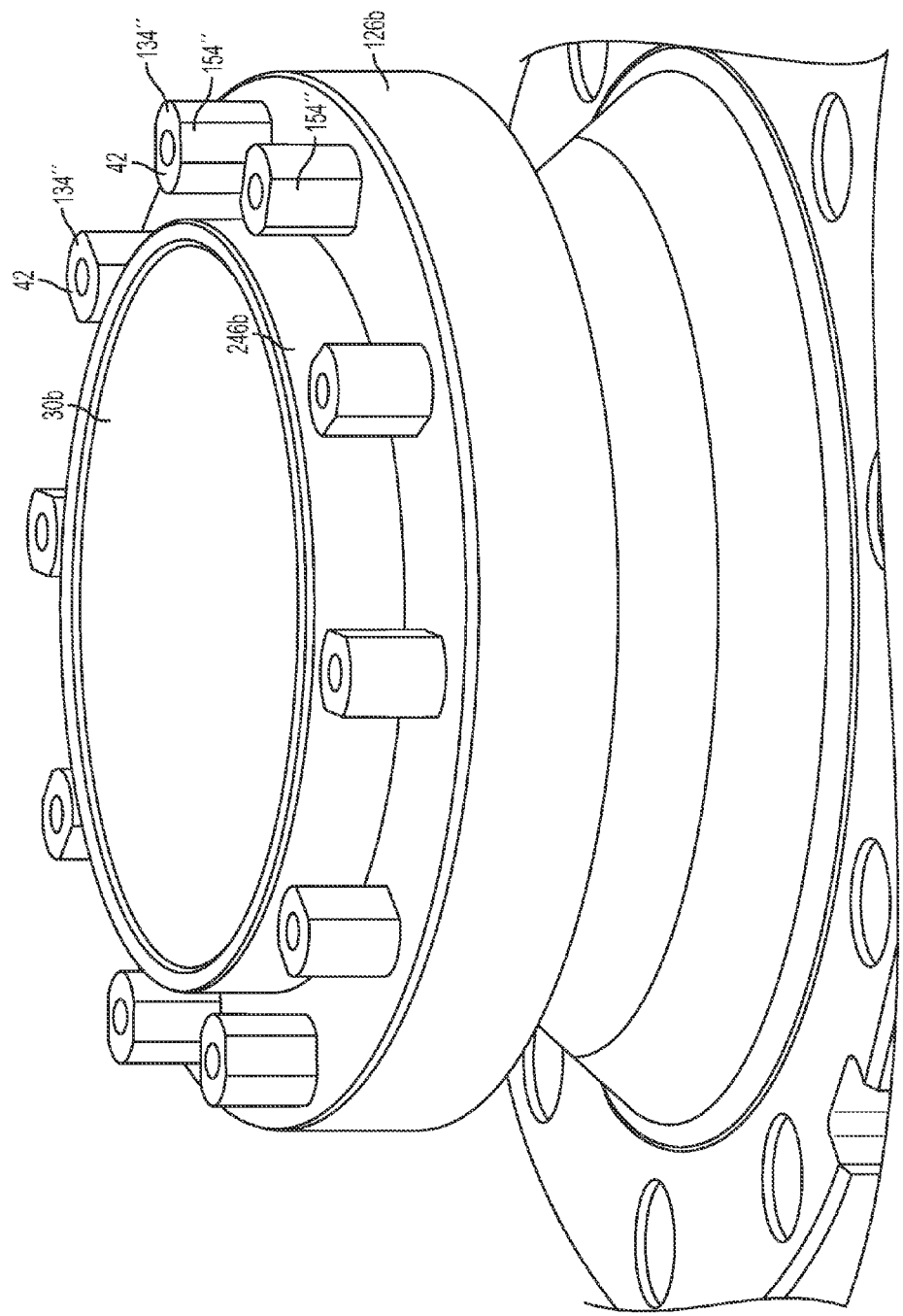
FIG. 14 is a perspective view of a spacerless torque pin installed on the brake hub assembly of FIG. 6.
Figure 14A:
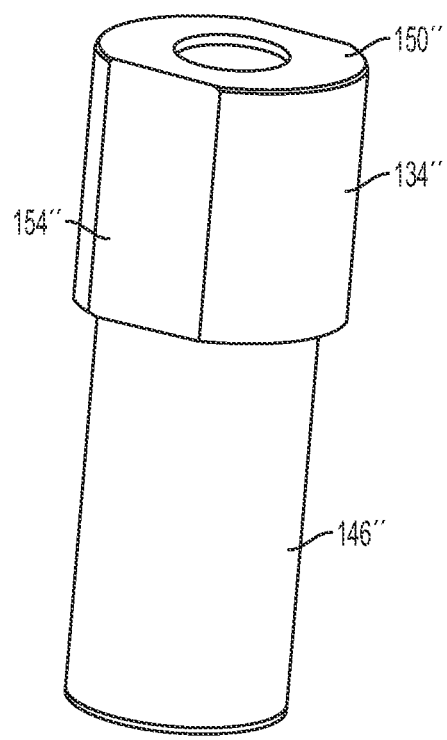
FIG. 14a is a perspective view of a spacerless torque pin.
Figure 15:
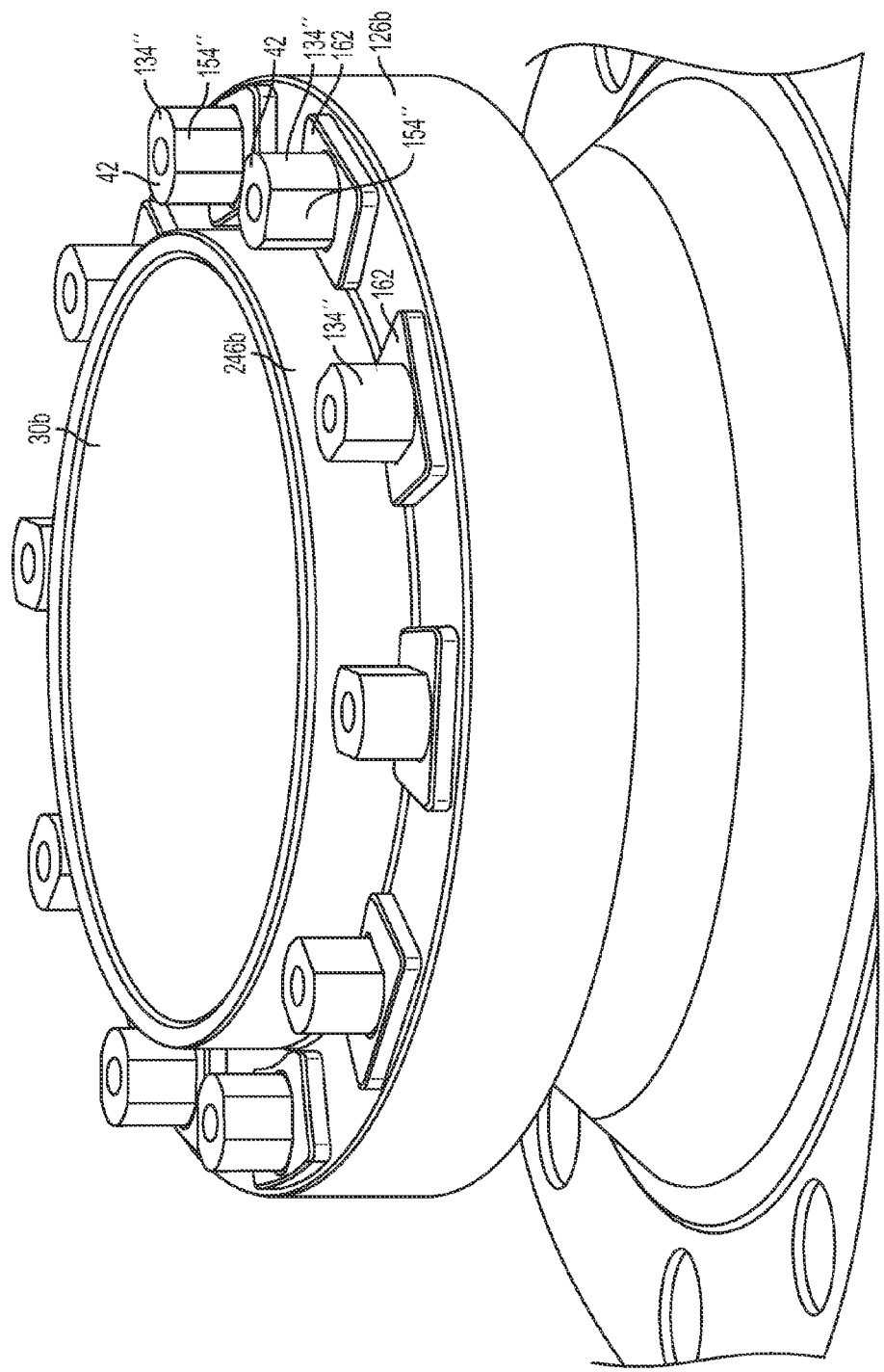
FIG. 15 is a detailed view of a spacerless torque pin mounted to the wheel hub assembly of FIG. 6 with a separate spacer.

In some embodiments (see FIGS. 12 and 13), each torque pin 134 may also include an integral spacer 158 between the shank 146 and the head 150 to space the brake disk 38 a distance equal to the thickness of the spacer from the hub 30b (e.g., form a gap 120b) and minimize the contact area between the hub 30b and the disk 38. The spacer 158 also minimizes the amount of wear experienced by the softer, aluminum hub. However, no spacer may be present on the torque pin 134" (see FIGS. 14 and 14a). Furthermore, a spacerless torque pin 134" may be used in conjunction with a separate spacer 162 (see FIG. 15). The spacer 162 may be formed of one or more stacked sheets of high thermal resistance or wear resistant material such as a ceramic spacer sandwiched between two thin steel layers (not shown).

Figure 16A:
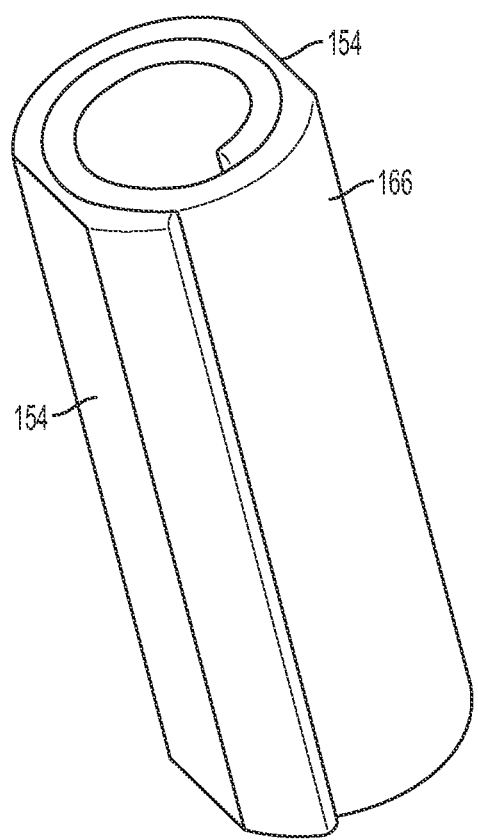
FIG. 16a illustrates a cylindrical coil spring.
Figure 17:
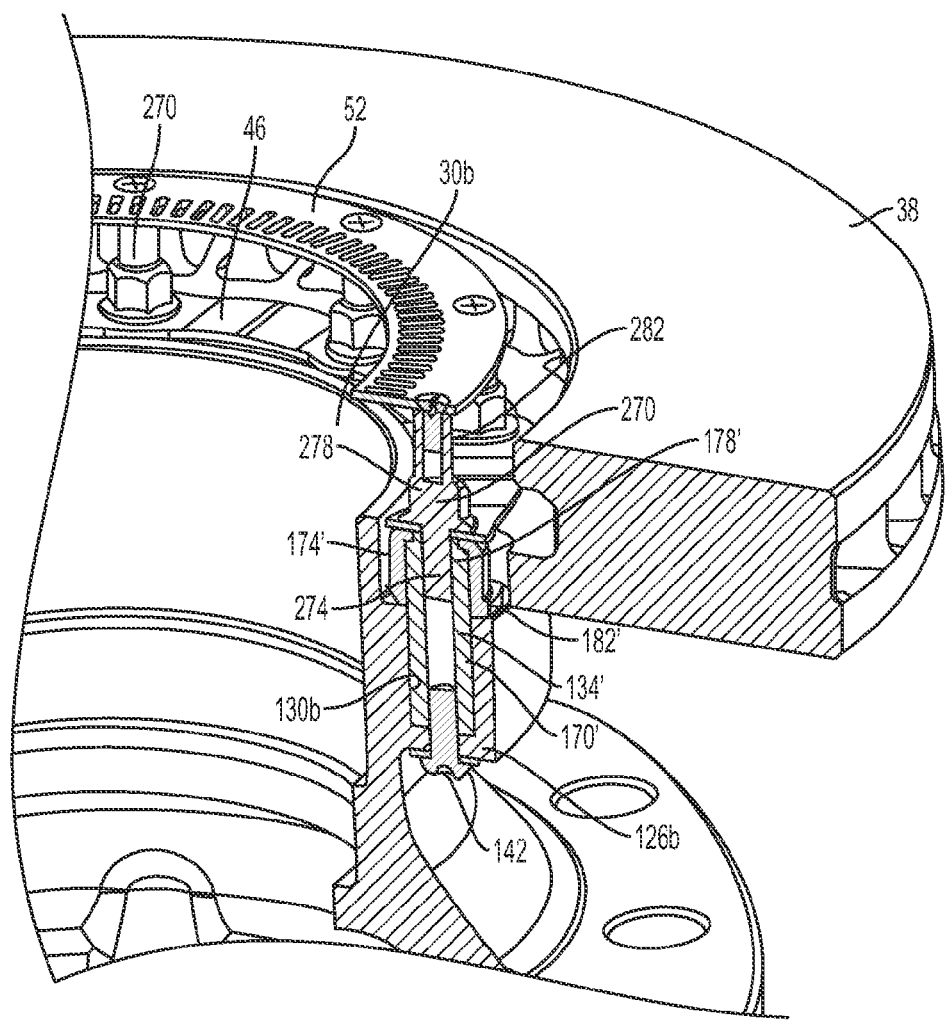
FIG. 17-19 illustrate multiple forms of installing a multi-piece torque pin on a brake hub.
Figure 18:
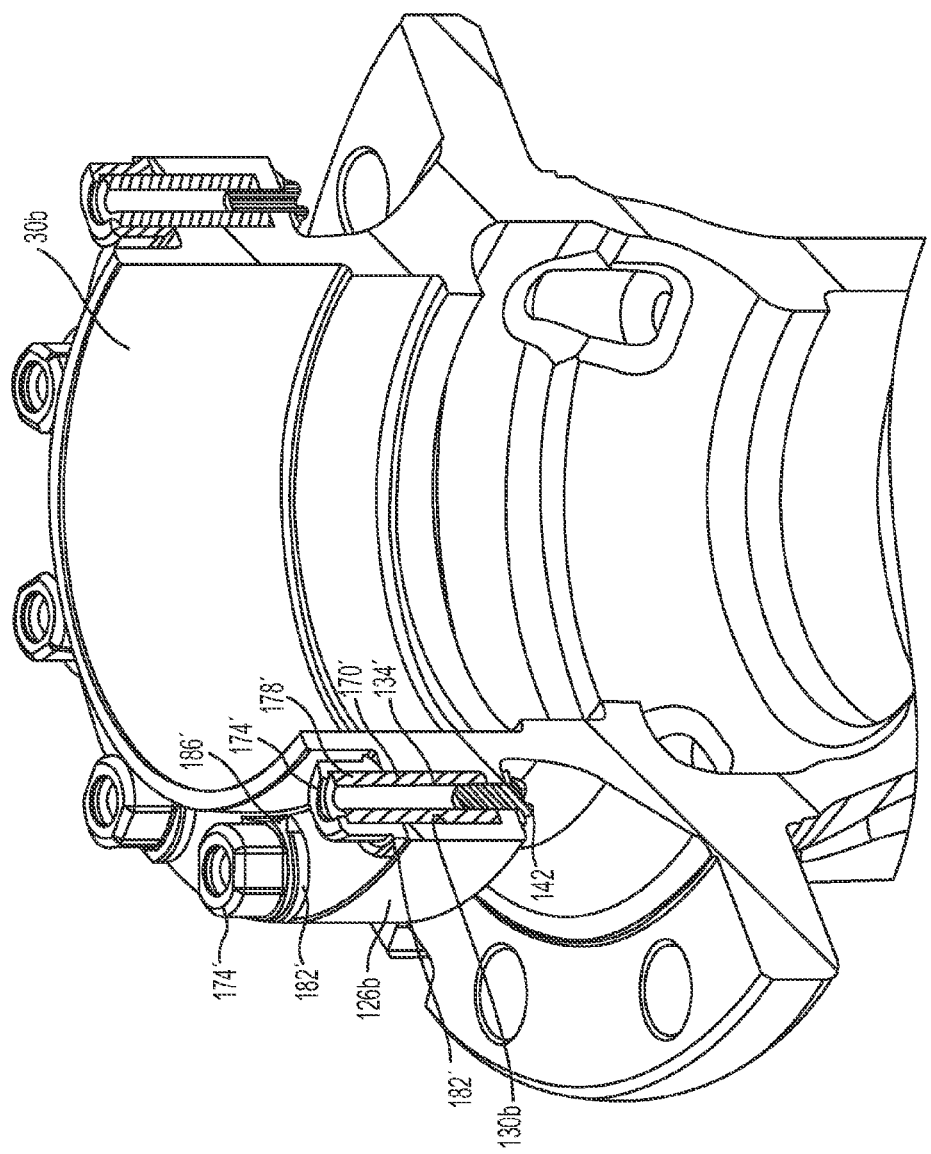
Figure 19:
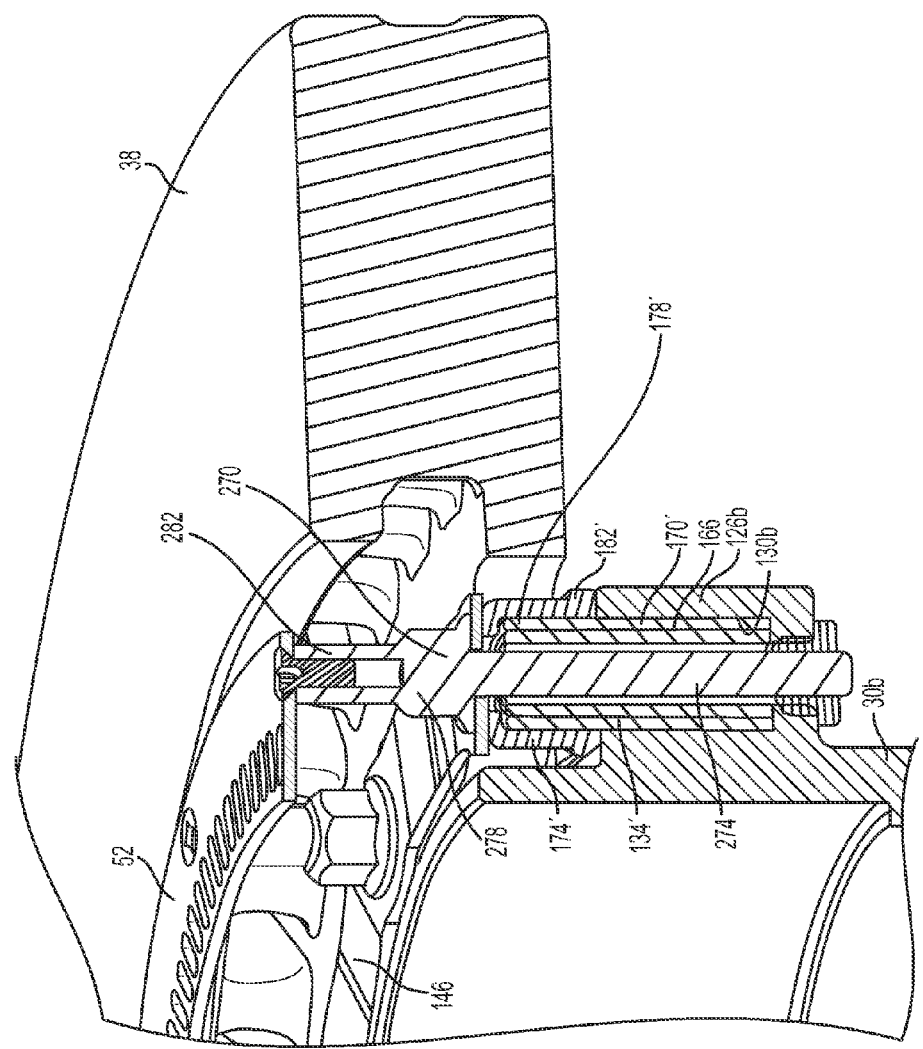
Figure 20:
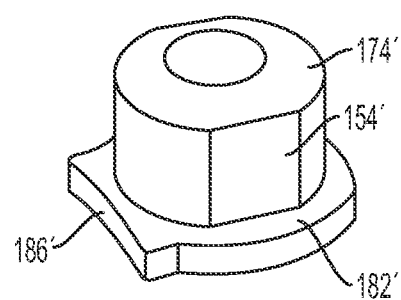
FIG. 20 illustrates a cap of a multi-piece torque pin.
Figure 21:
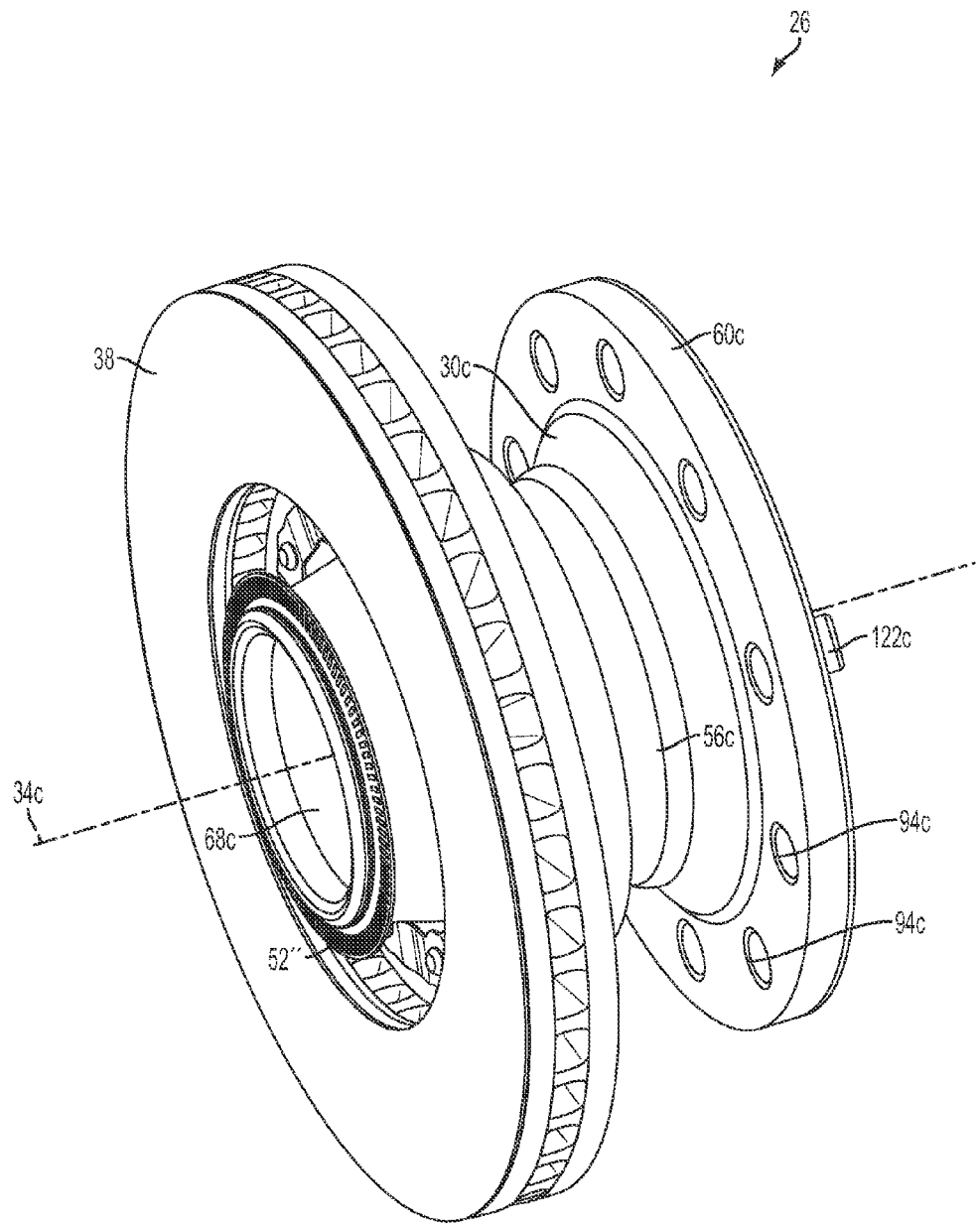
FIG. 21 is a perspective view of a third hub embodiment of a brake hub assembly.
Figure 22:
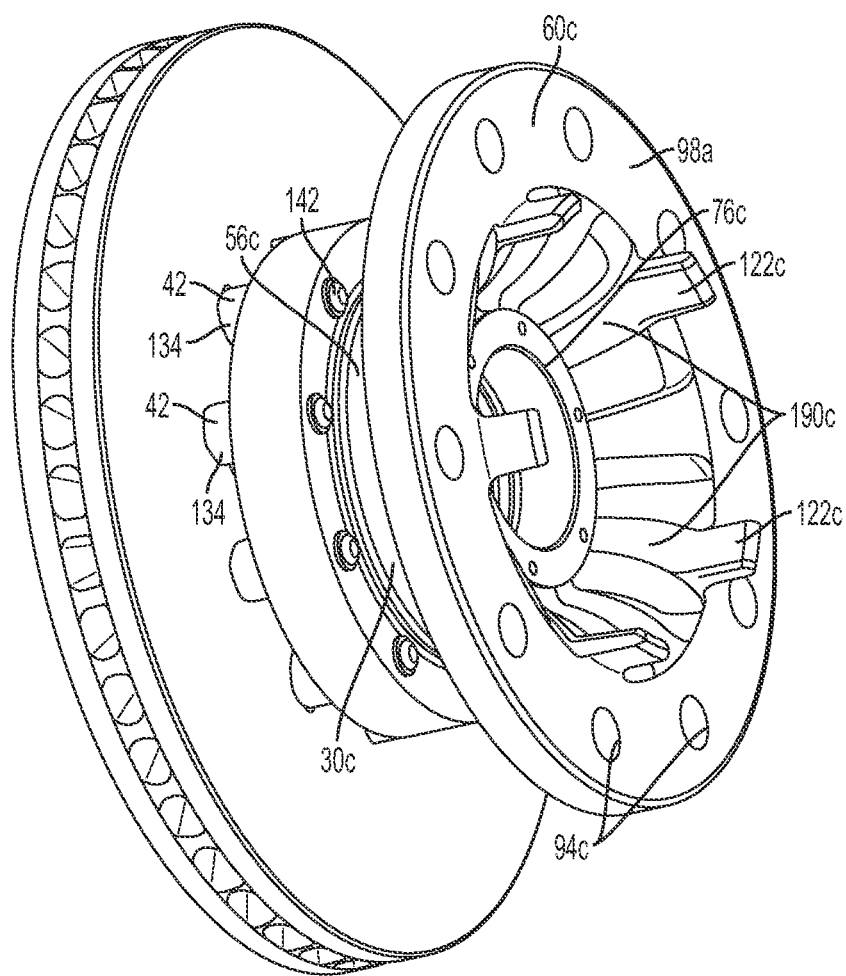
FIG. 22 is a rear perspective view of the brake hub assembly of FIG. 21.
Figure 23:
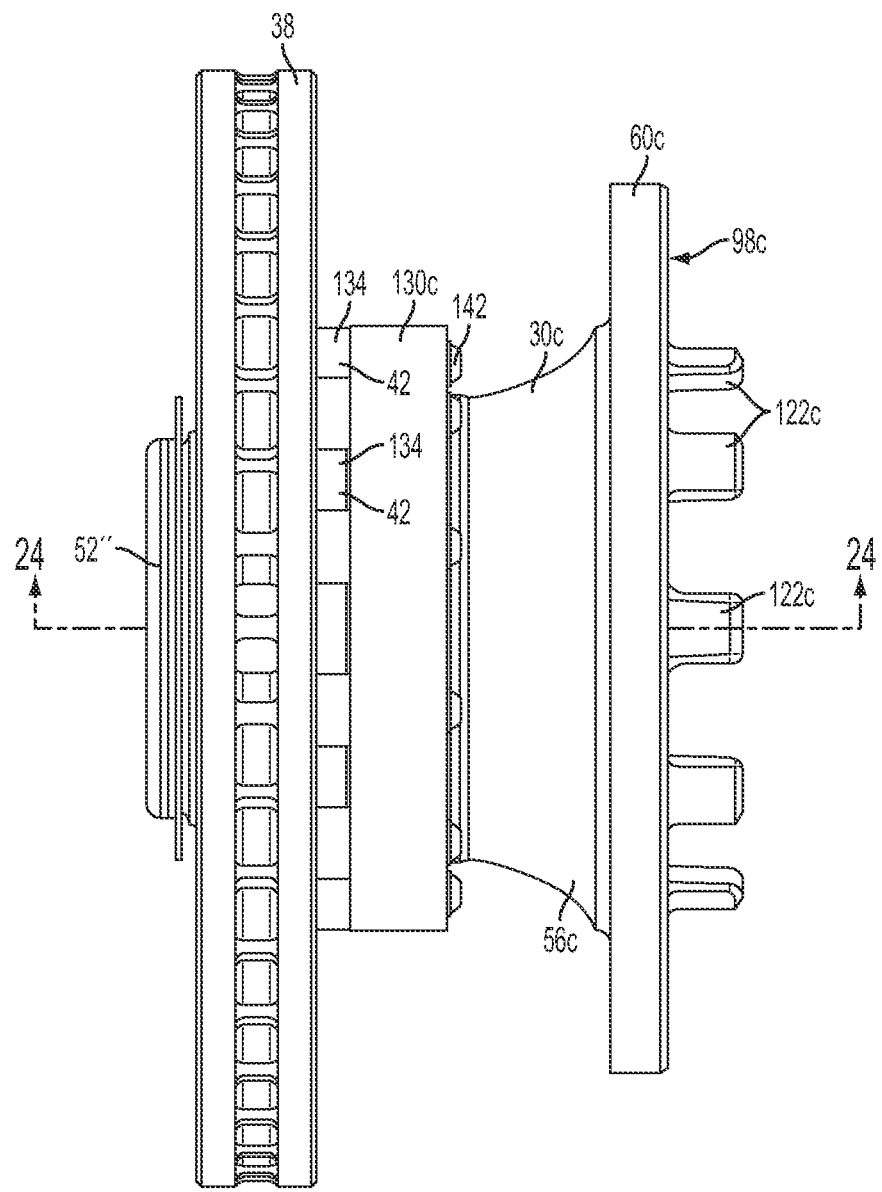
FIG. 23 is a side view of the brake hub assembly of FIG. 21.
Figure 24:
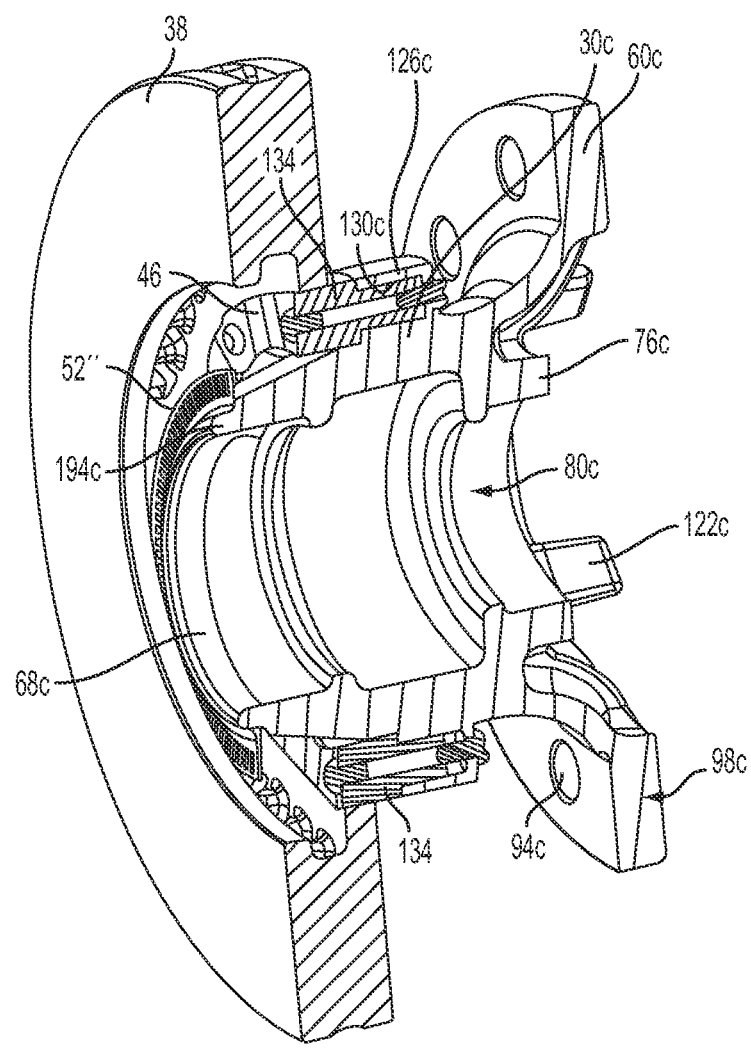
FIG. 24 is a section view taken along lines 24-24 of FIG. 23.
Figure 25:
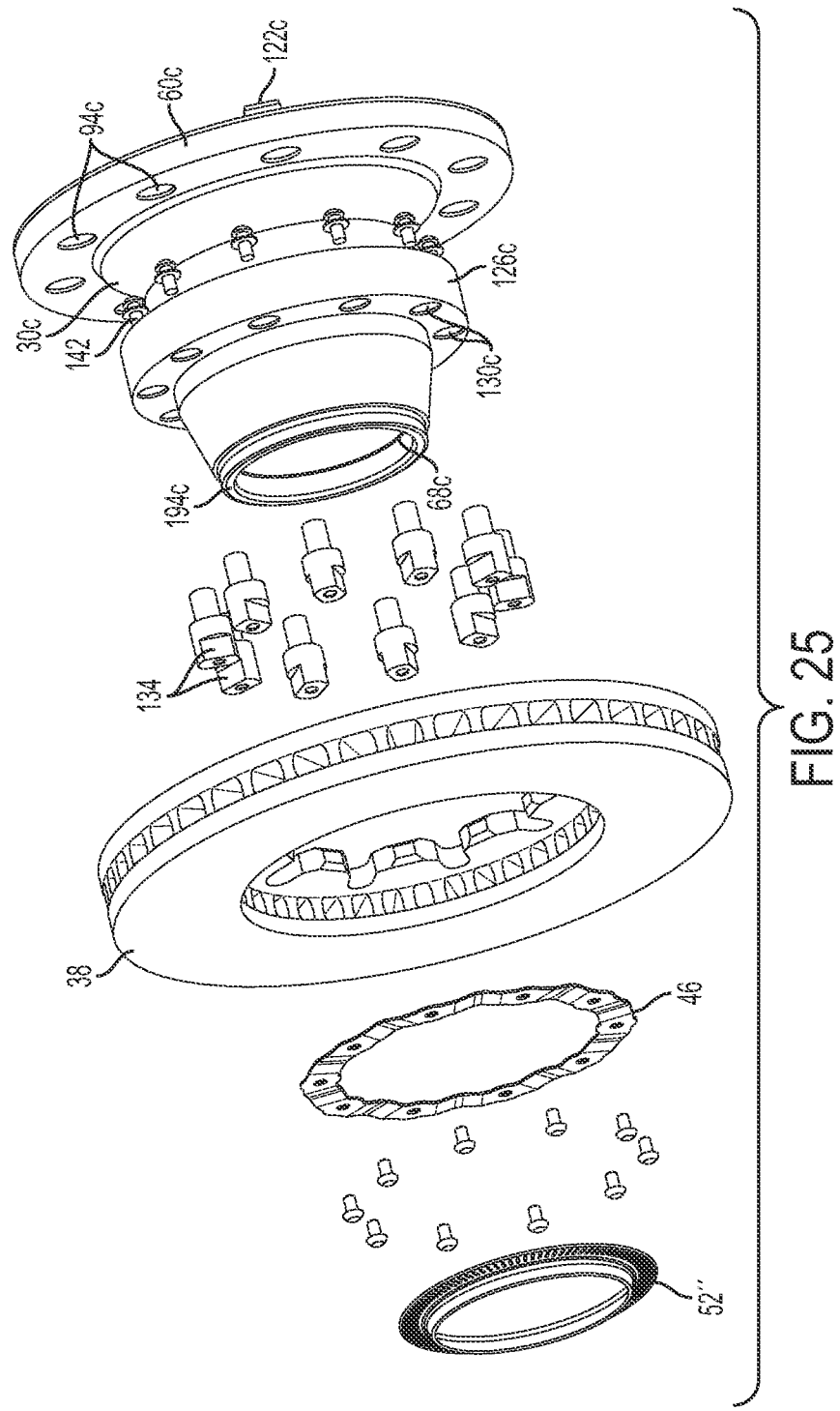
FIG. 25 is an assembly view of the brake hub assembly of FIG. 21.
Figure 26:
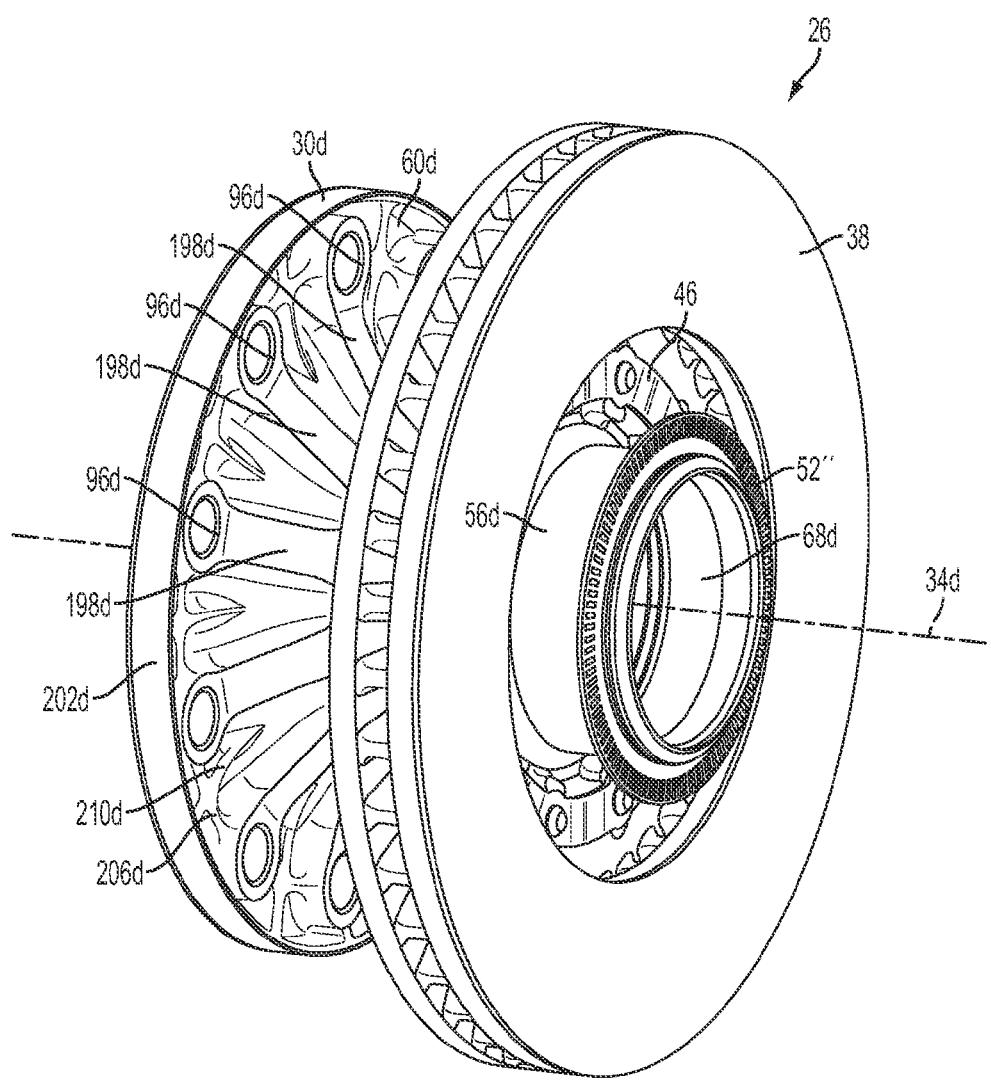
FIG. 26 is a perspective view of a fourth hub embodiment of a brake hub assembly.
Figure 27:
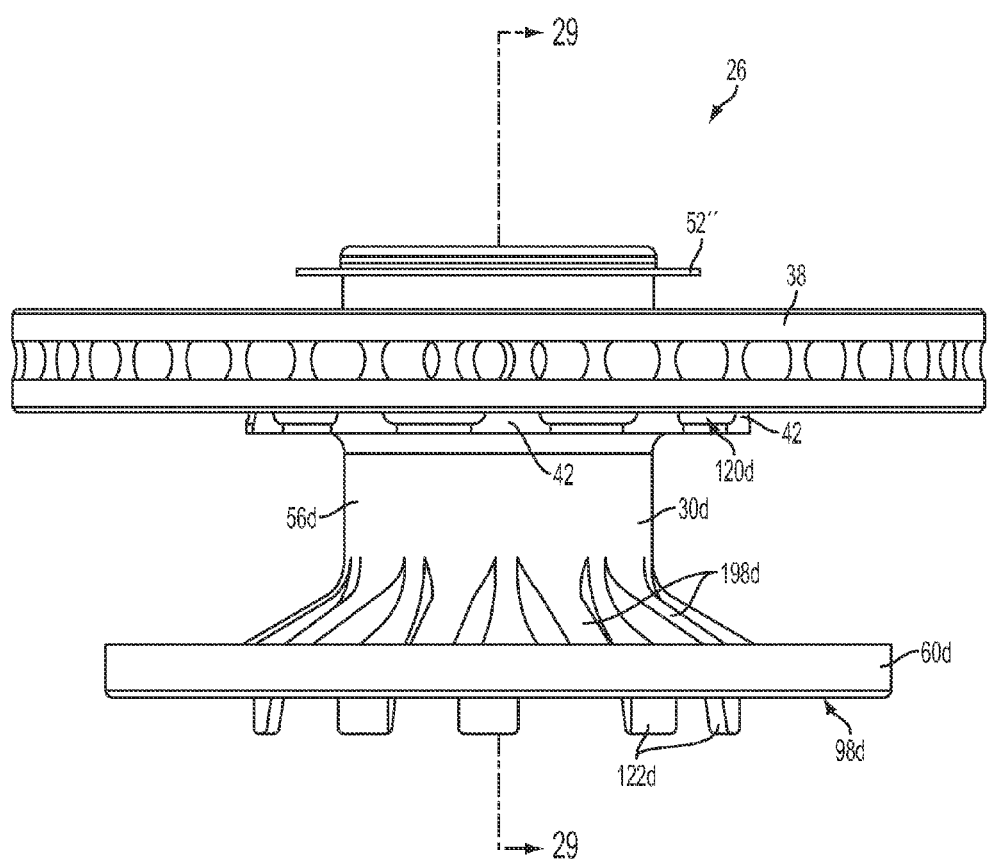
FIG. 27 is a side view of the brake hub assembly of FIG. 26.
Figure 28:
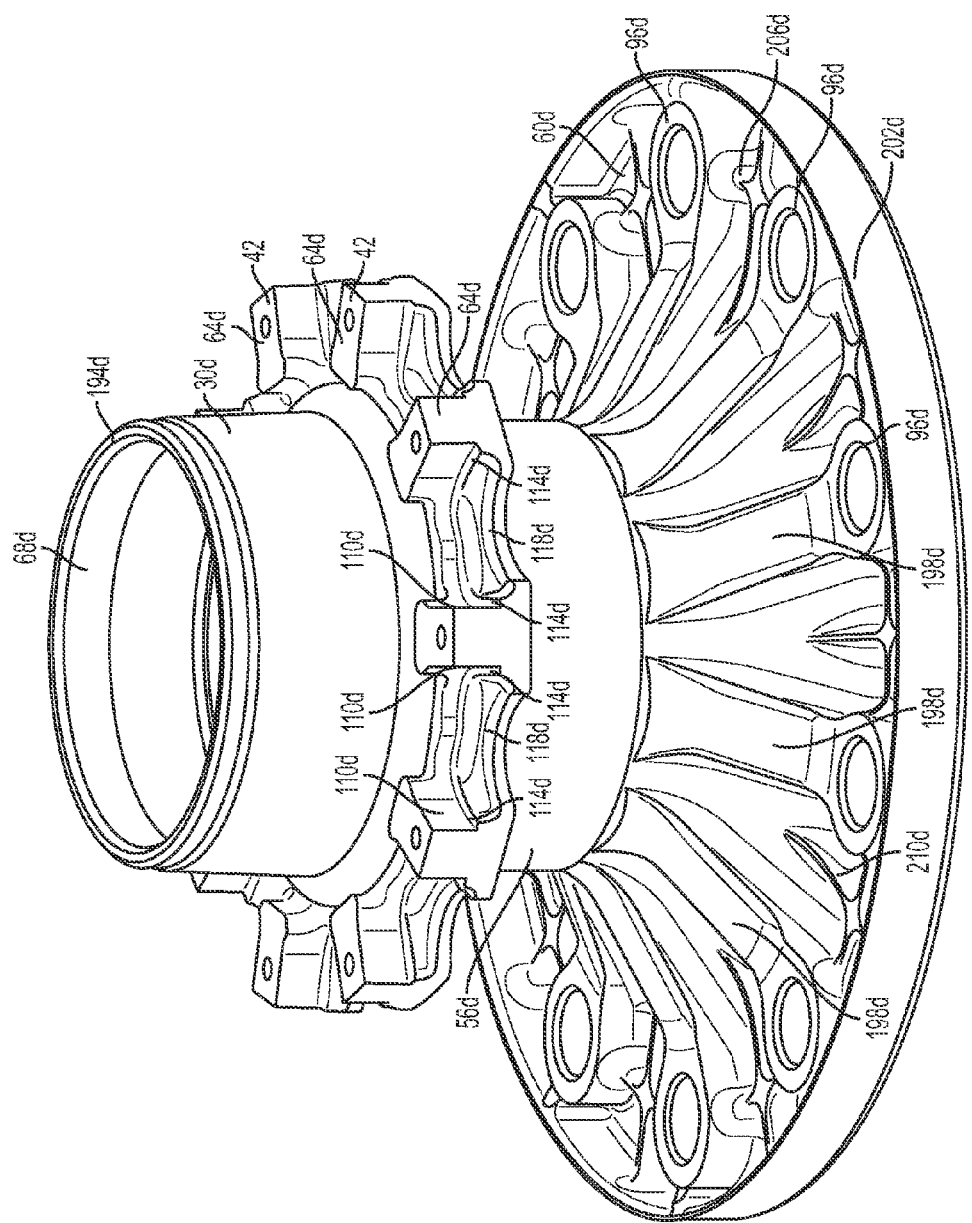
FIG. 28 is a perspective view of the brake hub assembly of FIG. 26 with the brake disk removed.
Figure 29:
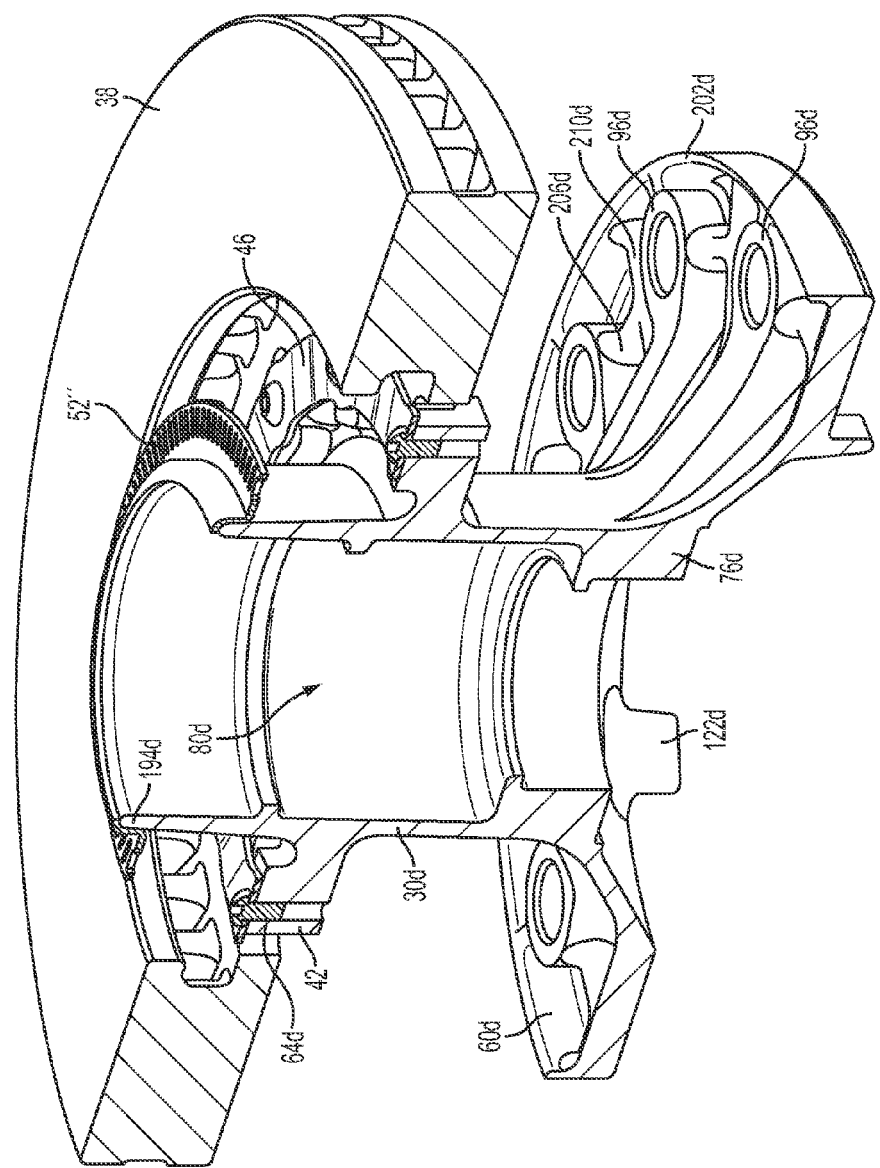
FIG. 29 is a section view taken along lines 29-29 of FIG. 27.
Figure 30:
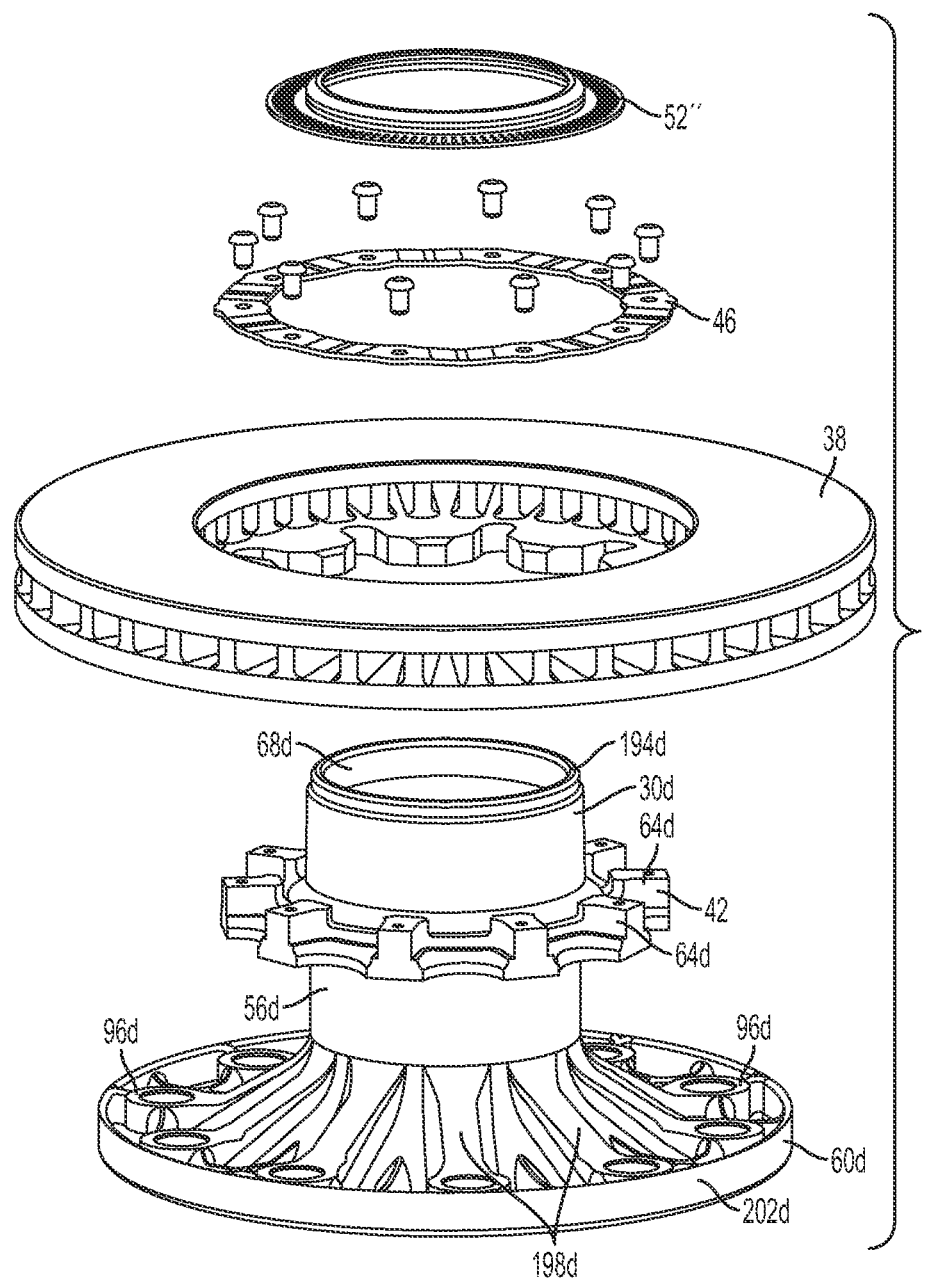
FIG. 30 is an assembly view of the brake hub assembly of FIG. 26.

Illustrated in FIGS. 16a-16c, alternate embodiments of the torque pin 134 may comprise a cylindrical roll spring 166. The cylindrical roll spring 166 is formed from a spirally rolled piece of metal. Unlike the tubular metal body torque pin in FIG. 12, the roll spring 166 torque pin can expand and contract to compensate for variations in aperture size, allowing for greater tolerances during the hub manufacturing process. The roll spring 166 also has superior thermal isolation properties when compared to the torque pin of FIG. 12. As shown in FIG. 16a, the roll spring 166 may also includes a pair of substantially parallel side walls or flats 154 formed in the same size and manner as described above. The roll spring 166 may also be used with, or include a spacer 162 (not shown). In alternate embodiments, the roll spring 166 may not have flats but may be configured to flex and conform to the side wall of the slots 254 to reduce the contact stresses below the yield point of the roll springs 166 and the rotor 38.

Illustrated in FIGS. 17-20, alternate embodiments of the torque pin may include a multi-piece design. The multi-piece torque pin 134' includes a stud 170' to be partially received within an aperture 130b of the mounting flange 126b, and a separately formed cap 174' mated with the distal end 178' of the stud 170'. The stud 170' of the multi-piece torque pin 134' may be formed as either a cylindrical roll spring or a tubular piece and can be coupled to the mounting flange 126b in much the same way as the previous torque pin designs (see FIGS. 18 and 19).

The cap 174' of the multi-piece torque pin 134' is substantially cylindrical in shape and is configured to substantially encompass the distal end 178' of the stud 170'. The cap 174' includes a pair of substantially parallel side walls or flats 154' (described above) to be received within and moveable along the radial slots 254 of the brake disk 38, and an integral spacer 182' to space the brake disk 38 from the mounting flange 126b of the hub 30b. In the illustrated embodiment, the spacer 182' also includes a curved edge 186' (see FIG. 20), that interacts with the hub body 30b to limit the rotation of the cap 174' on the stud 170'. Unlike the above described embodiments of the torque pins 134, the multi-piece torque pin 134' does not need to be properly oriented when being installed on the hub 30b; rather, the cap 174' is free to rotate with respect to the stud 170' to assure the flats 154' are always properly aligned with the slots 254 of the disk 38. Furthermore, the cap 174' may be formed from a low thermally conductive material, such as stainless steel, steel, or ceramic (e.g., zirconium ceramic). In other embodiments, the cap 174' may include a set of protrusions 175' (see FIG. 55) to at least partially restrict the rotation of the cap 174' on the stud 170'.

In the illustrated embodiments, the integral spacers 158, separate spacers 162, and spacers 182' formed in the caps 174' all at least partially define the axial qualifying surface (described above) for the hub 30b when in use.

FIGS. 21-25 illustrate a third hub embodiment 30c of the hub assembly 26 formed (e.g., cast) from an aluminum alloy similar to the second hub embodiment 30b. In the third embodiment of the hub 30c, the hub employs much of the same structure and has many of the same properties as the previously-described hub designs 30a, 30b shown in FIGS. 2-5 and 6-9. Analogous elements have been given the same number and reference letter "c". The following description of the hub 30c focuses primarily upon structure and features different than the previously-described embodiments.

The third hub embodiment 30c includes a wheel flange 60c that extends radially and axially outwardly from the outboard end 76c of the hub 30c. In the illustrated embodiment, the mounting surface 98c of the wheel flange 60c is positioned axially outboard of the hub body 56c and defines a plurality of wheel stud apertures 94c, each configured to receive a corresponding wheel stud (not shown). To help reinforce the wheel flange 60c, a plurality of reinforcing ribs 190c are formed into the flange itself. The ribs 190c extend generally radially along the outboard side of the flange 60c.

The third hub embodiment 30c also includes a plurality of (e.g., five) wheel pilots 122c, each extending axially outwardly from the mounting surface 98c of the wheel flange 60c. As described above, the wheel pilots 122c are positioned to align the wheel with the central axis 34c of the hub 30c. The inboard end 68c of the third hub embodiment 30c includes a ridge 194c, formed into the body 56c and configured to act as a mounting guide for a press-on style tone ring 52".

FIGS. 26-31 illustrate a fourth hub embodiment 30d of the hub assembly 26 formed (e.g., cast) from austempered ductile iron similar to the first hub embodiment 30a. In the fourth embodiment of the hub 30d, the hub employs much of the same structure and has many of the same properties as the previously-described hub designs 30a, 30b, 30c shown in FIGS. 2-5, 6-9, and 21-25. Analogous elements have been given the same number and the reference letter "d". The following description of the hub 30d focuses primarily upon structure and features different than the previously-described embodiment.

Similar to the third hub embodiment 30c, the wheel flange 60d of the fourth hub embodiment 30d extends radially and axially outwardly from the outboard end 76d of the hub body 56d to position the mounting surface 98d axially outboard of the body 56d. The wheel flange 60d also includes a plurality of reinforcing ribs 198d, each extending between the hub body 56d and the flange 60d to provide rigidity and support. In the illustrated embodiment, each rib 198d is generally spaced evenly along the circumference of the flange 60d and includes a wheel stud boss 96d formed therein.

Figure 48A:
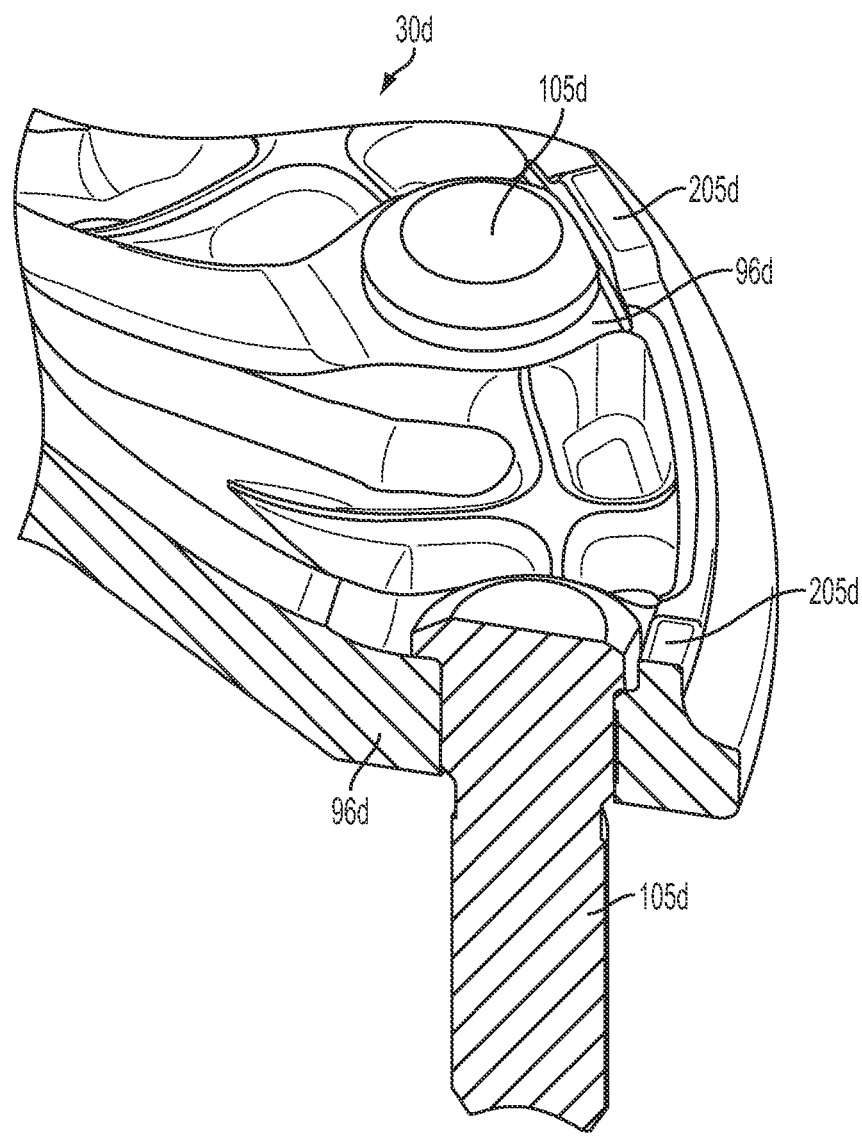
FIG. 48a is a partial section of a perspective view of the brake hub shown in FIG. 48.

The wheel flange 60d also includes a perimeter rib 202d, an annular rib 206d extending around the flange and radially inward from the perimeter rib 202d, and one or more secondary ribs 210d extending radially and generally perpendicular to ribs 202d, 206d. The perimeter rib 202d extends along the outer diameter of the wheel flange 60d at a height greater than the height of the wheel stud bosses 96d. The annular rib 206d is concentric with the perimeter rib 202d, generally extending between the various wheel stud bosses 96d at a height lower than the bosses themselves. Various combinations of radially and circumferentially extending ribs may also be present dependent upon the specific embodiment. In alternate embodiments, the height and thickness of each rib 202d, 206d, and 210d can vary. The hub 30d may include one or more anti-rotation tabs 205d to restrict rotation of the wheel lugs 105d positioned within the bosses 96d (see FIGS. 48 and 48a).

Figure 31:
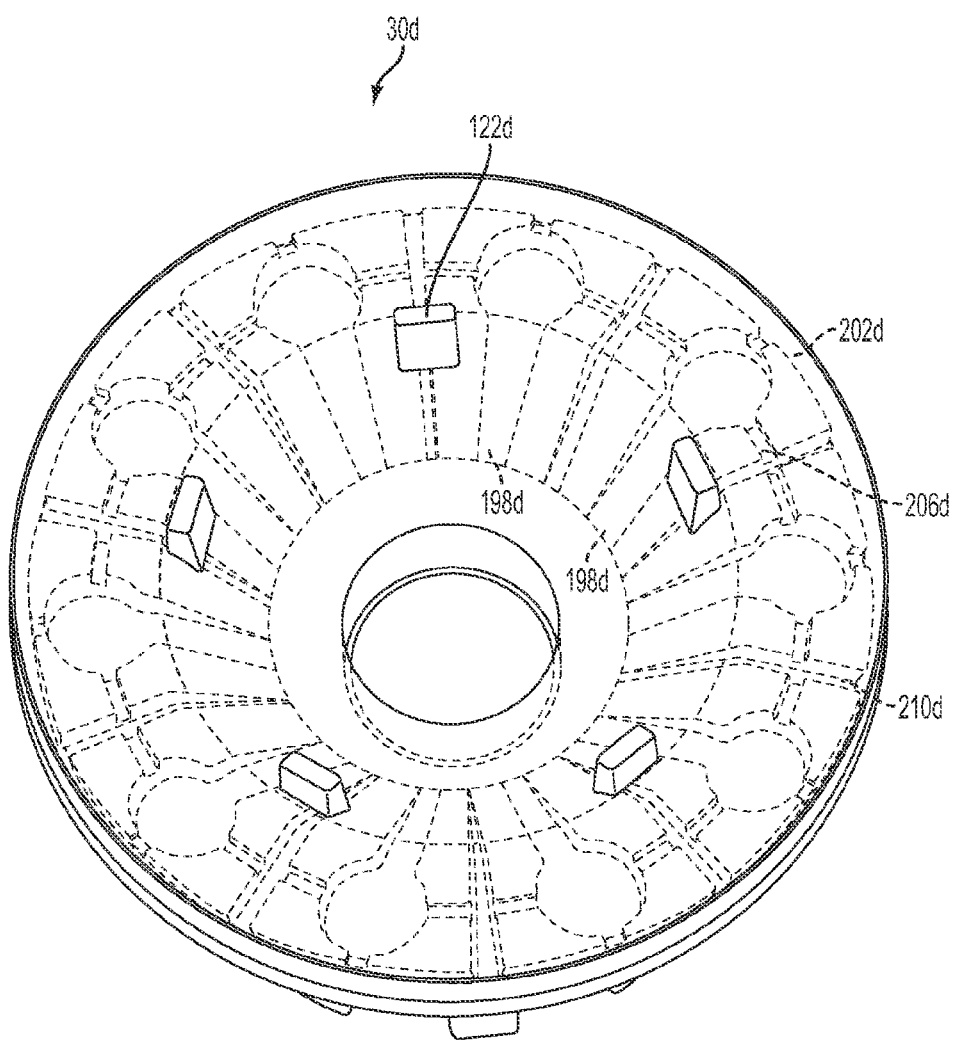
FIG. 31 is a front view of the raw casting used in the hub of the brake hub assembly of FIG. 26.

Illustrated in FIG. 31, the fourth hub embodiment 30d also includes a plurality of (e.g., five) wheel pilots 122d, each extending axially outwardly from the mounting surface 98d of the wheel flange 60d. The wheel pilots 122d are positioned to align the wheel with the central axis 34d of the hub 30d. The wheel pilots 122d are also each staggered with respect to the reinforcing ribs 198d, or located between ribs 198d, to limit casting porosity. Stated differently, each wheel pilot 122d is positioned such that an axis, oriented parallel to the central axis 34d, will not pass through both the wheel pilot and the reinforcing ribs at the same time. When the wheel pilots 122d are staggered from the ribs 198d, the variation in overall thickness of the cast material is minimized, thereby substantially reducing porosity.

Figure 32:
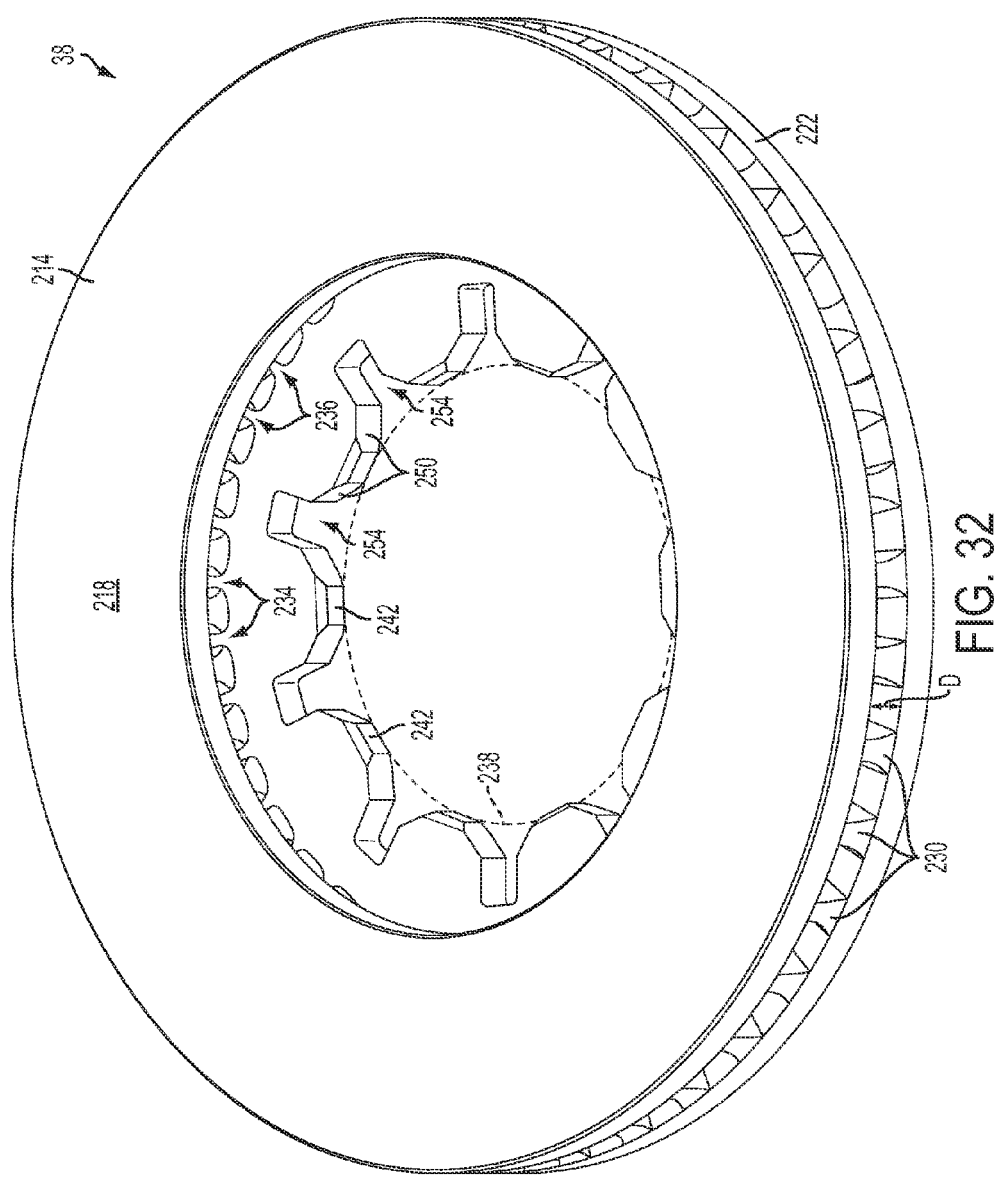
FIG. 32 is a perspective view of a brake disk.
Figure 33:
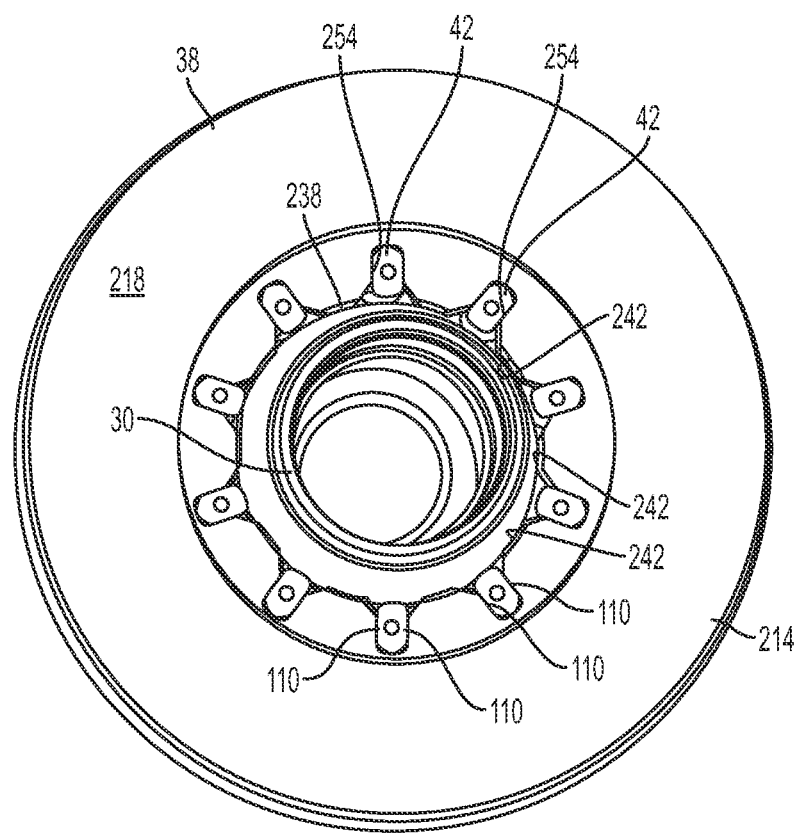
FIG. 33 is a detailed view of the brake disk of FIG. 32 installed on a brake hub.
Figure 34:
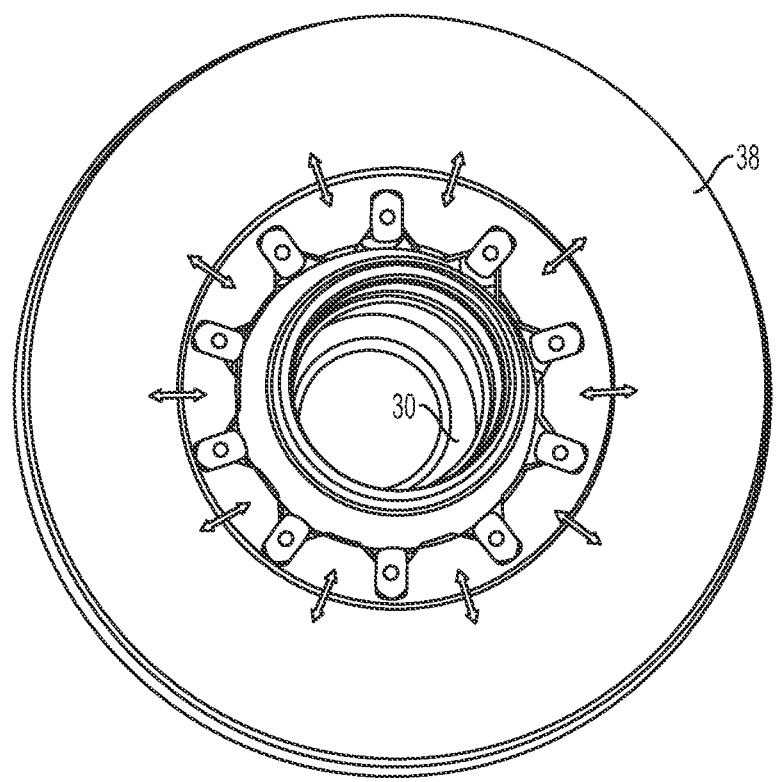
FIG. 34 illustrates the thermal expansion and contraction of the brake disk of FIG. 32 with respect to a brake hub.

Illustrated in FIGS. 32-34, the hub assembly 26 also includes a brake disk 38. The brake disk 38 includes a first plate 214 having a first brake surface 218, and a second plate 222 spaced axially from the first plate 214 and having a second brake surface 226. The brake disk 38 also includes a plurality of ribs or vanes 230 extending radially between the first and second plates 214, 222 to define a plurality of cooling channels 234 therebetween. During operation of the hub assembly 26, air flows through the cooling channels 234 of the brake disk 38 to at least partially regulate the temperature of the disk 38.

Figure 51:
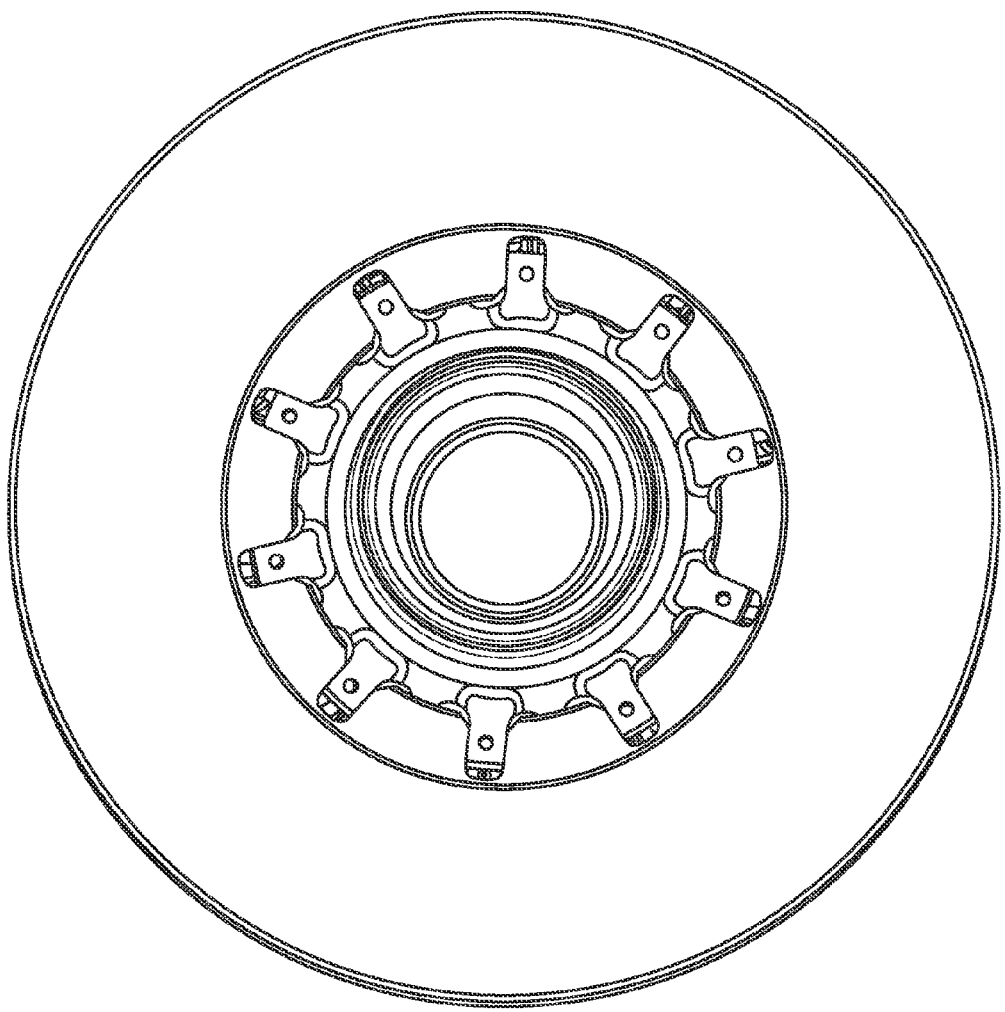
FIGS. 51 and 52 illustrate perspective views of an alternate mounting solution for a brake disk on a brake hub.
Figure 52:
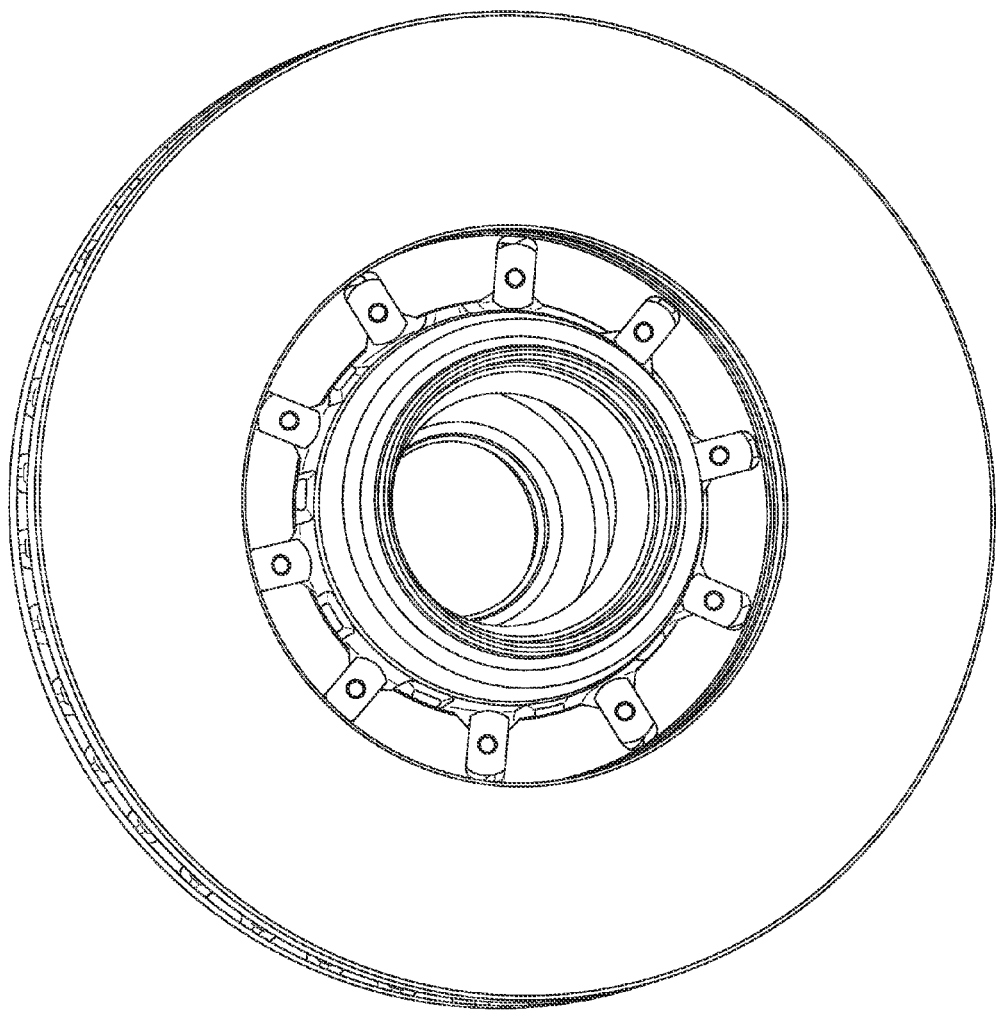
Figure 53:
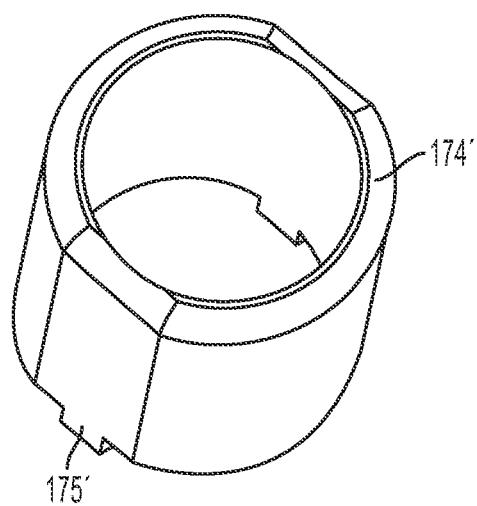
FIG. 53 illustrates the cap of FIG. 20 with an added protrusions.

Furthermore, the second plate 222 of the brake disk 38 extends radially inwardly of the inner diameter of the first plate 214 to define a pilot diameter 238. In the illustrated embodiment, the pilot diameter 238 includes a plurality of pilot surfaces 242, each configured to engage the pilot cylinder 246 of the hub and position the brake disk 38 co-axially with the hub along the central axis. In the illustrated embodiment, each pilot surface 242 includes a pair of chamfers 250, to minimize the contact area between the hub and the disk 38 to reduce heat transfer. In the illustrated embodiment, less than about 20% of the circumference of the pilot diameter 238 is in contact with the hub. Alternatively, the size of the chamfers 250 can be modified (e.g., changing the size of the pilot surfaces 242) so that less than 15% of the circumference of the pilot diameter is in contact with the hub. In still other embodiments, it is possible to construct the hub so that less than 2% of the pilot diameter is in contact with the hub (see FIGS. 51 and 52).

The second plate 222 of the brake disk 38 also defines a plurality of radial slots 254. Each slot 254 is open to the pilot diameter 238 and extends radially outwardly, separating two pilot surfaces 242. In the illustrated embodiment, each slot 254 is sized to receive a torque member 42 therein (see FIG. 33). More specifically, each slot 254 is sized to receive the head 150 of a torque pin 134 (e.g., in the second hub embodiment 30b and third hub embodiment 30c, see FIG. 8) or a torque lug 64a, 64d (e.g., in the first hub embodiment 30a and fourth hub embodiment 30d, see FIG. 3). To promote better airflow when the disk 38 is installed on the hub, at least 50% of the area of the radially interior opening 236 (see FIG. 32) of each channel 234 is positioned above the torque members 42 of the hub so as to minimize any resistance to the airflow. In other embodiments, at least 90% of each interior opening 236 is positioned above the torque members 42. In still other embodiments, the torque member 42 does not extend axially beyond the inboard edge of the interior opening 236 of each channel 234. Stated differently, the torque members 42 do not extend axially beyond the second plate 222 of the brake disk 38 by more than 50% of the distance D between the first plate 214 and the second plate 222 (see FIG. 32). Alternatively, the torque members 42 do not extend beyond 10% of the distance D.

When installed on the hub, the brake disk 38 is allowed to "float" with respect to the hub to compensate for differences in thermal expansion between the two. More specifically, the torque members 42 move within the slots 254 of the brake disk 38 as the disk expands and contracts (see FIG.

34) but maintain contact with the respective axial qualifying surface. This allows the torque members 42 to transfer braking torque from the brake disk 38 to the hub without restraining the brake disk 38 from thermally induced movement and while maintaining the correct orientation with respect to the central axis.

Figure 35A:
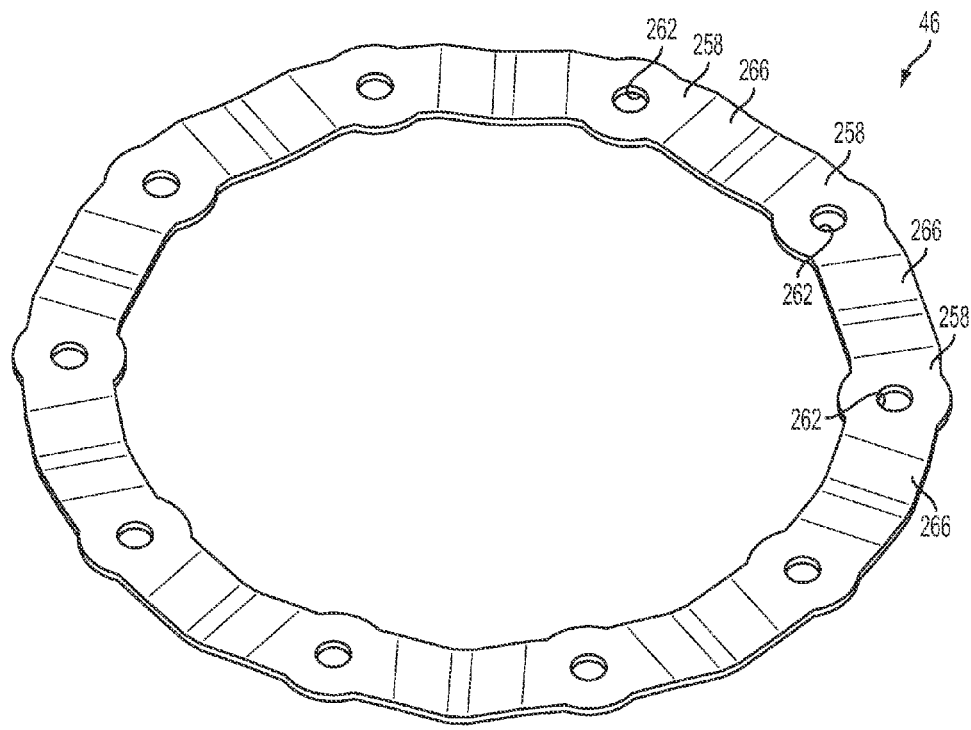
FIGS. 35a and 35b illustrate an axial preload spring.
Figure 35B:
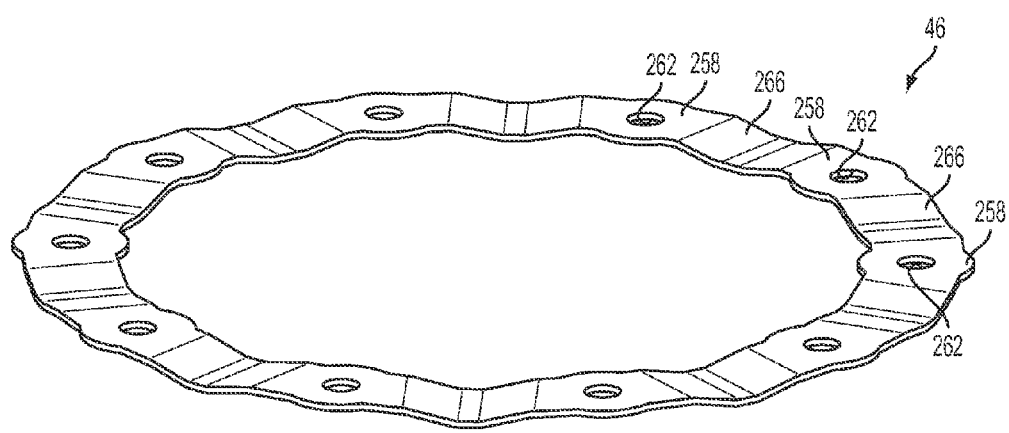

Illustrated in FIGS. 35 and 35a, the hub assembly 26 also includes an axial preload spring 46 coupleable to the hub to secure the brake disk 38 thereto. The axial preload spring 46 is substantially annular in shape and is formed from stamped spring steel. The spring 46 generally includes a plurality of circumferentially spaced base portions 258, each defining an aperture 262, and a plurality of substantially V-shaped spring portions 266 each extending between adjacent base portions 258. When the hub assembly is complete, each base portion 258 of the spring 46 is coupled to a respective torque member 42 of the hub by a stand off screw 270. The spring portions 266 contact the brake disk 38 and axially bias the disk 38 towards the axial qualifying surface. During operation, the preload spring 46 works in tandem with the axial qualifying surface (e.g., at least one of the spacers 162, the support ledges 114a, 114d, the mounting flange 126b, 126c, and the like) to allow the disk 38 to move axially or "float" with respect to the hub. Stated differently, the axial preload spring 46 applies an axial biasing force sufficient to ensure that the disk 38 is in constant contact with the axial qualifying surface while compensating for axial expansion and contraction of the disk 38 due to temperature changes. Although the axial preload spring 46 is shown as a single, annular unit, the spring 46 may be separated into one or more separate spring members (not shown). In still other embodiments, the axial preload spring 46 may include a pair of "C" shaped portions. For example, each axial preload spring 46 may include an annular portion extending about 180 degrees.

Figure 36:
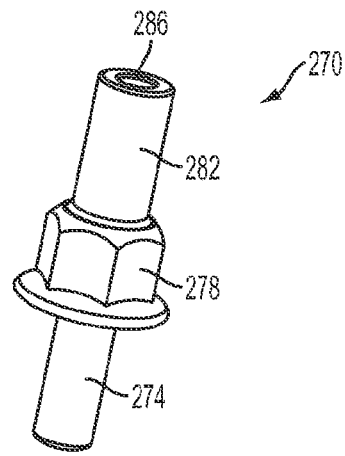
FIG. 36 is a perspective view of a stand off screw.
Figure 36A:
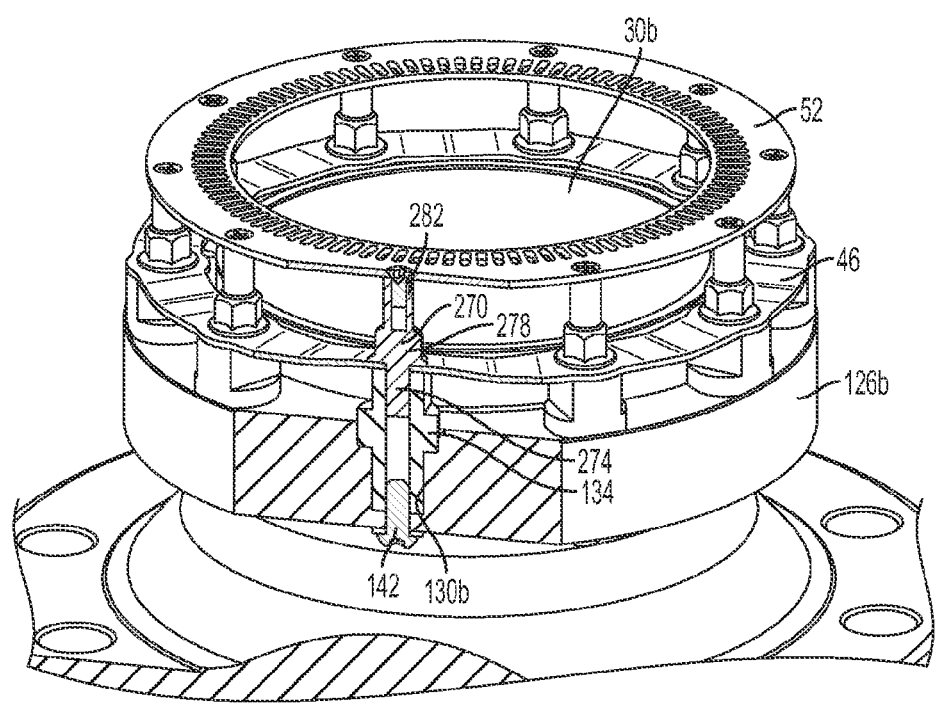
FIG. 36a illustrates the stand off screw of FIG. 36 installed on the brake hub assembly of FIG. 6.
Figure 36B:
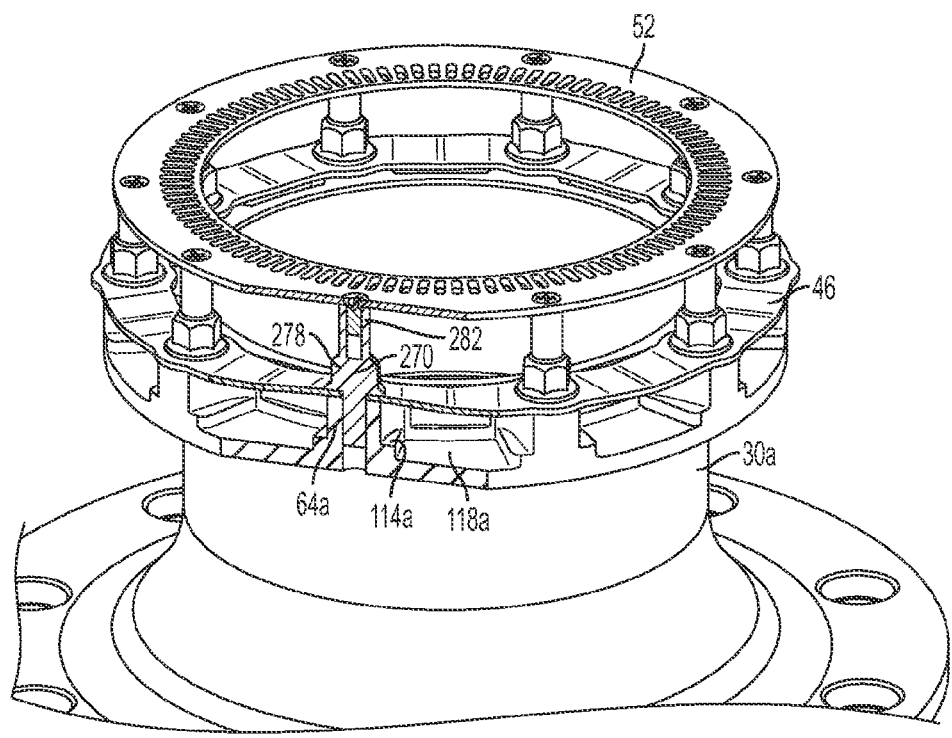
FIG. 36b illustrates the stand off screw of FIG. 36 installed on the brake hub assembly of FIG. 2.
Figure 37:
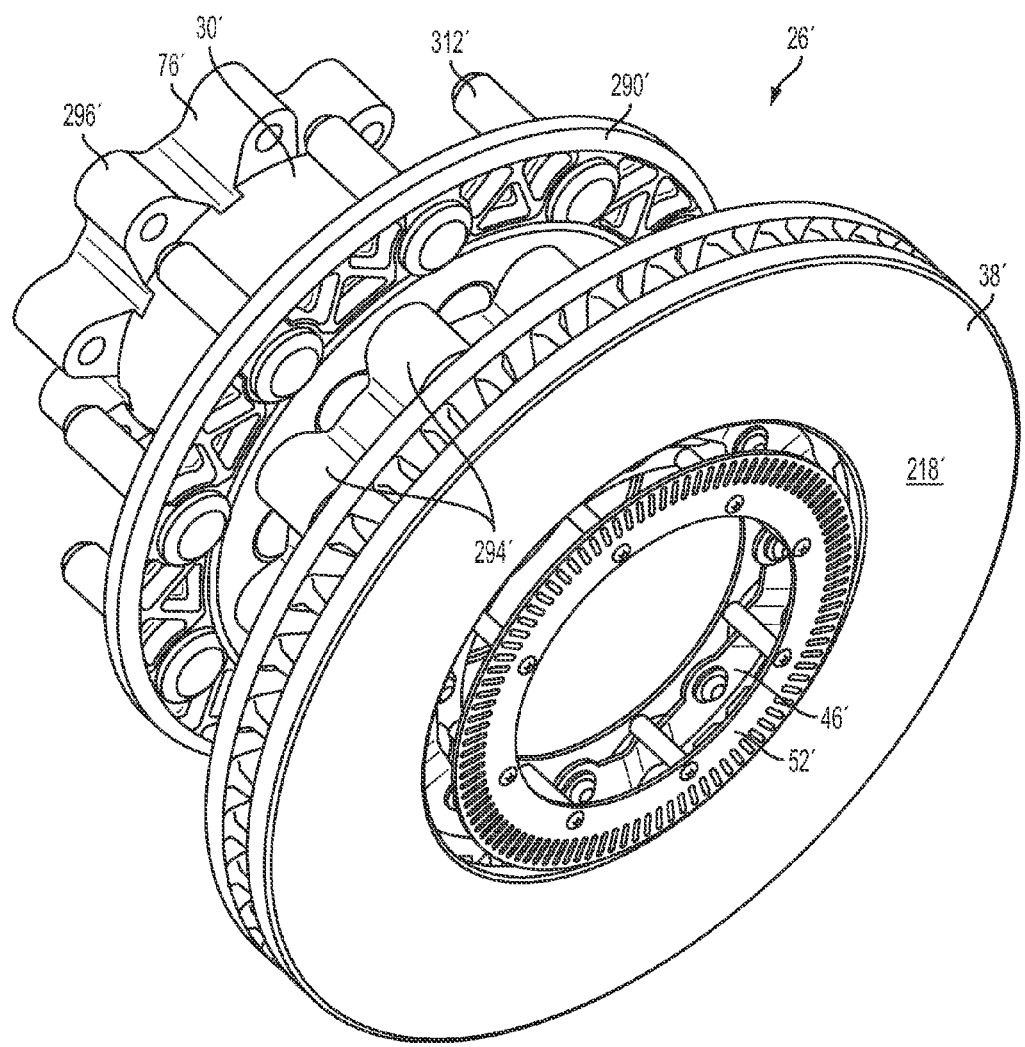
FIG. 37 is a perspective view of another brake hub assembly.
Figure 38:
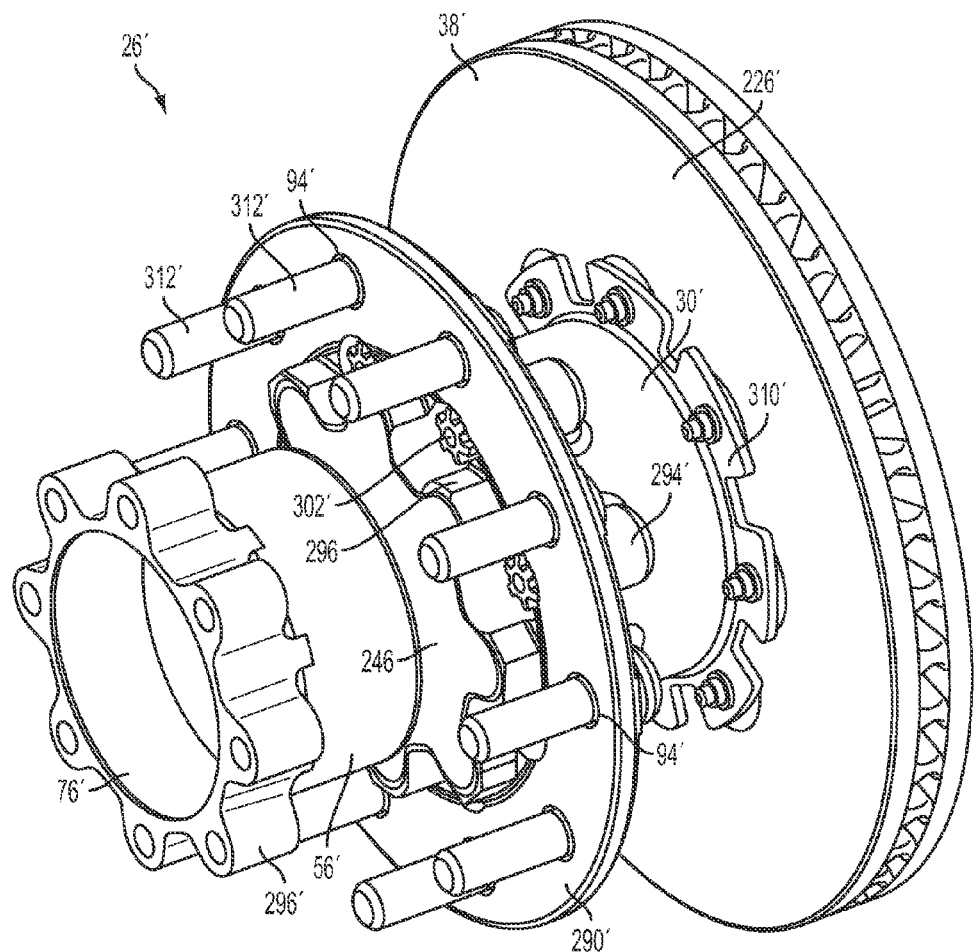
FIG. 38 is a rear perspective view of the brake hub assembly of FIG. 37.

Illustrated in FIG. 36-36b, the hub assembly 26 also includes a plurality of stand off screws or connectors 270, each having a mounting portion 274, a body 278, and an extension portion 282 opposite the mounting portion 274. The stand-off screws 270 secure the axial preload spring 46 to the hub while also providing a thermally isolated mounting for the tone ring 52 so that it is spaced a distance from the hub. When the hub is assembled, the mounting portion 274 of each stand off screw 270 is coupled (e.g., threadably engaged) to a corresponding torque member 42 of the hub, securing the spring 46 to the torque members 42, and the extension portion 282 extends axially outwardly from the hub to produce a threaded aperture 286. In addition to providing a mount for the tone ring 52, the extension portion 282 is configured to provide minimal resistance to the airflow through the channels 234 of the brake disk 38.

The hub assembly 26 also includes a tone ring 52. The tone ring 52 is substantially annular in shape, and includes a plurality of recesses spaced evenly about the circumference of the ring. The tone ring 52 interacts with a sensor (not shown) to allow the user to monitor the rotation of the hub assembly 26 with respect to the axle tube assembly 14. In alternate embodiments, the tone ring 52 may include a plurality of cuts or protrusions in place of the recesses, dependent upon the style of sensor being used. In the first and second hub embodiments 30a, 30b, the tone ring 52 is coupled to the extension portion 282 of the standoff screw 270, however in the third and fourth hub embodiments 30c, 30d, a press-on tone ring 52" is coupled directly to the hub body 56b, 56d.

The brake hub assembly 26 is typically pre-assembled as a unit before being installed on the axle tube assembly 14 of a motor vehicle 10. To assemble the unit, the user axially introduces the brake disk 38 onto the inboard end of the hub, making sure to align each torque member 42 with a corresponding slot 254 and the pilot surfaces 242 with the pilot cylinder of the hub. Dependent upon the hub design being used, either a torque lug 64a, 64d (e.g., in the first and fourth embodiments, see FIG. 3) or the head 150 of a torque pin 134 (e.g., in the second and third embodiments, see FIG. 8) is positioned within each radial slot 254.

The axial preload spring 46 is then positioned on the hub making sure to align each base portion 258 with a corresponding torque member 42 and each spring portion 266 with the brake disk 38. When positioning the axial preload spring 46, it is important to make sure the spring is oriented so that the spring portions 266 are directed towards the brake disk 38, causing the spring to bias the disk 38 towards the axial qualifying surface. In some embodiments, the spring 46 is then coupled to the hub by a plurality of stand off screws 270, each of which pass through a corresponding aperture 262 of the spring 46. The tone ring 52 is then attached to the assembly 26 by coupling it to the extended portions 282 of the stand off screws 270. In other embodiments, the axial preload spring 46 may be coupled directly to the hub with fasteners and the tone ring 52" may be pressed onto a corresponding ridge 194d (see FIG. 29). Once the assembly is complete, it may be installed onto the axle tube assembly 14 of a motor vehicle 10 with the proper bearings and seals using the standard installation processes well known in the art.

Typically, when a brake disk needs to be serviced or replaced, the user must first remove the hub assembly from the axle before the brake disk can be removed from the hub. Another hub assembly 26' is illustrated in FIGS. 37-45. This hub assembly 26' employs much of the same structure and has many of the same properties as the previously-described hub assembly 26 shown in FIGS. 1-31. Analogous elements have been given the same reference number and the prime symbol. The following description of the hub assembly 26' focuses primarily upon structure and features different than the previously-described embodiment.

Similar to the hub assembly 26, the hub assembly 26' is configured to be installed on the axle of a motor vehicle and act as a mounting location for one or more of the vehicle's wheels (not shown). In the hub assembly 26', the brake hub 30' is designed to allow the user to remove and install the brake disk 38', such as for maintenance or replacement, without having to remove the hub 30' from the axle, leaving the bearing assembly and seals undisturbed. In the illustrated embodiment, the hub assembly 26' includes a hub 30', a wheel flange plate 290', a brake disk 38', and an axial preload spring 46'.

Figure 39:
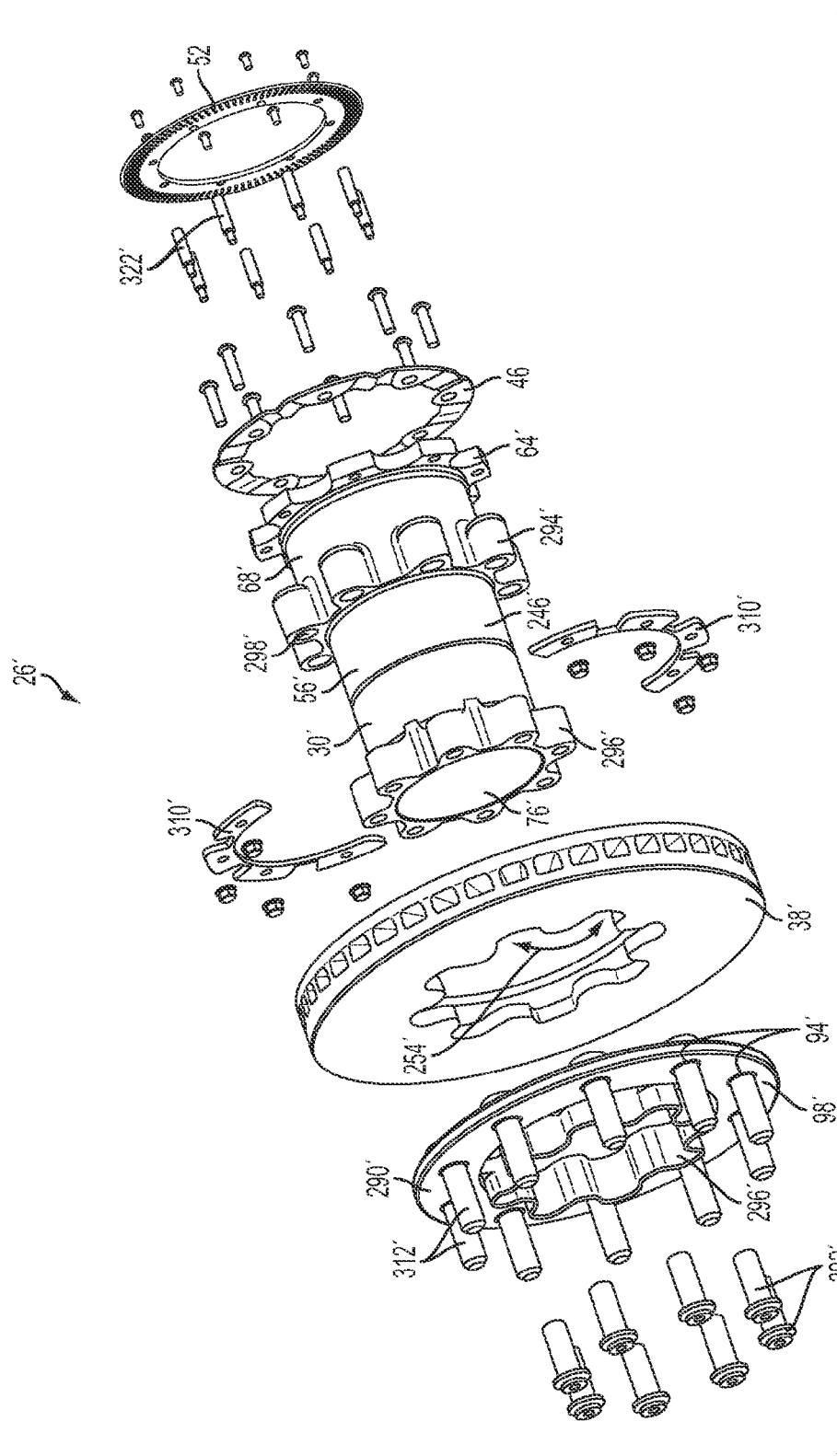
FIG. 39 is an assembly view of the brake hub assembly of FIG. 37.
Figure 40:
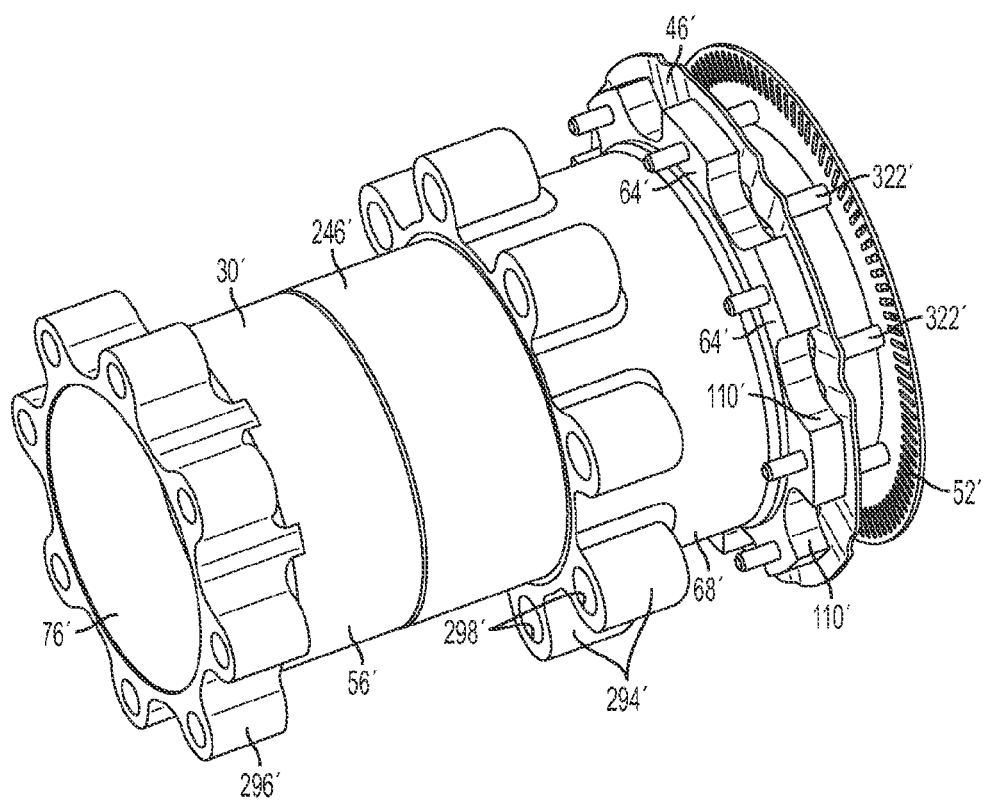
FIGS. 40-42 illustrate various stages of assembly of the brake hub assembly of FIG. 37.
Figure 41:
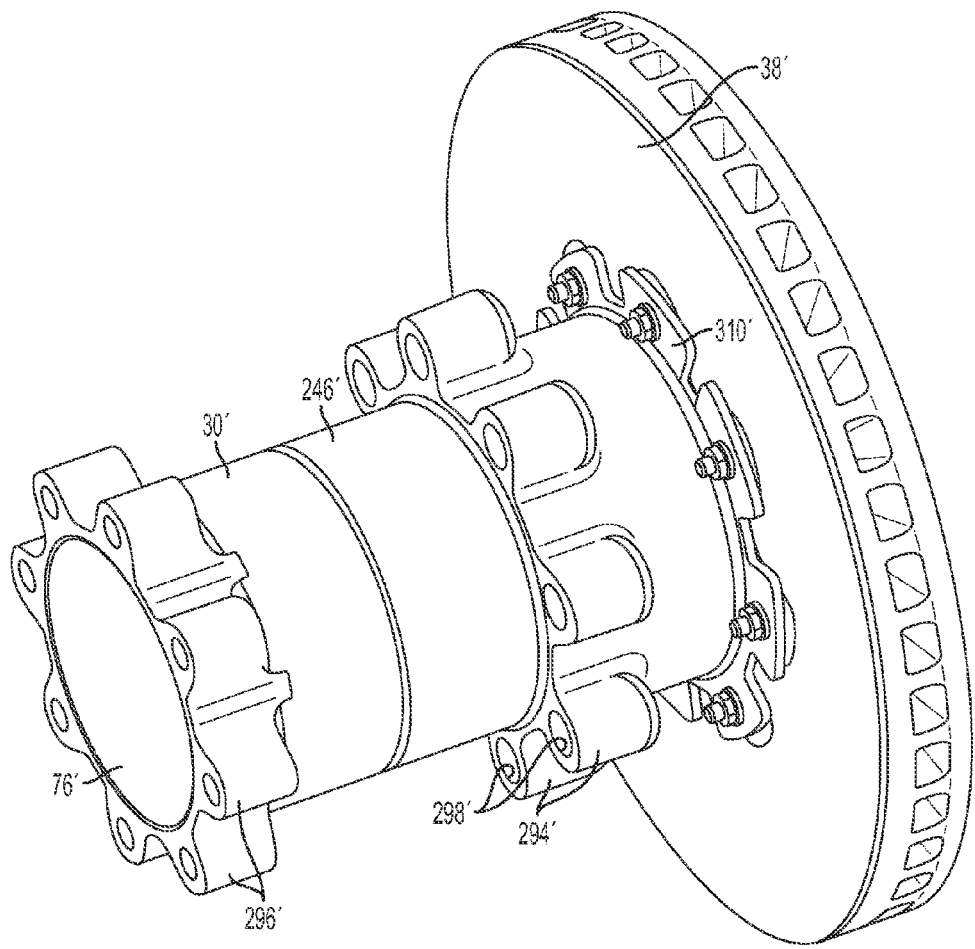
Figure 42:
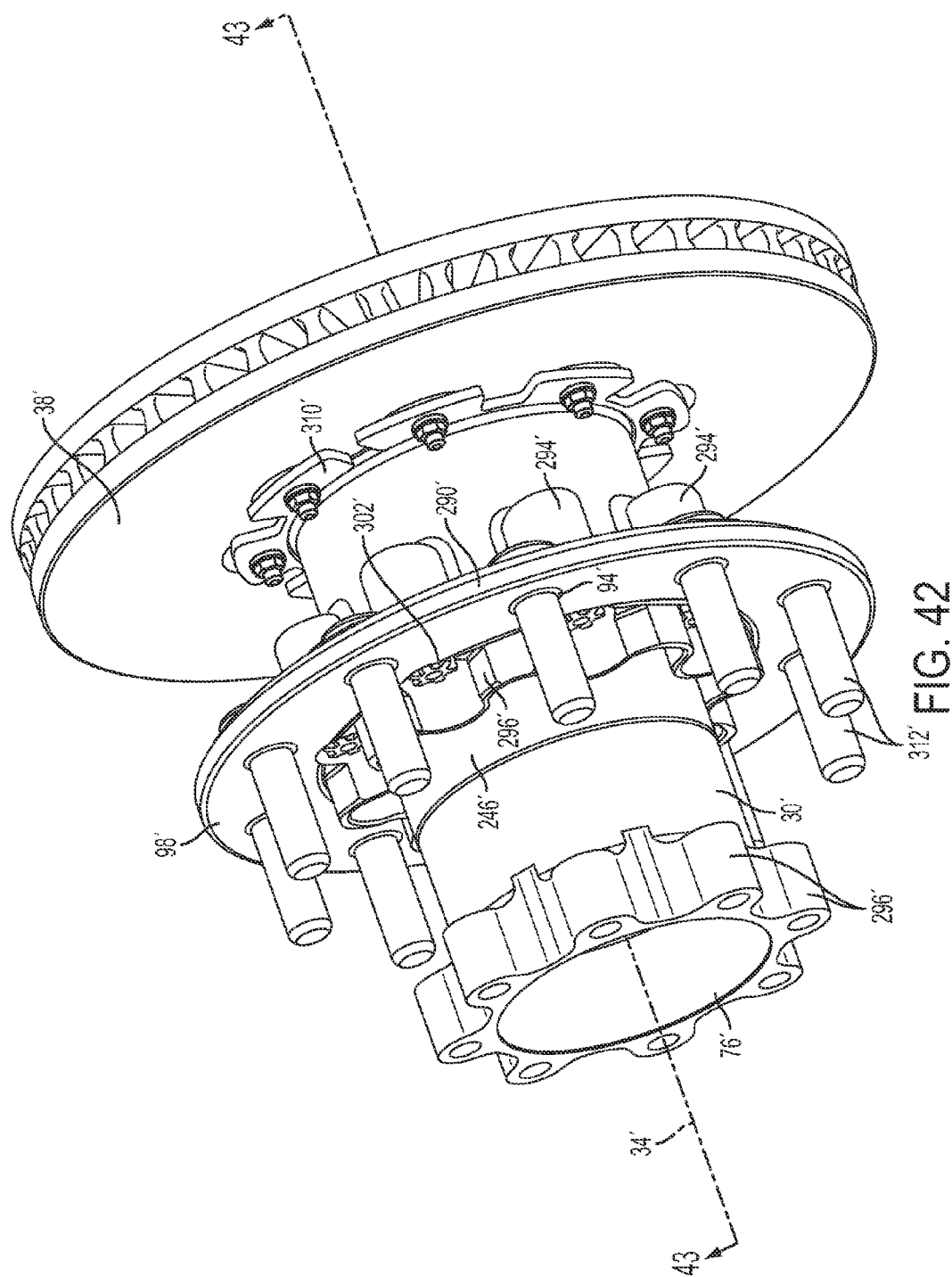
Figure 43:
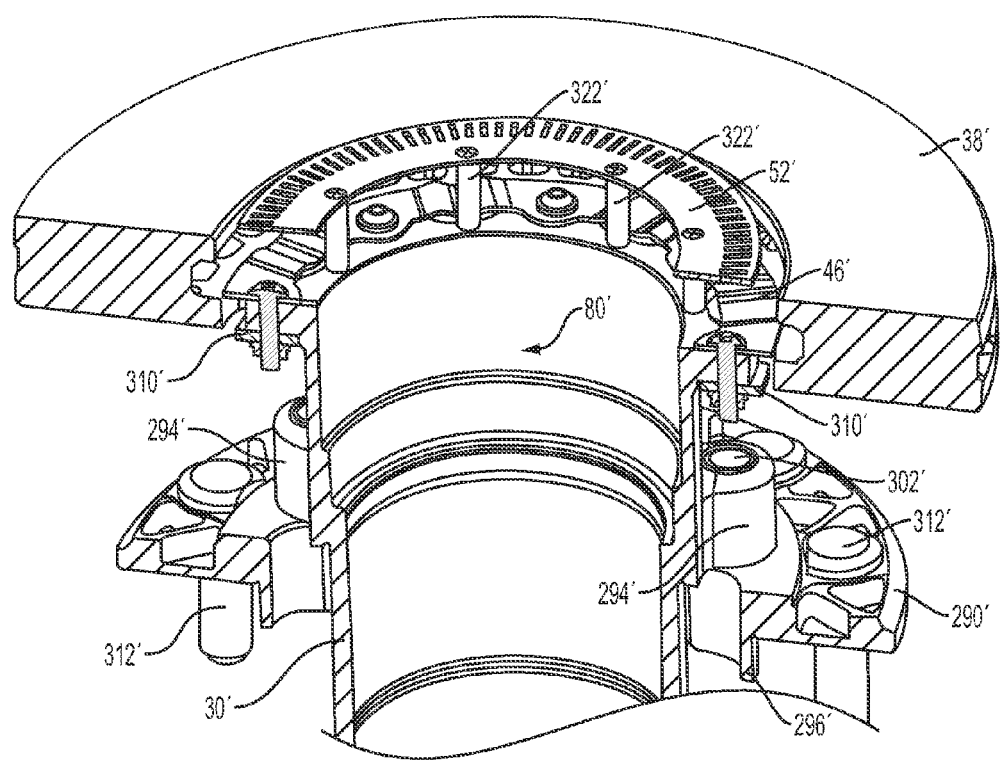
FIG. 43 is a section view taken along line 43-43 of FIG. 42.
Figure 44:
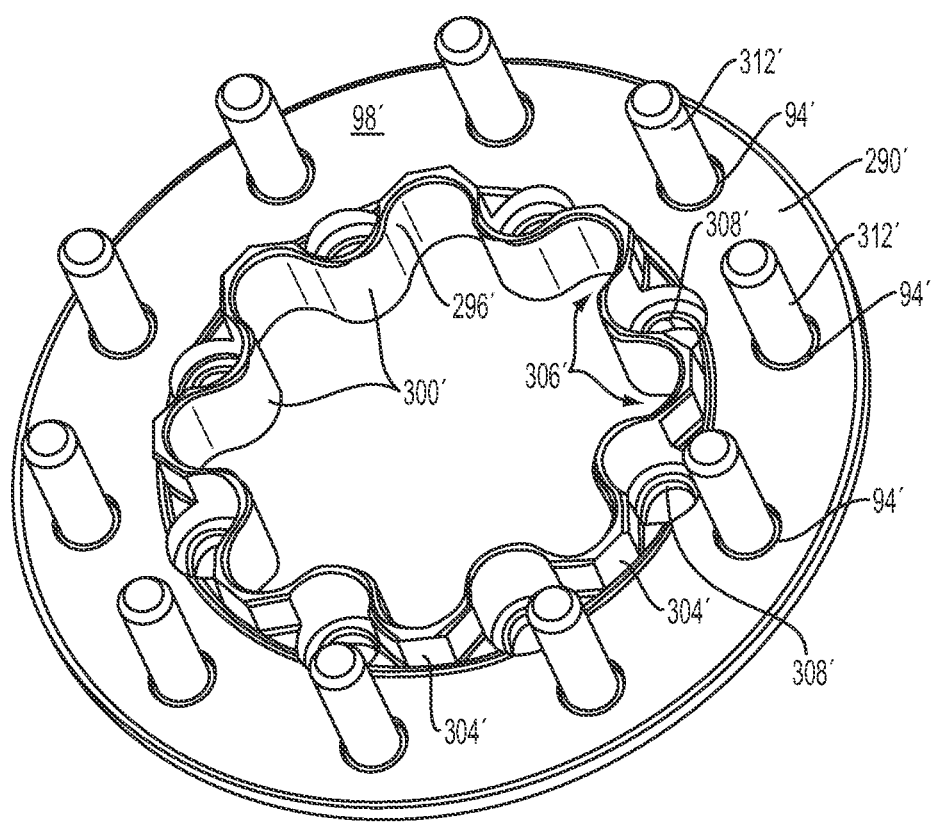
FIGS. 44-45 illustrate the wheel flange plate of the brake hub assembly of FIG. 37.
Figure 45:
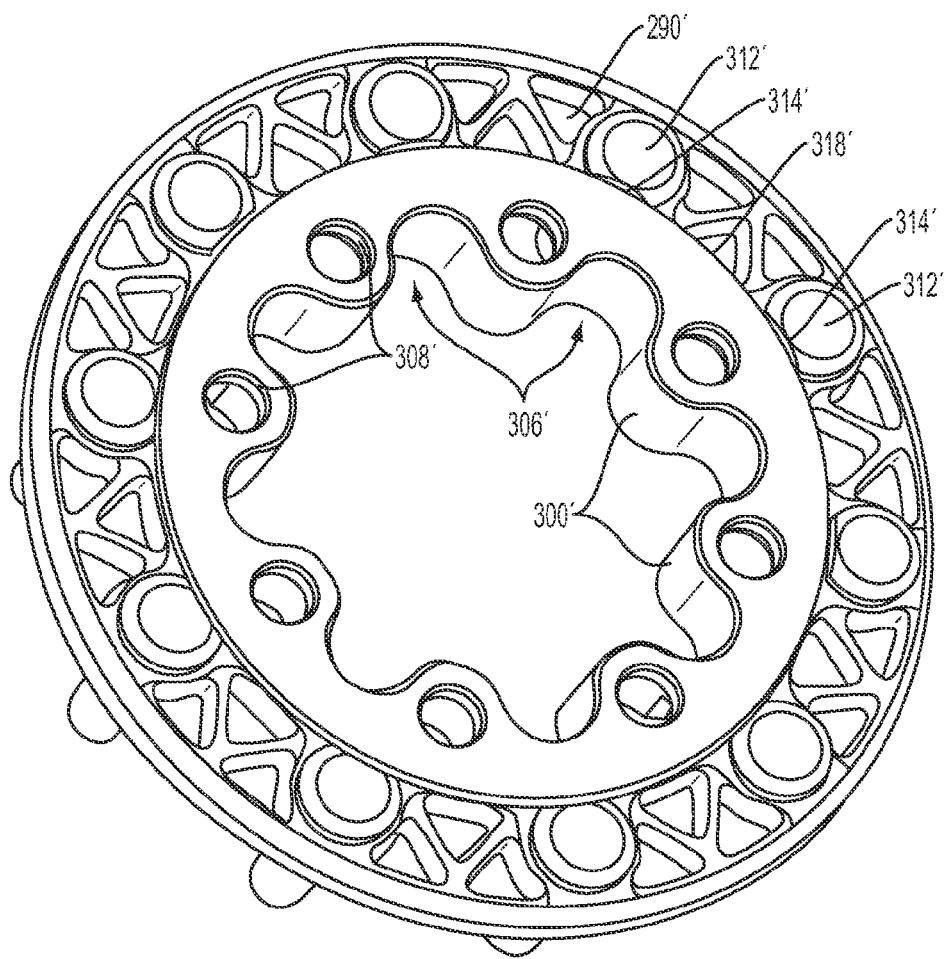

Illustrated in FIG. 39, the hub 30' of the hub assembly 26' includes a substantially cylindrical body 56', a plurality of torque lugs 64' positioned proximate the inboard end 68' of the hub body 56', a plurality of wheel lugs 294' positioned near the axial center of the hub body 56', and a plurality of threaded lugs 296' proximate the outboard end 76' of the hub body 56'. Similar to the previous hub designs, the body 56' of the hub 30' also defines an interior recess 80' that includes seats for the bearings of the bearing assembly and any necessary seals.

The torque lugs 64' extend radially outwardly from the body 56' proximate the inboard end 68'. The lugs 64' are formed integrally with the body 56' and are spaced equidistantly along its circumference. Similar to the torque lugs of the first and fourth hub embodiments 30a, 30d, each lug 64' of the hub 30' has a pair of substantially parallel side walls 110' configured to be received within and moveable along the slots 254' of the brake disk 38'.

The wheel lugs 294' extend radially outwardly from the body 56' near the axial center of the hub body. As with the torque lugs 64', the wheel lugs 294' are formed integrally with the hub body 56' and are spaced equidistantly along its circumference. Each wheel lug 294' includes an axially extending threaded aperture 298', configured to threadably receive a bolt 302'. In the illustrated embodiment, each wheel lug 294' is sized and spaced so that the brake disk 38' can slide past the lugs 294' without interference. More specifically, each wheel lug 294' is sufficiently small to pass through a corresponding radial slot 254' of the brake disk.

As best shown in FIGS. 39, 40, 44 and 45, the wheel flange plate 290' is substantially annular in shape and defines a plurality of wheel stud apertures 94'. The wheel flange plate 290' also includes a wall 297' extending perpendicular to the mounting surface 98' and along the inner circumference of the plate 290'. Wall 297' varies in radial distance from the central axis 34' and defines a plurality of hub pilots 300' at a first radial distance from the central axis 34' and a plurality of wheel pilots 304' at a second, greater radial distance from the central axis 34' (see FIG. 44). More specifically, the hub pilots 300' are configured to engage the pilot cylinder 246' of the hub 30' and co-axially align the plate 290' with the central axis 34' and the wheel pilots 304' are configured to maintain the concentricity between the plate 290' and the wheel. The wall 297' also provides rigidity to the plate 290'.

The plate 290' also defines a plurality of notches 306', each positioned between a pair of hub pilots 300' and sized slightly larger than a threaded lug 296' of the hub 30'. The plate 290' also defines a plurality of mounting apertures 308', each positioned between a pair of notches 306' and sized to receive a high strength bolt 302' with a reduced head diameter. In the illustrated embodiment, the apertures 308' are recessed axially from the mounting surface 98' and sized to accommodate the reduced diameter heads so the bolts 302' will not interfere with the wheel when it is installed on the hub 30'. More specifically, the apertures 308' are sized to accept the reduced diameter heads but are too small to receive typical sized bolt heads. Therefore, the bolt head acts as a safety check since lower quality fasteners with standard size heads cannot be used.

The wheel flange plate 290' can be formed from austempered ductile iron. As such, the material of the plate 290' is similar in hardness to the material of typical wheel studs 312'. The similar hardness of the plate 290' and stud 312' prevent the studs 312' from being pressed into the plate 290'. To restrict the studs 312' from rotating once installed, a notch 314' is formed in the stud 312'. Once the stud 312' is installed on the plate 290', the notch 314' contacts a flange or raised surface 318', formed in the plate 290', thereby restricting the stud 312' from rotating with respect to the plate 290' (see FIG. 45).

Figure 46A:
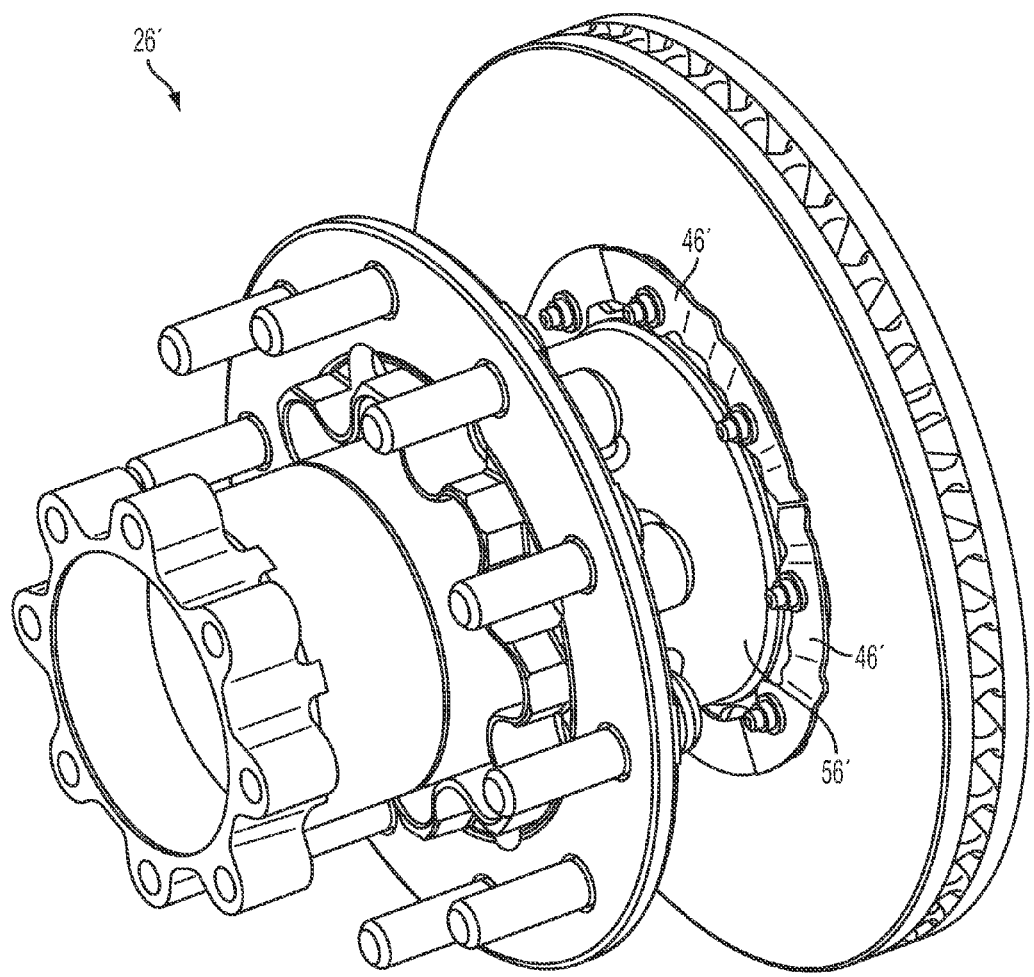
Figure 46B:
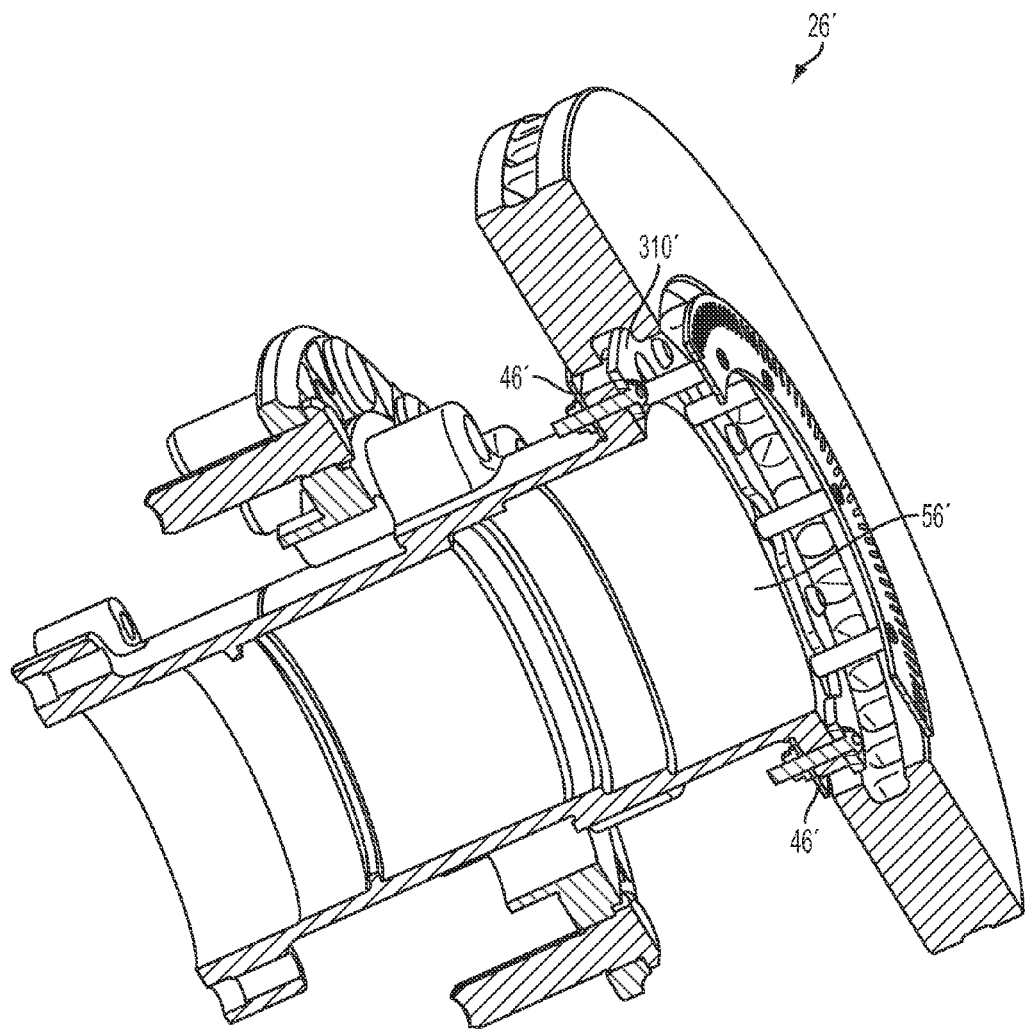

The brake hub assembly 26' also includes a pair of stopping plates 310'. Each plate 310' is substantially semi-annular in shape and is configured to be bolted to the outboard side of the torque lugs 64' to establish an outboard travel stop and axial qualifying surface for disk 38' on the hub 30'. In the illustrated embodiment, the stopping plates 310' work in tandem with the axial preload spring 46, which acts as an inboard travel stop for disk 38' and applies a constant outboard force to bias the disk 38 against the stopping plates 310'. In the illustrated embodiment, each stopping plate 310' extends roughly half the circumference of the hub 30' so the stopping plates 310' can be installed without needing to slide them along the length of the hub 30'. However, in alternate embodiments, an annular piece may be used. In still other embodiments, the brake hub 26' may include a stopping plate 310' attached on the inboard side with one or more axial preload springs 46 on the outboard side (see FIGS. 46a, 46b and 47).

To assemble the hub assembly 26', the user couples the axial preload spring 46' to the inboard side of the torque lugs 64' with a set of stand off screws and couples the tone ring 52' to the extension portion of the stand off screws (not shown). In other embodiments, the user may couple the axial preload spring 46' directly to the lugs 64' using a standard fastener while coupling the tone ring 52' to the hub 30' using a set of independent standoff spacers 322' (see FIGS. 40 and 43). The user can then install the hub 30' onto the axle of the motor vehicle with the proper bearings and seals as is well known in the art.

The user introduces the brake disk 38' axially over the outboard end 76' of the hub 30', sliding the disk 38 in an inboard direction along the hub 30', passing the threaded lugs 296' and the wheel lugs 294' until the disk 38' contacts the axial preload spring 46'. The user couples (e.g., bolts) the stopping plates 310' to the outboard side of the torque lugs 64', securing the brake disk 38' to the hub 30' between the preload spring 46' and the plates 310' (see FIG. 41).

The user then axially introduces the wheel flange plate 290' onto the outboard end 76' of the hub 30', moving the plate 290' in an inboard direction past the threaded lugs 296' and into engagement with the wheel lugs 294'. The wheel flange plate 290' is coupled (e.g., bolted) to the wheel lugs 294' with bolts 302' (see FIG. 42).

If the brake disk 38' needs to be replaced during the lifetime of the hub assembly 26', the user can remove the brake disk 38' from the hub 30' without removing the hub 30' from the axle. To remove the brake disk 38', the user removes the bolts 302' securing the wheel flange plate 290' to the hub 30'. The user then removes the wheel flange plate 290' from the hub 30' by sliding the plate 290' in an outboard direction, making sure to align the notches 306' with the threaded lugs 296'. The user then removes the two stopping plates 310', and slides the brake disk 38' in an outboard direction along the hub body 56', passing over the wheel lugs 294' and the threaded lugs 296'. A new or refurbished brake disk 38' may then be re-installed on the hub 30' as described above. The axial preload spring 46', stand off screws 270' and tone ring 52' may remain attached to the hub 30' during both assembly and disassembly.

Figure 50A:
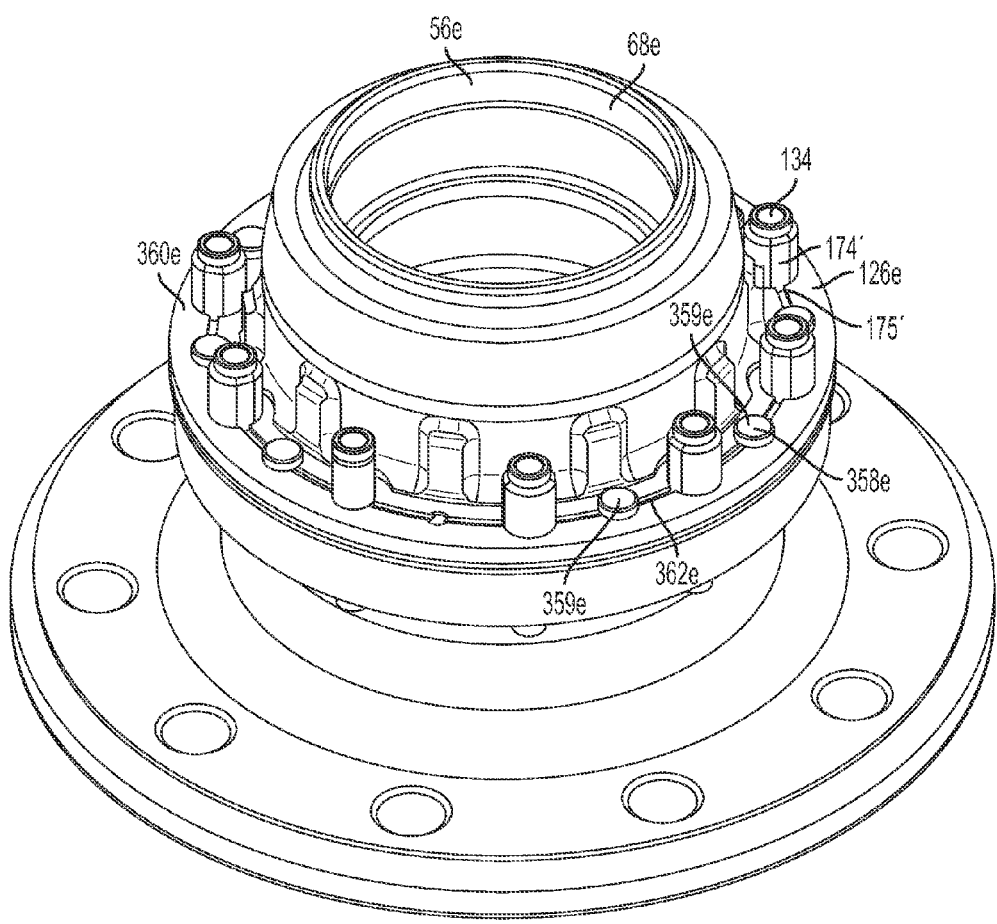
FIG. 50a is a perspective view of a fifth hub embodiment of the brake hub assembly.
Figure 50B:
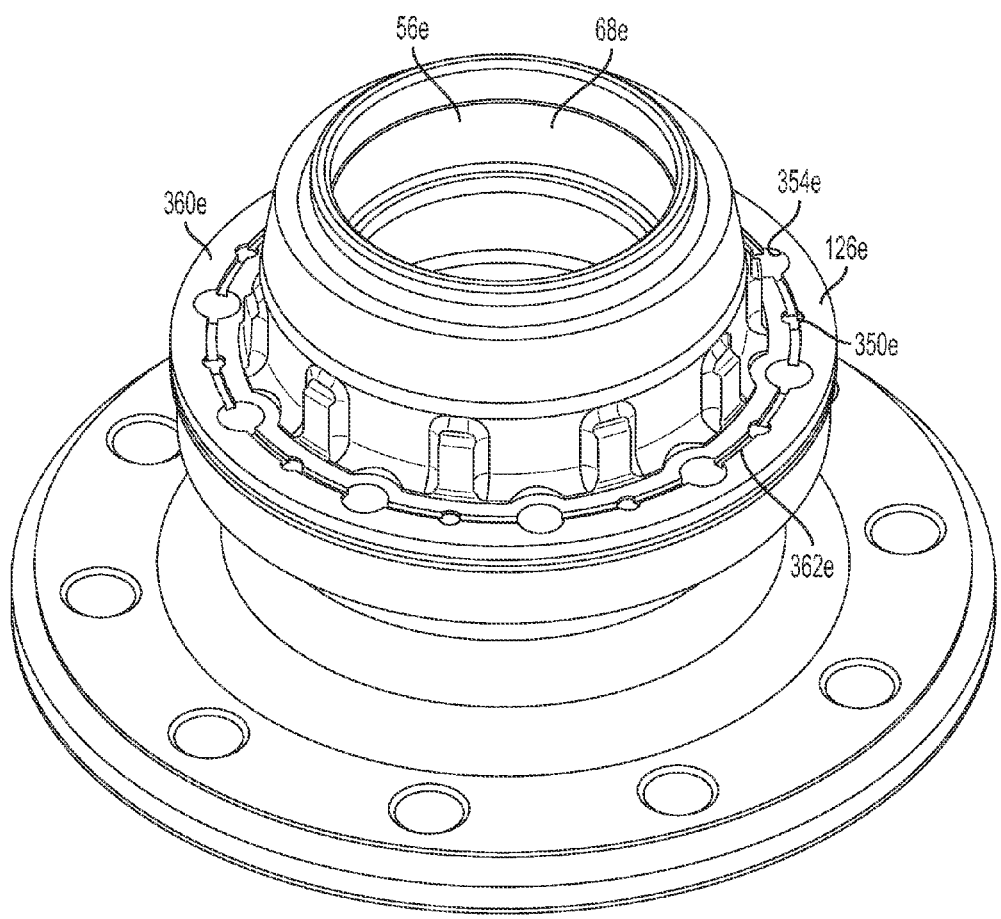
FIG. 50b is a perspective view of the hub embodiment of FIG. 50a with the torque members and spacers removed.

FIGS. 50a and 50b illustrate a fifth hub embodiment 30e of the hub assembly 26 formed (e.g., cast) from an aluminum alloy to produce a low rotational mass. In the fifth hub embodiment 30e, the hub employs much of the same structure and has many of the same properties as the previously-described hub 30b shown in FIGS. 6-19. Analogous elements to those of the previous embodiment have been given the same number and a reference letter "e". The following description of the hub 30e focuses primarily upon structure and features different than the previously-described embodiment.

Illustrated in FIGS. 50a and 50b, the fifth hub embodiment 30e includes a mounting flange 126e extending radially outwardly from the body 56e proximate the inboard end 68e of the hub body 56e. The mounting flange 126e defines a first set 350e and a second set 354e of apertures. The first set of apertures 350e are sized to receive a spacer 358e therein while the second set 354e is sized to receive a corresponding torque pin 134 (described above). By separating the mounting locations of the spacers 358e and the torque pins 134, the high heat areas (i.e., the spacers) are separated from the high torque areas (i.e., the torque pins 134), increasing the strength of the overall assembly. Furthermore, by making the spacers 358e a separate element, they do not need to be able to withstand the large loads present during braking and can be formed from more thermally insulating material, such as stainless steel, ceramic, and the like.

The fifth hub embodiment 30e also includes a groove 362e extending along the mounting flange 126e. When the hub 30e is assembled, the groove 362e is configured to at least partially receive the protrusions 175' of the cap 174' positioned on the torque pins 134 (see FIG. 55). The groove 362 at least partially restricts the rotation of the cap 174' with respect to the pin 134.

During assembly, to increase the accuracy of the axial qualifying surface defined by the axial surfaces 359e of the spacers 358e, the user inserts the spacers 358e into the corresponding apertures 350e of the mounting flange 126e. The user then machines the axial surfaces 359e of the spacers 358e while the spacers 358e are installed in the hub 30e. After the spacers 358e have been machined, the user may insert the torque pins 134 into their corresponding apertures 354e.

Alternatively, the user may first machine the inboard surface 360e of the mounting flange 126e to assure it is perpendicular to the central axis. The user then presses each spacer 358e into a corresponding aperture 350e, relying on minimal part-to-part variation in the spacers 350e to maximize accuracy.

The invention claimed is:

1. A brake hub assembly comprising:
   a brake hub defining a central axis and including an interior recess defining a bearing seat in which at least a portion of a wheel bearing is received;
   a brake disk coupled to the brake hub, the brake disk having: a first plate; a second plate spaced axially from the first plate; and a plurality of ribs extending between the first and second plates to define a plurality of cooling channels therebetween, each channel having an opening with an inboard edge, the first plate being inboard from the second plate and the second plate having a braking surface, a thickness defined between the braking surface and one of the cooling channels, and a plurality of radially extending slots through the thickness of the second plate, the second plate being annular and having a plurality of pilot surfaces in direct contact with the brake hub and alternating with the radially extending slots in a circumferential direction about the central axis, the pilot surfaces defining an inner diameter of the second plate;
   a torque member extending from the brake hub and received in one of the radially extending slots of the brake disk, the torque member having an inboard end with a threaded bore therein, wherein the inboard end does not extend axially beyond the inboard edge of the opening;
   an axial preload spring for biasing the brake disk towards an axial qualifying surface of the torque member; and
   a fastener received within the threaded bore, and extending through the same radial slot in the brake disk in which the torque member is received, for clamping the axial preload spring to the torque member.

2. The brake hub assembly of claim 1, wherein the first plate is annular and has a first inner diameter, wherein the inner diameter of the second plate is a second inner diameter, and wherein the second inner diameter is less than the first inner diameter.

3. The brake hub assembly of claim 2, wherein the brake disk and brake hub are co-axially aligned along the central axis, and wherein the pilot surfaces comprise no more than about 15% of the inner circumference of the second plate.

4. The brake hub assembly of claim 2, wherein the brake disk and brake hub are co-axially aligned along the central axis, and wherein the pilot surfaces comprise no more than about 2% of the inner circumference of the second plate.

5. The brake hub assembly of claim 1, wherein each of the slots extends radially from the second inner diameter.

6. The brake hub assembly of claim 1, wherein the torque member is one of a plurality of torque members, each for transmitting torque between the brake disk and the brake hub and each having an axial qualifying surface; and
   wherein the axial preload spring has a plurality of base portions each coupled to a corresponding torque member, and wherein the axial preload spring is configured to bias the brake disk towards the axial qualifying surfaces of the torque members.

7. The brake hub assembly of claim 6, wherein the axial preload spring also includes a plurality of spring portions, each spring portion positioned between adjacent base portions.

8. The brake hub assembly of claim 7, wherein each spring portion is substantially "V" shaped.

9. The brake hub assembly of claim 7, wherein the spring portions contact the brake disk.

10. The brake hub assembly of claim 6, wherein the axial preload spring is substantially "C" shaped.

11. The brake hub assembly of claim 6, wherein the brake disk is configured to float along the central axis between the axial preload spring and the axial qualifying surfaces of the torque members.

12. The brake hub assembly of claim 6, wherein at least two of the torque members include a threaded bore in the inboard end thereof, and wherein the fastener is one of a plurality of fasteners received within the threaded bores for clamping the axial preload spring to the torque members.

13. The brake hub assembly of claim 12, wherein the fasteners are configured as stand-off screws, and wherein the brake hub assembly further includes a tone ring mounted to the stand-off screws.

14. The brake hub assembly of claim 13, wherein the stand-off screws mount the tone ring parallel with the brake disk.

15. The brake hub assembly of claim 6, wherein the axial preload spring is annular.

16. A brake hub assembly comprising:
   a brake hub defining a central axis and including an interior recess defining a bearing seat in which at least a portion of a wheel bearing is received;
   a brake disk coupled to the brake hub, the brake disk having: a first plate; a second plate spaced axially from the first plate; and a plurality of ribs extending between the first and second plates to define a plurality of cooling channels therebetween, each channel having an opening with an inboard edge, the first plate being inboard from the second plate and the second plate having a braking surface, a thickness defined between the braking surface and one of the cooling channels, and a plurality of radially extending slots through the thickness of the second plate, the second plate being annular and having a plurality of pilot surfaces in direct contact with the brake hub and alternating with the radially extending slots in a circumferential direction about the central axis, the pilot surfaces defining an inner diameter of the second plate, wherein the inner diameter of the second plate defines an inner circumference, and wherein the pilot surfaces comprise no more than about 20% of the inner circumference of the second plate;

a torque member extending from the brake hub and received in one of the radially extending slots of the brake disk, the torque member having an inboard end with a threaded bore therein, wherein the inboard end does not extend axially beyond the inboard edge of the opening;

an axial preload spring for biasing the brake disk towards an axial qualifying surface of the torque member; and a fastener received within the threaded bore, and extending through the same radial slot in the brake disk in which the torque member is received, for clamping the axial preload spring to the torque member.

* * * * *